United States Patent
Mizutani et al.

(10) Patent No.: US 12,434,110 B2
(45) Date of Patent: Oct. 7, 2025

(54) GOLF CLUB HEAD WITH SLIDING WEIGHT AND COVER

(71) Applicant: SUMITOMO RUBBER INDUSTRIES, LTD., Kobe (JP)

(72) Inventors: Naruhiro Mizutani, Kobe (JP); Hirotaka Nakamura, Kobe (JP); Kiyofumi Matsunaga, Kobe (JP); Daisuke Kohno, Kobe (JP); Yuki Motokawa, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 18/142,324

(22) Filed: May 2, 2023

(65) Prior Publication Data

US 2023/0271066 A1    Aug. 31, 2023

Related U.S. Application Data

(63) Continuation of application No. 17/192,158, filed on Mar. 4, 2021, now Pat. No. 11,684,830.

(30) Foreign Application Priority Data

Mar. 24, 2020    (JP) ................. 2020-052942

(51) Int. Cl.
 *A63B 23/04* (2006.01)
 *A63B 53/04* (2015.01)
 *A63B 102/32* (2015.01)

(52) U.S. Cl.
 CPC .. *A63B 53/0466* (2013.01); *A63B 2053/0495* (2013.01); *A63B 2102/32* (2015.10)

(58) Field of Classification Search
 CPC ............ A63B 53/0466; A63B 2102/32; A63B 2053/0495
 See application file for complete search history.

(56) References Cited

U.S. PATENT DOCUMENTS

| | | |
|---|---|---|
| 4,085,934 A | 4/1978 | Churchward |
| 5,050,879 A | 9/1991 | Sun et al. |
| 7,166,041 B2 | 1/2007 | Evans |
| 7,775,905 B2 | 8/2010 | Beach et al. |
| 7,871,339 B2 | 1/2011 | Sanchez et al. |
| 9,259,627 B1 | 2/2016 | Myers et al. |
| 9,623,302 B1 | 4/2017 | Myers et al. |
| 9,694,256 B2 | 7/2017 | Myers et al. |
| 9,914,028 B1 | 3/2018 | Cleghorn et al. |

(Continued)

FOREIGN PATENT DOCUMENTS

| | | |
|---|---|---|
| EP | 0 786 271 A2 | 7/1997 |
| JP | 56-150569 U | 11/1981 |

(Continued)

*Primary Examiner* — William M Pierce
(74) *Attorney, Agent, or Firm* — Birch, Stewart, Kolasch & Birch, LLP

(57) ABSTRACT

A golf club head includes: a head body that includes a cavity; a weight that is detachably attached to the cavity; and a cover that is openably and closably attached to the head body and that covers at least a part of the cavity when the cover is in a closed state. The weight is attached to the cavity in a state where the weight is slidingly movable in the cavity. In the closed state, the cover applies a pressing force to the weight. The weight may be fixed to the cavity by a static frictional force increased by the pressing force. The cavity may form a slide groove.

14 Claims, 37 Drawing Sheets

(56) References Cited

U.S. PATENT DOCUMENTS

| | | |
|---|---|---|
| 10,183,202 B1 | 1/2019 | Harbert et al. |
| 10,695,628 B1 | 6/2020 | Yi et al. |
| 10,918,917 B2 | 2/2021 | Northcutt et al. |
| 10,926,143 B2 | 2/2021 | Bennett et al. |
| 11,020,637 B2 | 6/2021 | Stokke et al. |
| 11,090,536 B2 | 8/2021 | Bennett et al. |
| 11,229,827 B2 | 1/2022 | Yi et al. |
| 2009/0203465 A1 | 8/2009 | Stites et al. |
| 2009/0215551 A1 | 8/2009 | Liang et al. |
| 2010/0234130 A1 | 9/2010 | Tavares et al. |
| 2015/0306473 A1 | 10/2015 | Breier et al. |
| 2015/0321055 A1 | 11/2015 | Golden et al. |
| 2016/0101330 A1 | 4/2016 | Harrington et al. |
| 2019/0022481 A1 | 1/2019 | Mine et al. |
| 2019/0192928 A1 | 6/2019 | Soracco et al. |
| 2019/0282868 A1 | 9/2019 | Oldknow et al. |
| 2020/0330834 A1 | 10/2020 | Northcutt et al. |
| 2020/0330835 A1 | 10/2020 | Bennett et al. |
| 2020/0330836 A1 | 10/2020 | Bennett et al. |
| 2021/0128994 A1 | 5/2021 | Yi et al. |
| 2021/0299525 A1 | 9/2021 | Mizutani et al. |
| 2022/0088446 A1 | 3/2022 | Harbert et al. |

FOREIGN PATENT DOCUMENTS

| | | |
|---|---|---|
| JP | 63-59976 A | 3/1988 |
| JP | 9-308717 A | 12/1997 |
| JP | 2011-511664 A | 4/2011 |
| JP | 2016-10579 A | 1/2016 |
| JP | 6576398 B2 | 9/2019 |
| JP | 2020-175196 A | 10/2020 |

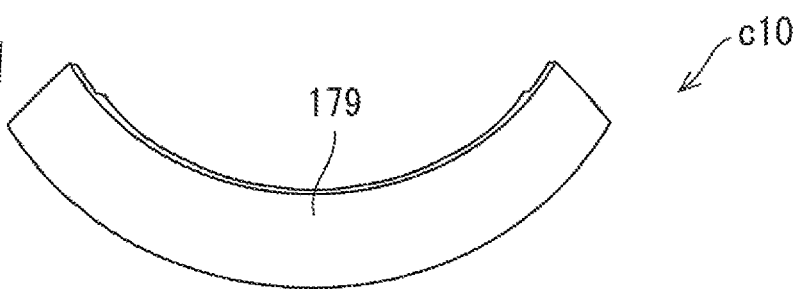
FIG. 11A
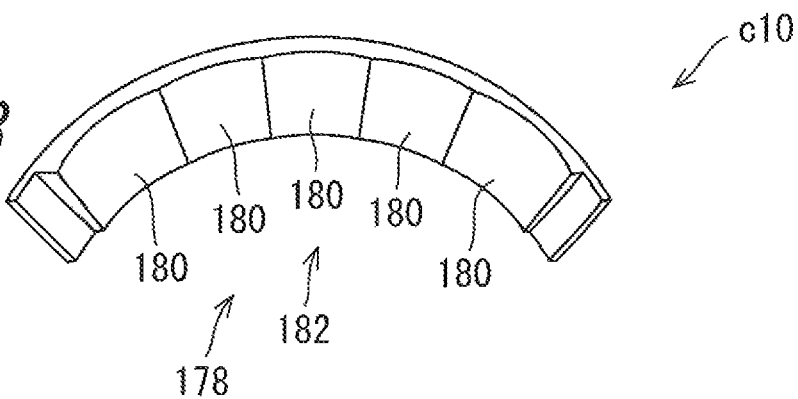
FIG. 11B
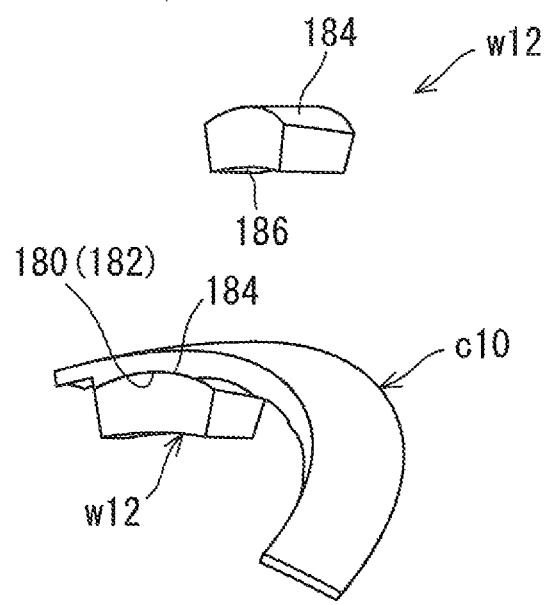
FIG. 11C
FIG. 11D
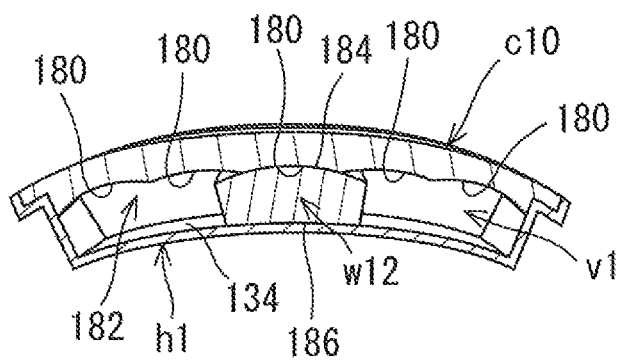
FIG. 11E

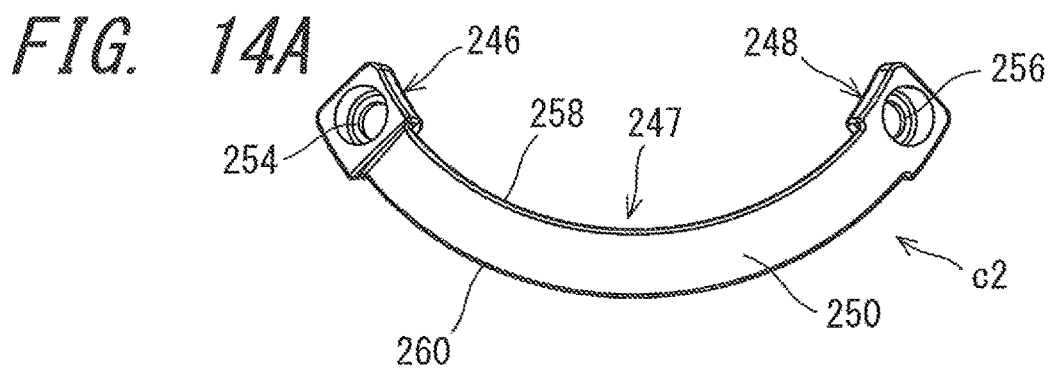
FIG. 14A
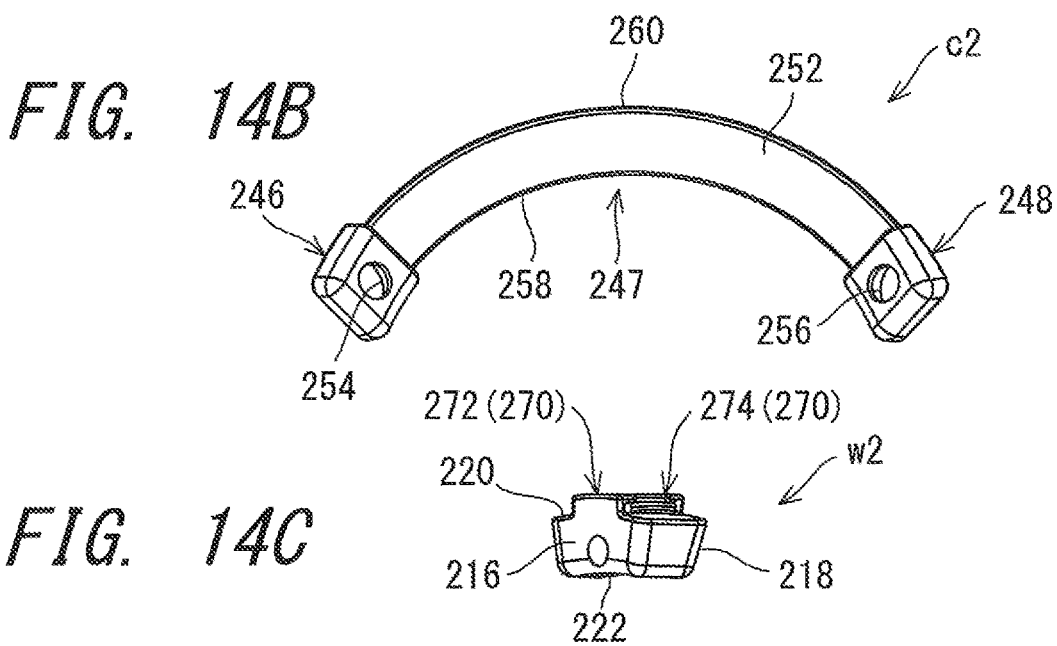
FIG. 14B
FIG. 14C
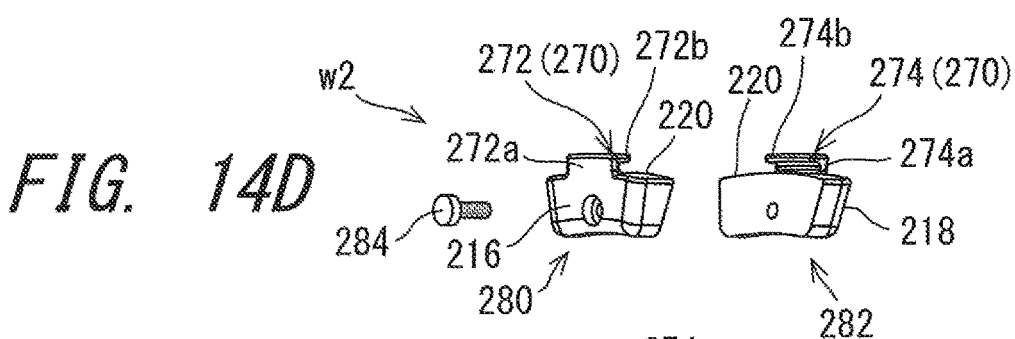
FIG. 14D
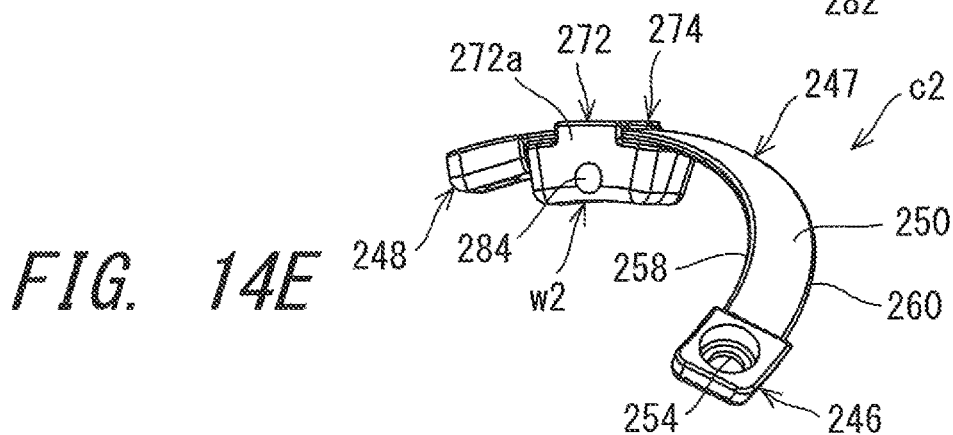
FIG. 14E

GOLF CLUB HEAD WITH SLIDING WEIGHT AND COVER

This application is a Continuation of application Ser. No. 17/192,158, filed on Mar. 4, 2021, which claims priority to Patent Application No. 2020-052942, filed in Japan on Mar. 24, 2020. Each of the above applications is hereby expressly incorporated by reference, in its entirety, into the present application.

BACKGROUND OF THE INVENTION

Field of the Invention

The present disclosure relates to a golf club head.

Description of the Related Art

JP2016-010579A discloses a golf club head including: a weight main body that is attached to an opening of a sole portion; and at least one adjustable weight part that is detachably attached to the weight main body. The weight main body is formed so as to project toward an inside space of the head. The adjustable weight part is movable between the opening side and the inside space side within a housing space formed inside the weight main body.

SUMMARY OF THE INVENTION

The inventors of the present disclosure have found a new configuration in which the position of a weight is changeable. This configuration achieves advantageous effects that cannot be obtained from conventional configurations.

The present disclosure provides a new configuration that is configured to move a weight.

According to one aspect, a golf club head includes: a head body that includes a cavity; a weight that is detachably attached to the cavity; and a cover that is attached to the head body so as to be opened and closed, and that covers at least a part of the cavity when the cover is in a closed state. The weight is attached to the cavity in a state where the weight is slidingly movable in the cavity. The cover applies a pressing force on the weight in the closed state.

According to another aspect, a golf club head includes: a head body that includes a cavity; a weight that is detachably attached to the cavity; and a cover that is attached to the head body so as to be opened and closed, and that covers at least a part of the cavity when the cover is in a closed state. The weight is attached to the cavity in a state where the weight is slidingly movable in the cavity. The cover includes a cover engaging shape configured to engage with the weight at a plurality of positions on the path of the slide movement. The weight includes a weight engaging shape configured to engage with the cover engaging shape of the cover which is in the closed state.

According to still another aspect, a golf club head includes: a head body that includes a cavity; a weight that is placed in the cavity; and a cover that is attached to the head body so as to be opened and closed, and covers at least a part of the cavity when the cover is in a closed state. The weight is placed in the cavity in a state where the weight is slidingly movable in the cavity. The cover applies a pressing force on the weight in the closed state.

BRIEF DESCRIPTION OF THE DRAWINGS

FIG. 11A is a perspective view of a cover according to a modification example as viewed from outside, FIG. 11B is a perspective view of the cover as viewed from inside, FIG. 11C is a perspective view showing a weight that is used together with the cover, FIG. 11D is a perspective view showing a state where the cover and the weight are engaged with each other, and FIG. 11E is a cross-sectional view showing a state where the cover and the weight are attached to the head body;

FIG. 14A is a perspective view of a cover according to the second embodiment as viewed from outside, FIG. 14B is a perspective view of the cover as viewed from inside, FIG. 14C is a perspective view showing a weight that is used together with the cover, FIG. 14D is an exploded perspective view of the weight, and FIG. 14E is a perspective view showing a state where the weight is attached to the cover;

DESCRIPTION OF THE PREFERRED EMBODIMENTS

Embodiments of the present disclosure will be described in detail below with reference to the drawings as necessary.

Figure 37:
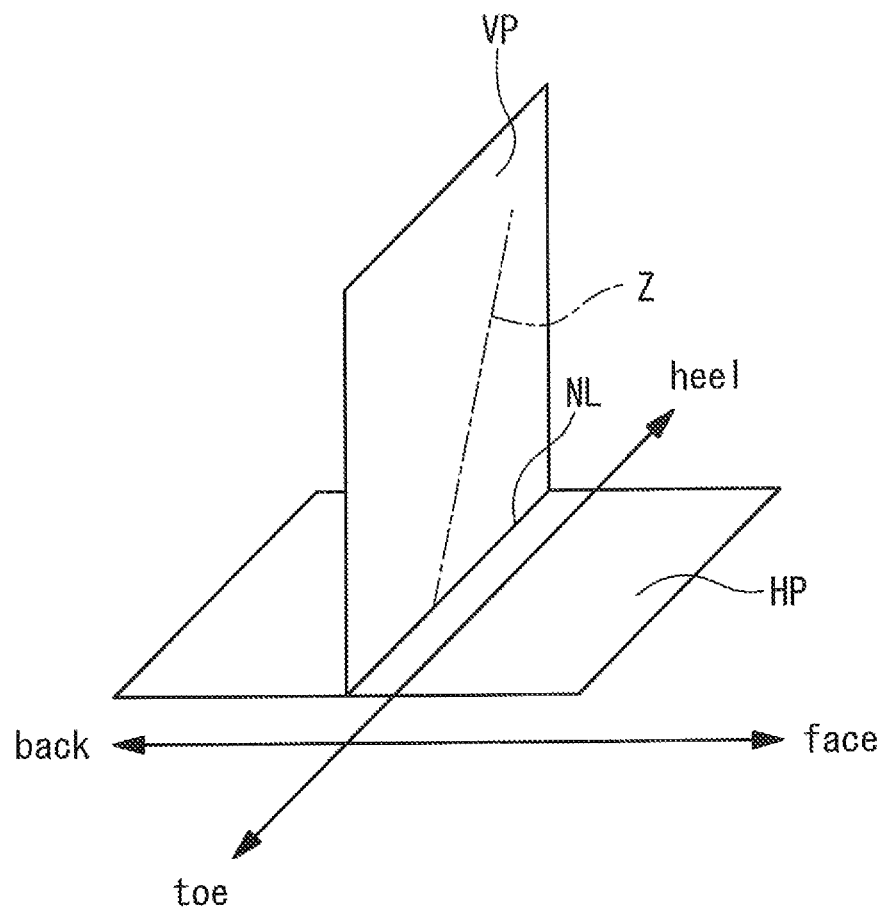
FIG. 37 is a conceptual diagram for illustrating a reference state of the head.

In the present disclosure, a reference state, a reference perpendicular plane, a face-back direction, a toe-heel direction, and an up-down direction are defined as follows. The reference state is a state where a head is placed at a predetermined lie angle and real loft angle on a horizontal plane HP. As shown in FIG. 37, in the reference state, a center line Z of a hosel hole is contained in a plane VP that is perpendicular to the horizontal plane HP. The plane VP is defined as the reference perpendicular plane. The predetermined lie angle and real loft angle are shown in a product catalog, for example.

In the present disclosure, the toe-heel direction is the direction of an intersection line NL between the reference perpendicular plane VP and the horizontal plane HP (see FIG. 37).

In the present disclosure, the face-back direction is a direction that is perpendicular to the toe-heel direction and is parallel to the horizontal plane HP.

In the present disclosure, the up-down direction is a direction that is perpendicular to the toe-heel direction and is perpendicular to the face-back direction. In other words, the up-down direction in the present disclosure is a direction perpendicular to the horizontal plane HP.

In the present disclosure, a face center Fc is defined. The face center Fc is determined as follows. First, a point Pr is selected at roughly the center of a face surface in the up-down direction and toe-heel direction. Next, a plane that passes through this point Pr, extends in the direction of a line normal to the face surface at the point Pr, and is parallel to the toe-heel direction is determined. An intersection line between this plane and the face surface is drawn, and a midpoint Px of the intersection line is determined. Next, a plane that passes through the midpoint Px, extends in the direction of a line normal to the face surface at the midpoint Px, and is parallel to the up-down direction is determined. An intersection line between this plane and the face surface is drawn, and a midpoint Py of the intersection line is determined. Next, a plane that passes through the midpoint Py, extends in the direction of a line normal to the face surface at the midpoint Py, and is parallel to the toe-heel direction is determined. An intersection line between this plane and the face surface is drawn, and a midpoint Px of the intersection line is newly determined. Next, a plane that passes through this new midpoint Px, extends in the direction of a line normal to the face surface at this midpoint Px, and is parallel to the up-down direction is determined. An intersection line between this plane and the face surface is drawn, and a midpoint Py of the intersection line is newly determined. Such points Px and Py are sequentially determined through repetition of this process. During the repeat of this process, when the distance between a new midpoint Py and the immediately previous midpoint Py becomes 0.5 mm or less for the first time, the new position Py (the final position Py) is set as the face center Fc.

Unless otherwise described, an "upper side or upward" means outside or outward of the head, and a "lower side or downward" means inside or inward of the head.

First Embodiment

Figure 1:
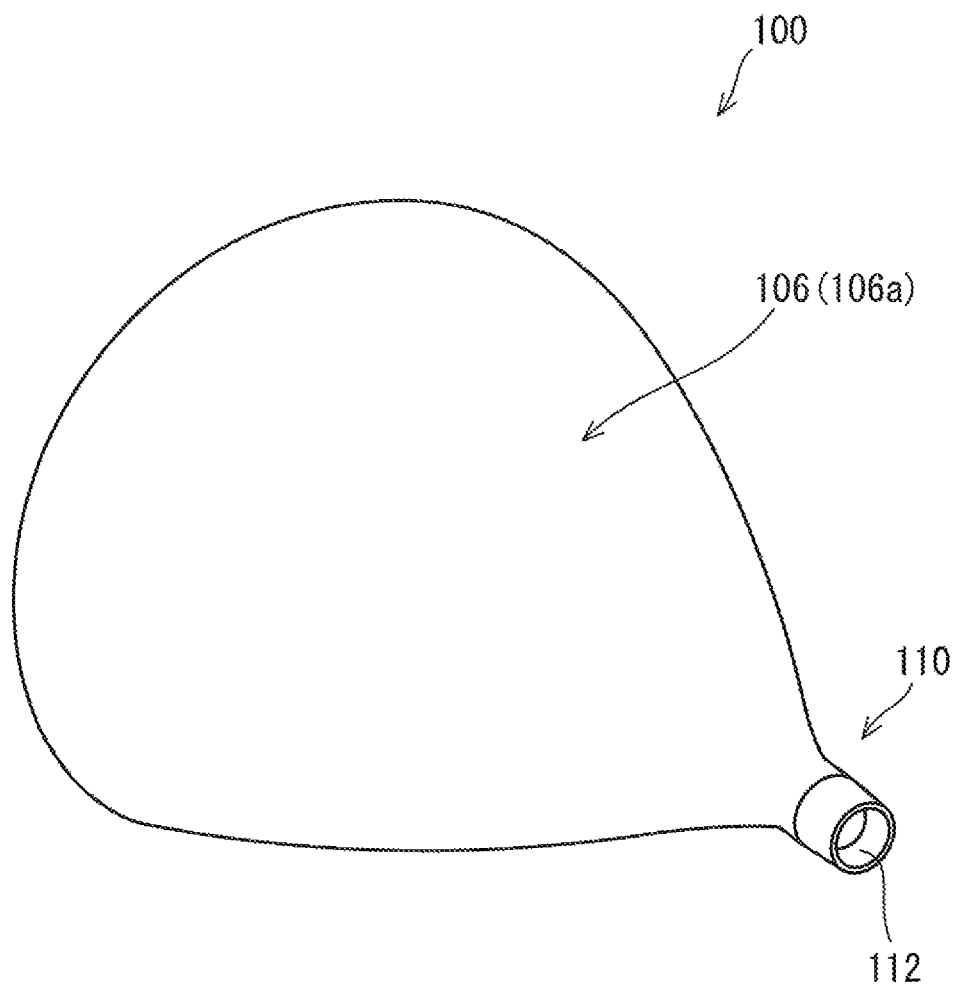
FIG. 1 shows a head according to a first embodiment as viewed from a crown side.
Figure 2:
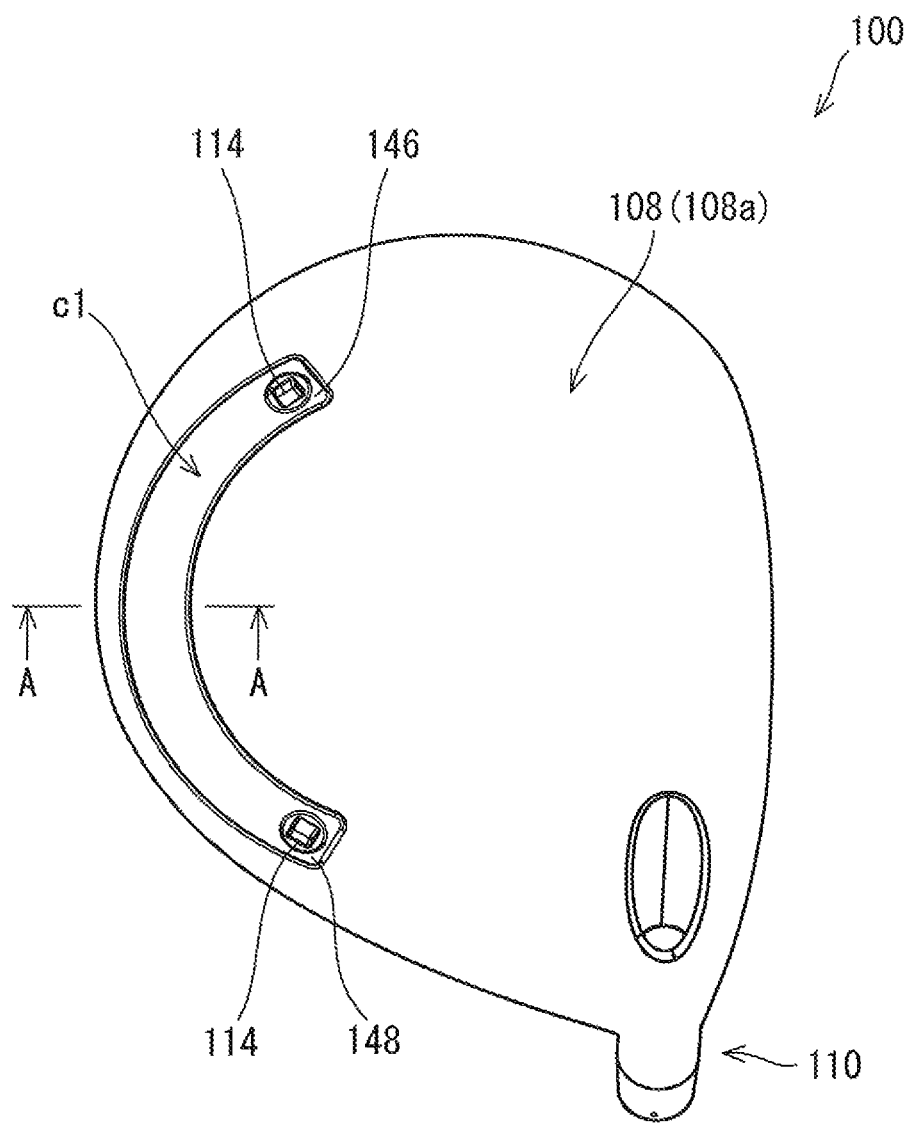
FIG. 2 is a bottom view of the head according to the first embodiment.
Figure 3:
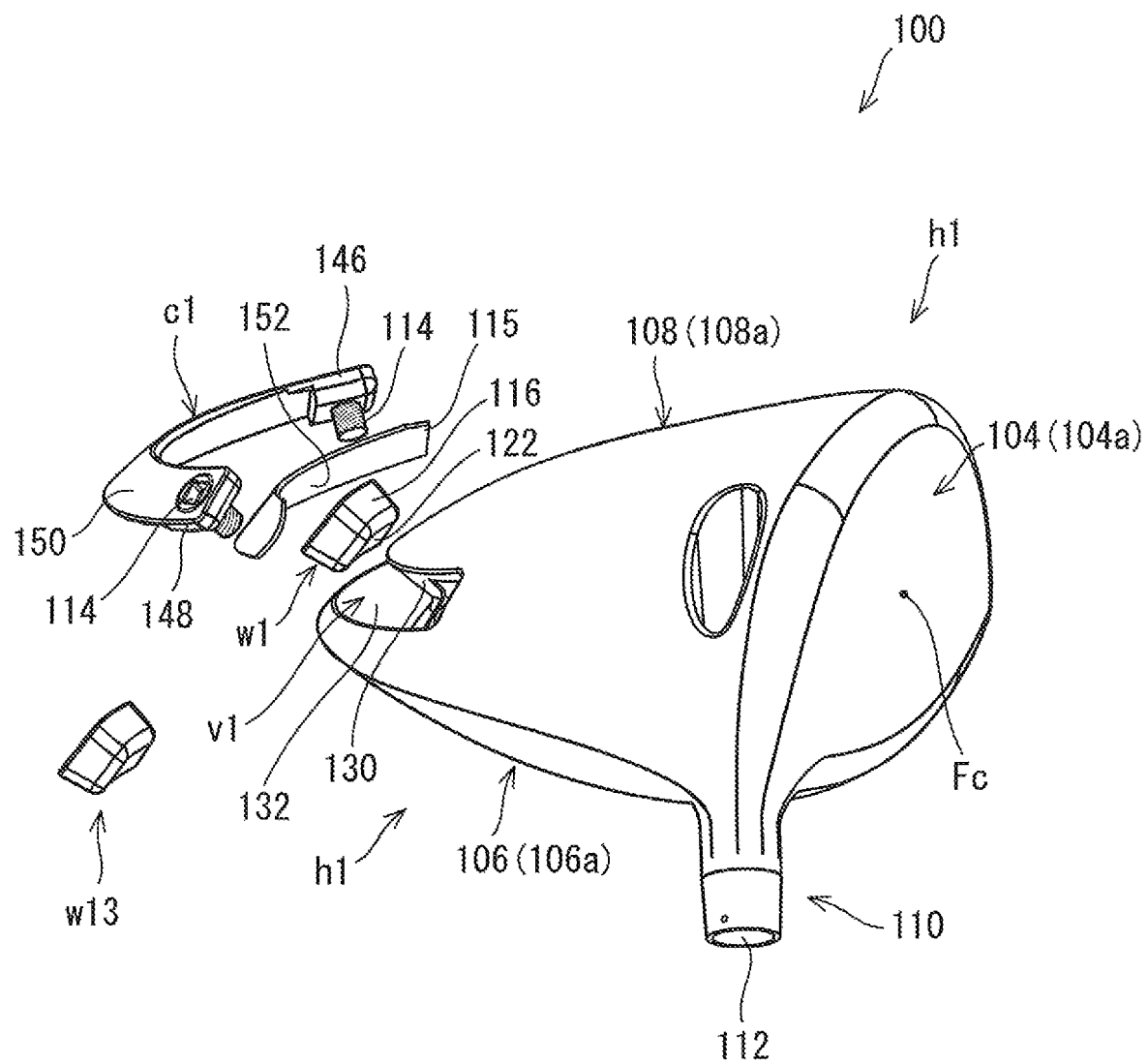
FIG. 3 is an exploded perspective view of the head according to the first embodiment.
Figure 4A:
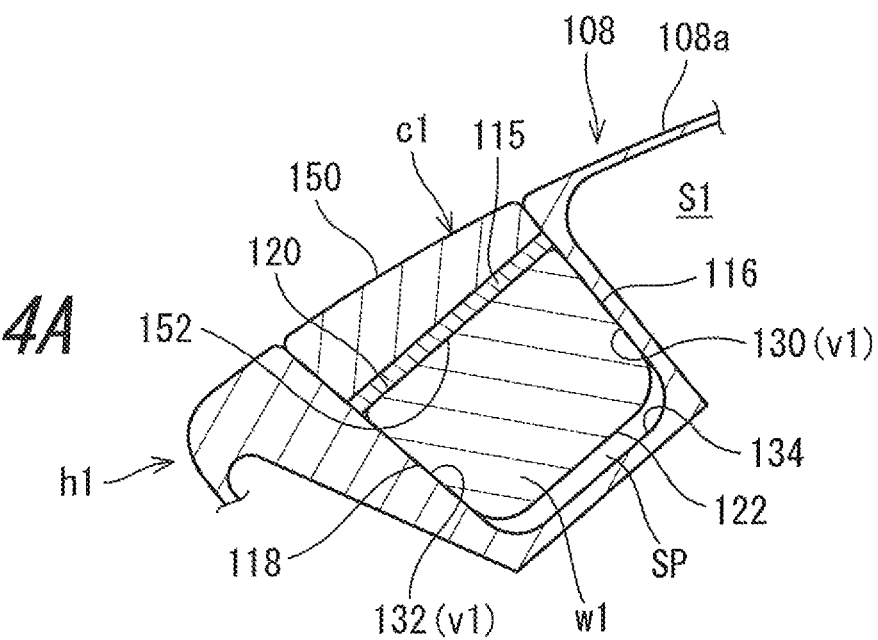
FIG. 4A is a cross-sectional view taken along line A-A in FIG. 2.
Figure 4B:
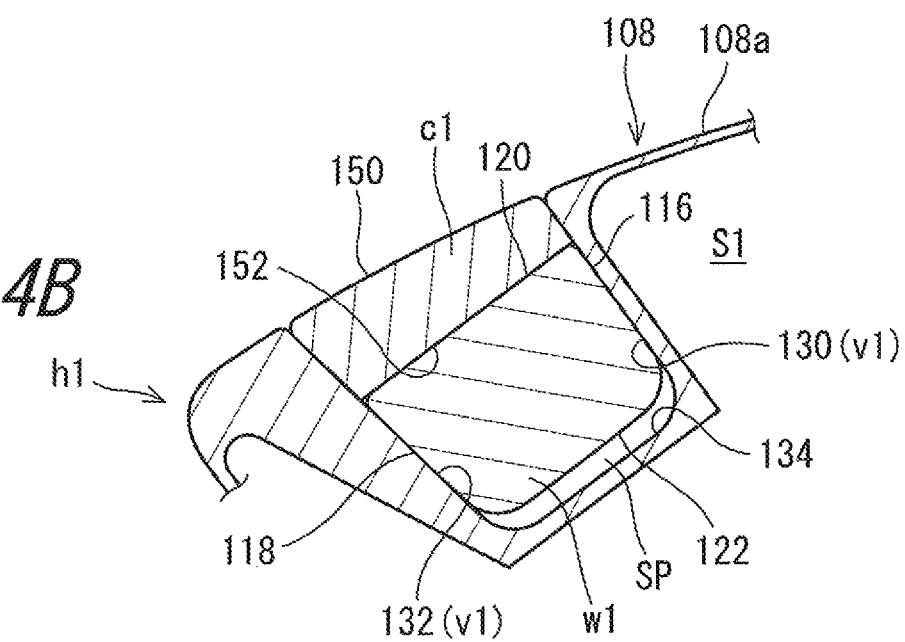
FIG. 4B is a cross-sectional view showing a modification example of FIG. 4A.

FIG. 1 is a perspective view of a golf club head 100 according to a first embodiment as viewed from a crown side. FIG. 2 is a bottom view of the head 100 as viewed from a sole side. FIG. 3 is an exploded perspective view of the head 100. FIG. 4A is a cross-sectional view taken along line A-A in FIG. 2.

The head 100 includes a face portion 104, a crown portion 106, a sole portion 108, and a hosel portion 110. The face portion 104 includes a hitting face 104a. The hitting face 104a is the outer surface of the face portion 104. The hitting face 104a includes a face center Fc. The crown portion 106 includes a crown surface 106a. The crown surface 106a is the outer surface of the crown portion 106. The sole portion 108 includes a sole surface 108a. The sole surface 108a is the outer surface of the sole portion 108. The hosel portion 110 includes a hosel hole 112. The head 100 includes a hollow portion S1 inside the head 100 (see FIG. 4A). The hollow portion S1 is surrounded by the face portion 104, the crown portion 106 and the sole portion 108. The face portion 104, the crown portion 106 and the sole portion 108 constitutes an outer shell portion of the head 100 (head body h1).

The head 100 is a wood type head. There is no limitation on the type of the head 100. For example, the head 100 may be a hybrid type head, an iron type head, or a putter type head. The head 100 is a driver head. There is no limitation on the club number of the head 100.

As well shown in FIG. 3, the head 100 includes a head body h1, a weight w1, a cover c1 and cover attaching members 114. In the present embodiment, the cover attaching members 114 are screws. The cover c1 includes an elastic part 115. The elastic part 115 is made of, for example, an elastomer such as a rubber. The Young's modulus of the elastic part 115 is smaller than the Young's modulus of the cover c1. The head body h1 includes the face portion 104, the crown portion 106, the sole portion 108, and the hosel portion 110.

The weight w1 includes a first abutment portion 116 and a second abutment portion 118 as abutting portions. The first abutment portion 116 is a first side surface (first surface). The second abutment portion 118 is a second side surface (second surface). The weight w1 also includes an upper surface 120 and a bottom surface 122. The upper surface 120 is opposed to the inner surface of the cover c1. The weight w1 has a weight. The specific gravity of the weight w1 is preferably greater than the specific gravity of the head body h1. The specific gravity of the weight w1 is preferably greater than the specific gravity of the cover c1. The weight w1 may be made of a metal, for example. A metal having a great specific gravity is preferable for the material of the weight w1. Examples of the material of the weight w1 include iron-based alloys such as stainless steel, and tungsten-containing alloys such as tungsten nickel alloys. When the weight w1 is made of a magnetic material, examples of the material of the weight w1 include a magnetic stainless steel.

The head body h1 includes a cavity v1. The cavity v1 is provided in the sole portion 108. There is no limitation on the position of the cavity v1.

The weight w1 is accommodated in the cavity v1. The weight w1 can move inside the cavity v1 in the state where the weight w1 is accommodated in the cavity v1. The cavity v1 guides the movement of the weight w1. The cavity v1 is a slide groove that enables the weight w1 to slidingly move. The weight w1 moves in a longitudinal direction of the cavity v1.

Figure 5:
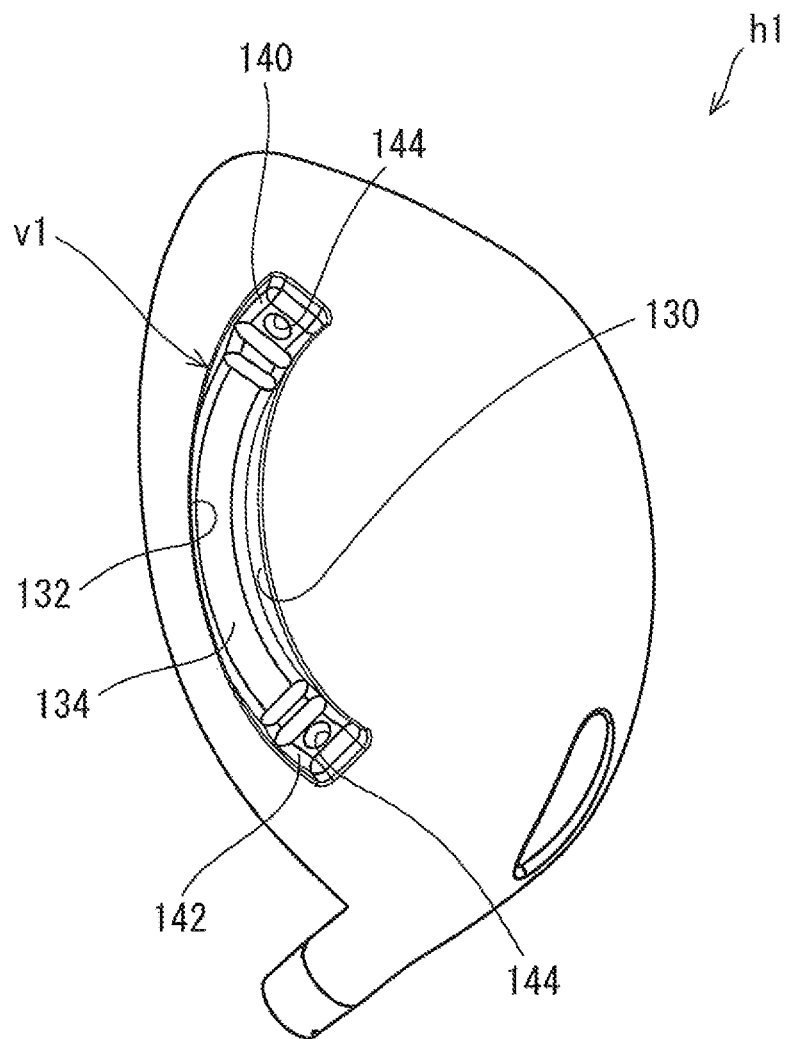
FIG. 5 is a perspective view of a head body according to the first embodiment.

FIG. 5 is a perspective view of the head body h1. As shown in FIG. 4A and FIG. 5, the cavity v1 includes a first slide portion 130 and a second slide portion 132 as slide portions. The first slide portion 130 and the second slide portion 132 constitute respective side surfaces of the cavity v1. The first slide portion 130 and the second slide portion 132 extend in the longitudinal direction (slide direction) of the cavity v1. The cavity v1 forms a groove (slide groove). The first slide portion 130 forms a first side surface of the slide groove. The second slide portion 132 forms a second side surface of the slide groove. The cavity v1 includes a bottom surface 134. In the present embodiment, the first slide portion 130 and the second slide portion 132 are slide surfaces. The first slide portion 130 abuts on the first abutment portion 116 of the weight w1. This abutment is achieved by surface-to-surface contact between the first slide portion 130 and the first abutment portion 116. The second slide portion 132 abuts on the second abutment portion 118 of the weight w1. This abutment is achieved by surface-to-surface contact between the second slide portion 132 and the second abutment portion 118. The weight w1 is guided by the first slide portion 130 and the second slide portion 132 to move. In the weight w1 during the slide movement, portions brought into contact with the cavity v1 are the first slide portion 130 and the second slide portion 132 only.

As shown in FIG. 4A, a space SP is formed between the weight w1 and the bottom surface 134. The space SP allows the slide portions 130 and 132 to surely abut on the abutment portions 116 and 118, respectively. In addition, as described later, the slide portion 130 and the slide portion 132 form a first tapered portion, the abutment portion 116 and the abutment portion 118 form a second tapered portion, and the second tapered portion is fitted into the first tapered portion. For this reason, contact pressures between the slide portions 130, 132 and the abutment portions 116, 118 are surely increased by the pressing force of the cover, whereby the movement of the weight w1 is surely prevented. This structure also cancels out dimensional errors that might occur in the slide portions 130, 132 and the abutment portions 116, 118, whereby respective abutments between the slide portions 130, 132 and the abutment portions 116, 118 are surely attained.

Figure 6A:
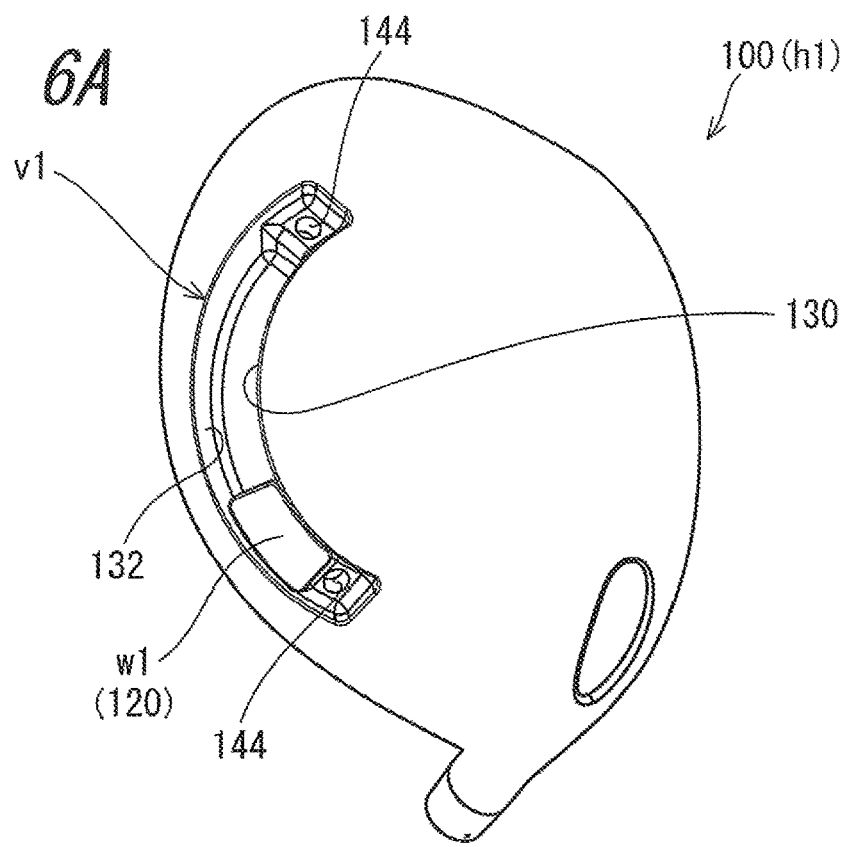
FIG. 6A and FIG. 6B are perspective views showing the movement of a weight in a cavity of the head in FIG. 1.
Figure 6B:
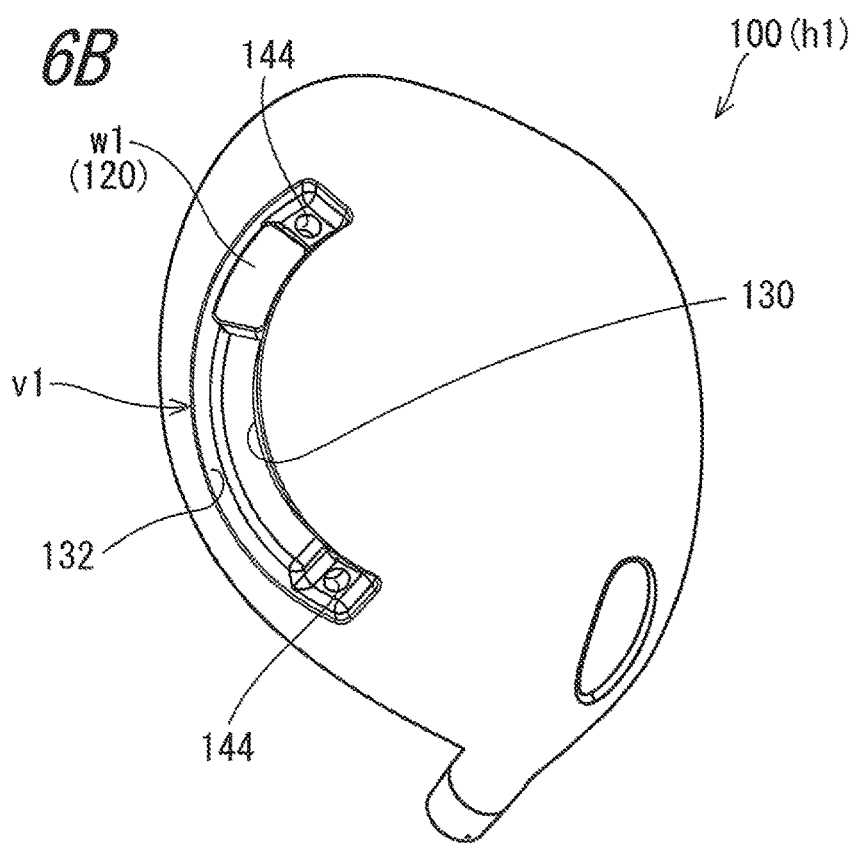

FIG. 6A and FIG. 6B are perspective views showing the head 100 in a state where the cover c1 is removed. The cavity v1 extends from a toe side position to a heel side position. The weight w1 is movable between a first position and a second position. That is, the movable range of the weight w1 is from the first position to the second position. In FIG. 6A, the weight w1 is located at the first position. This first position is the heel-most position in the movable range of the weight w1. In FIG. 6B, the weight w1 is located at the second position. The second position is the toe-most position in the movable range of the weight w1. The cavity v1 extends so as to allow the weight w1 to change its position in the toe-heel direction. The weight w1 slides in the cavity v1 in a state where the weight w1 falls off the cavity v1 when the cover c1 is not present.

The cavity v1 extends curvedly so as to project toward a back side of the head 100. When the weight w1 is located at or near an apex of the curve, the weight w1 is located at a back-most position. The cavity v1 extends so as to allow the weight w1 to change its position in the face-back direction.

As shown in FIG. 6A and FIG. 6B, the surface-to-surface contact between the first slide portion 130 of the cavity v1 and the first abutment portion 116 of the weight w1 is maintained throughout the movable range of the weight w1. The first slide portion 130 and the first abutment portion 116 are curved surfaces having the same curvature. The surface-to-surface contact between the second slide portion 132 of the cavity v1 and the second abutment portion 118 of the weight w1 is maintained throughout the movable range of the weight w1. The second slide portion 132 and the second abutment portion 118 are curved surfaces having the same curvature.

The first slide portion 130 and the second side portion 132 of the cavity v1 constitute a tapered portion. The distance between the first slide portion 130 and the second slide portion 132 is decreased downward. The distance between the first slide portion 130 and the second slide portion 132 is decreased as approaching the bottom surface 134 of the cavity v1. In addition, the weight w1 also has a tapered shape. The distance between the first abutment portion 116 and the second abutment portion 118 is decreased downward. Therefore, the weight w1 is stably supported by the cavity v1, whereby a smooth slide movement is attained.

As shown in FIG. 5 for example, the head body h1 includes a first cover support 140 and a second cover support 142. The first cover support 140 and the second cover support 142 each include a screw hole 144. A first end portion 146 of the cover c1 is fixed to the first cover support 140. A second end portion 148 of the cover c1 is fixed to the second cover support 142.

Figure 7A:
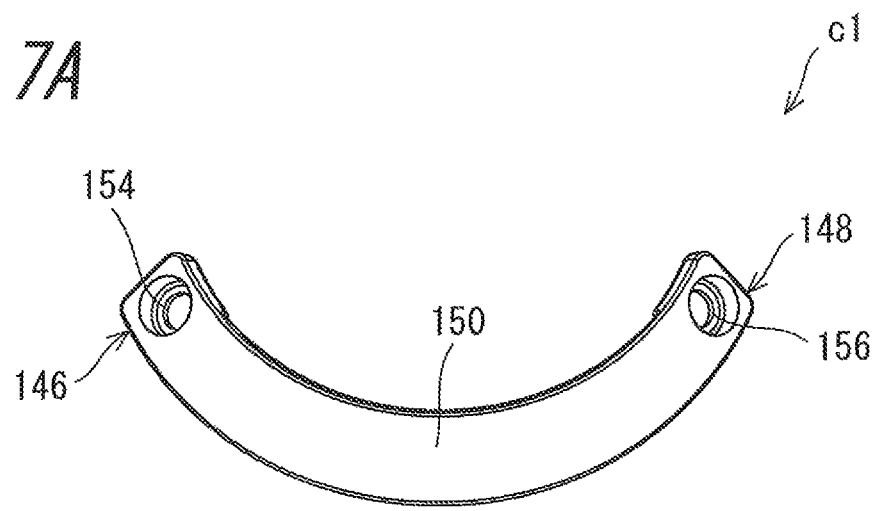
FIG. 7A is a perspective view of a cover of the head according to the first embodiment as viewed from outside.
Figure 7B:
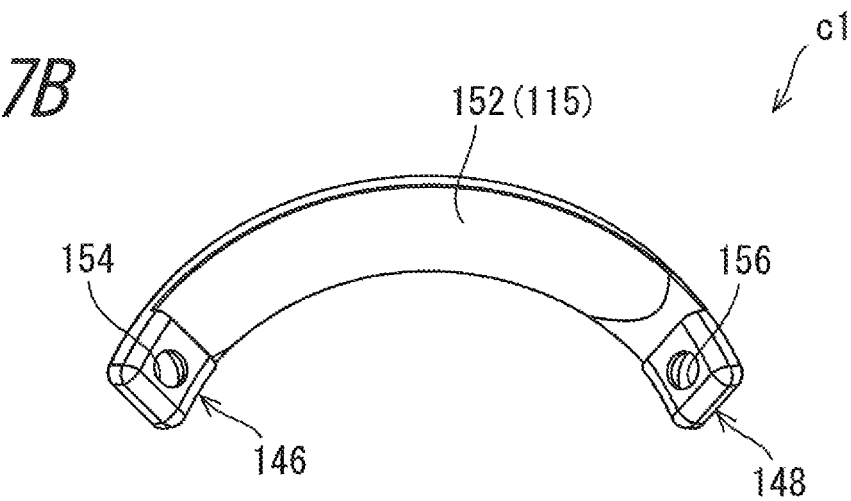
FIG. 7B is a perspective view of the cover as viewed from inside.

FIG. 7A is a perspective view of the cover c1 as viewed from an outer surface side thereof. FIG. 7B is a perspective view of the cover c1 as viewed from an inner surface side thereof. The cover c1 includes an outer surface 150 and an inner surface 152. The outer surface 150 forms a part of the sole surface 108a. The inner surface 152 is formed by the elastic part 115 (see FIG. 4A).

The cover c1 is a plate-shaped member that is three-dimensionally bent. The outer surface of the cover c1 forms a convex curved surface. The inner surface of the cover c1 forms a concave curved surface.

The cover c1 includes a first hole 154 and a second hole 156. The first hole 154 and the second hole 156 are through holes. The first hole 154 is provided at the first end portion 146 of the cover c1. The second hole 156 is provided at the second end portion 148 of the cover c1. As shown in FIG. 2 and FIG. 3, the first end portion 146 is fixed to the head body h1 with one cover attaching member (screw) 114. At the first end portion 146, the screw 114 penetrates through the first hole 154 and is screwed into the screw hole 144. The second end portion 148 is fixed to the head body h1 with the other screw (cover attaching member) 114. At the second end portion 148, the screw 114 penetrates through the second hole 156 and is screwed into the screw hole 144.

The cover c1 is openably and closably attached to the head body h1. The cover c1 is closed (hereinafter also referred to as a closed state) by tightening the two screws 114. In the closed state, the cover c1 covers at least a part of the cavity v1. In the present embodiment, the cover c1 which is in the closed state covers the entirety of the cavity v1. The cover c1 can be opened (hereinafter also referred to as an opened state) by removing at least one of the two screws 114 from the head body h1. For example, the opened state is obtained by loosening the two screws 114, removing one of the screws 114 from the head body h1, and turning the cover c1 around the other screw 114. The opened state means a state where the cover c1 does not cover the cavity v1. When only one of the screws 114 is removed, the opening state is achieved without the need to detach the cover c1 from the head body h1.

The cover c1 which is in the closed state covers the cavity v1. In the present embodiment, the cover c1 covers the entirety of the cavity v1. Alternatively, the cover c1 may cover a part of the cavity v1. In the present embodiment, the weight w1 is not visually recognized when the cover c1 is closed. When the cover c1 has transparency as described below, the weight w1 is visually recognizable in the closed state. When the cover c1 includes the elastic part 115, the cover c1 can have transparency by forming both the main body and elastic part 115 of the cover c1 with a material having transparency.

When the cover c1 is not in the closed state, the weight w1 can move freely within the cavity v1 (see FIG. 6A and FIG. 6B). When the cover c1 is in the closed state, the movement of the weight w1 in the cavity v1 is prevented. The closed state is obtained by appropriately tightening the screws 114. The cover c1 presses the weight w1 directly or indirectly. In the present embodiment, the cover c1 presses the weight w1. This pressing allows the cover c1 to press the weight w1 while elastically deforming the elastic part 115. This pressing causes the elastic part 115 to be recessed to conform to the shape of (the upper surface 120 of) the weight w1, and to retain the weight w1. In addition, this pressing increases a static frictional force generated between the weight w1 and the cover c1 (elastic part 115). This pressing also increases a static frictional force generated between the weight w1 and the cavity v1 (the first slide portion 130, the second slide portion 132). The pressing by the cover c1 can effectively prevent the slide movement of the weight w1.

Note that the closed state in the present disclosure means a state where the cover c1 covers at least a part of the cavity v1, and the cover c1 applies a pressing force to the weight w1 and/or engages with the weight w1, thereby preventing the weight w1 from moving.

The elastic part 115 may be provided in a member other than the cover c1. In the present embodiment, a part of the cover c1 is formed by the elastic part 115. Alternatively, the elastic part 115 may be provided in the weight w1. The elastic part 115 may be provided on the upper surface 120 of the weight w1. Alternatively, the elastic part 115 may be provided in the cavity v1. The elastic part 115 forms the first slide portion 130 and/or the second slide portion 132.

A weight w13 shown in FIG. 3 is a second weight. The weight w13 has the same shape as that of the weight w1. The head 100 may include such a replacement weight w13. The weight of the weight w13 is preferably different from the weight of the weight w1. In this case, the position of the center of gravity of the head can be changed by replacing attached weight with the other one. In addition, both the first weight w1 and the second weight w13 may be placed in the cavity v1. The moment of inertia of the head can be increased by placing such a plurality of weights in the cavity v1. From the viewpoint of providing a wide variety of adjustability of the center of gravity of the head, the number of weights can be greater than or equal to 2, further can be greater than or equal to 3, and still further can be greater than or equal to 4. From the viewpoint of the number of components, the number of weights can be less than or equal to 10, further can be less than or equal to 8, and still further can be less than or equal to 6.

Modification Example (Other Embodiments for Abutment Between the Weight and the Cover)

The weight does not have to have a surface that extends along the cavity. The weight does not have to be brought into surface-to-surface contact with the cavity.

Figure 8:
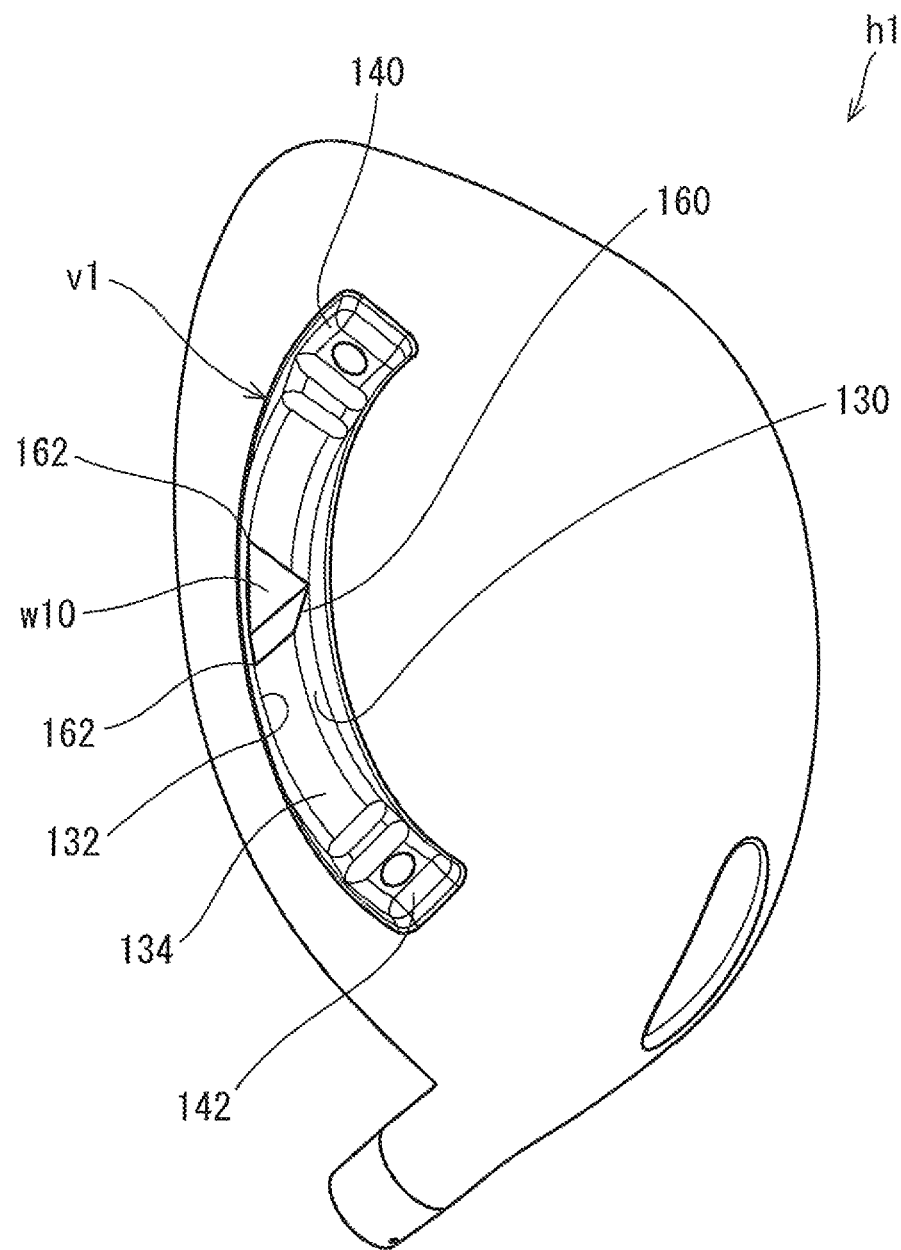
FIG. 8 is a perspective view showing a weight and a head body according to a modification example.

FIG. 8 shows a weight w10 according to a modification example. The weight w10 has a cross-sectional shape of a triangle. The weight w10 includes a first abutment portion 160 and second abutment portions 162. The first abutment portion 160 is an edge that forms a (first) corner of the weight w10. The weight w10 includes one first abutment portion 160. The first abutment portion 160 abuts on the first slide portion 130 of the cavity v1. This abutment is achieved by a line contact or a point contact. Two second abutment portions 162 are edges forming a second corner and a third corner of the weight w10. The second abutment portions 162 abuts on the second slide portion 132 of the cavity v1. These abutments are achieved by a line contact or a point contact. Those abutments at three positions stabilize the posture of the weight w10 during the slide movement. The weight w10 can stably slide without rattling during the slide movement. The weight w10 that need not be brought into surface-to-surface contact with the cavity v1 has a high degree of freedom in its shape. The weight w10 does not require a high dimensional accuracy. The first slide portion 130 and the second slide portion 132 do not require a high dimensional accuracy, either.

Figure 9:
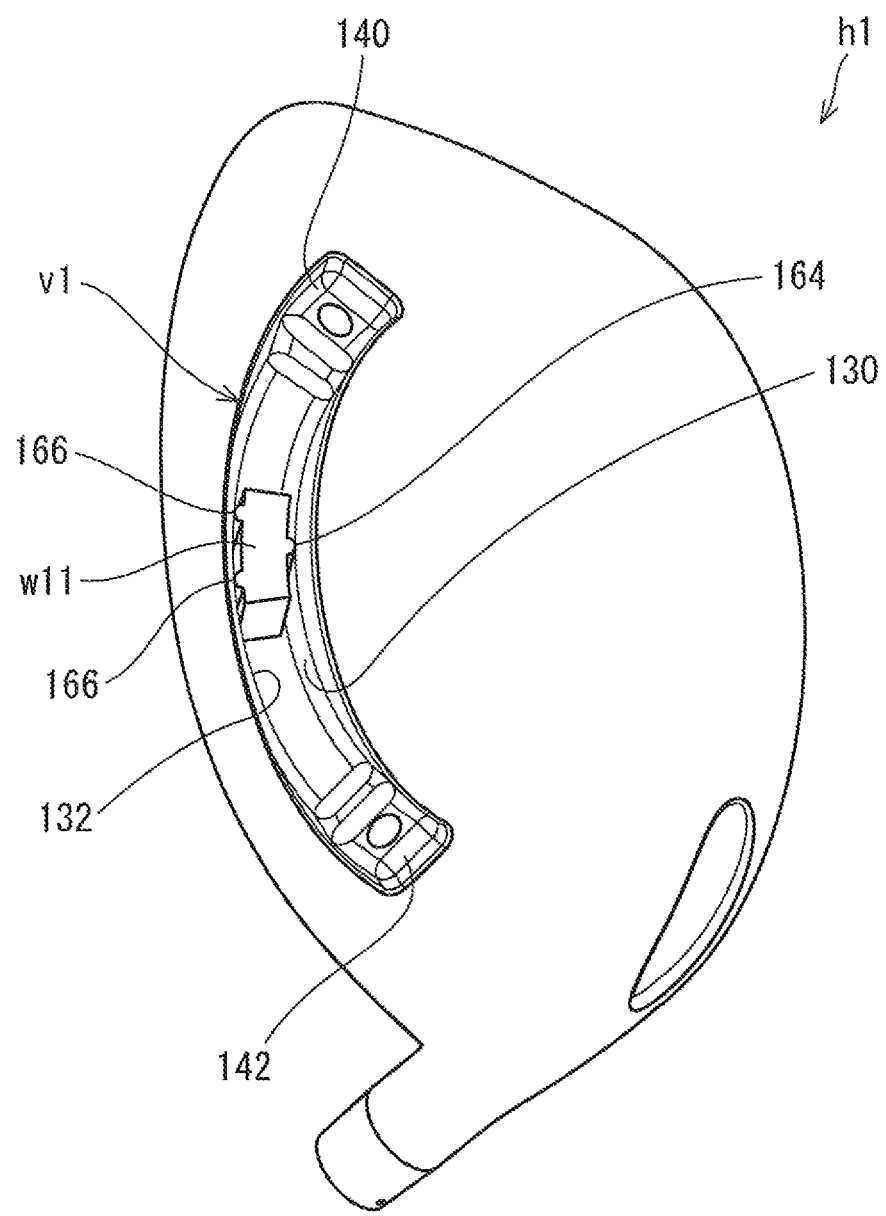
FIG. 9 is a perspective view showing a weight and a head body according to another modification example.

FIG. 9 shows a weight w11 according to another modification example. The weight w11 includes three projections.

A first projection is a first abutment portion 164. A second projection and a third projection are second abutment portions 166. The first abutment portion 164 abuts on the first slide portion 130 of the cavity v1. The abutment is achieved by a line contact or a point contact. The two second abutment portions 166 abut on the second slide portion 132 of the cavity v1. These abutments are achieved by a line contact or a point contact. Those abutments at three positions stabilize the posture of the weight w11 during the slide movement. The weight w11 can stably slide without rattling during the slide movement. The weight w11 that need not be brought into surface-to-surface contact with the cavity v1 has a high degree of freedom in its shape. The weight w11 does not require a high dimensional accuracy. The first slide portion 130 and the second slide portion 132 do not require a high dimensional accuracy, either.

Figure 10:
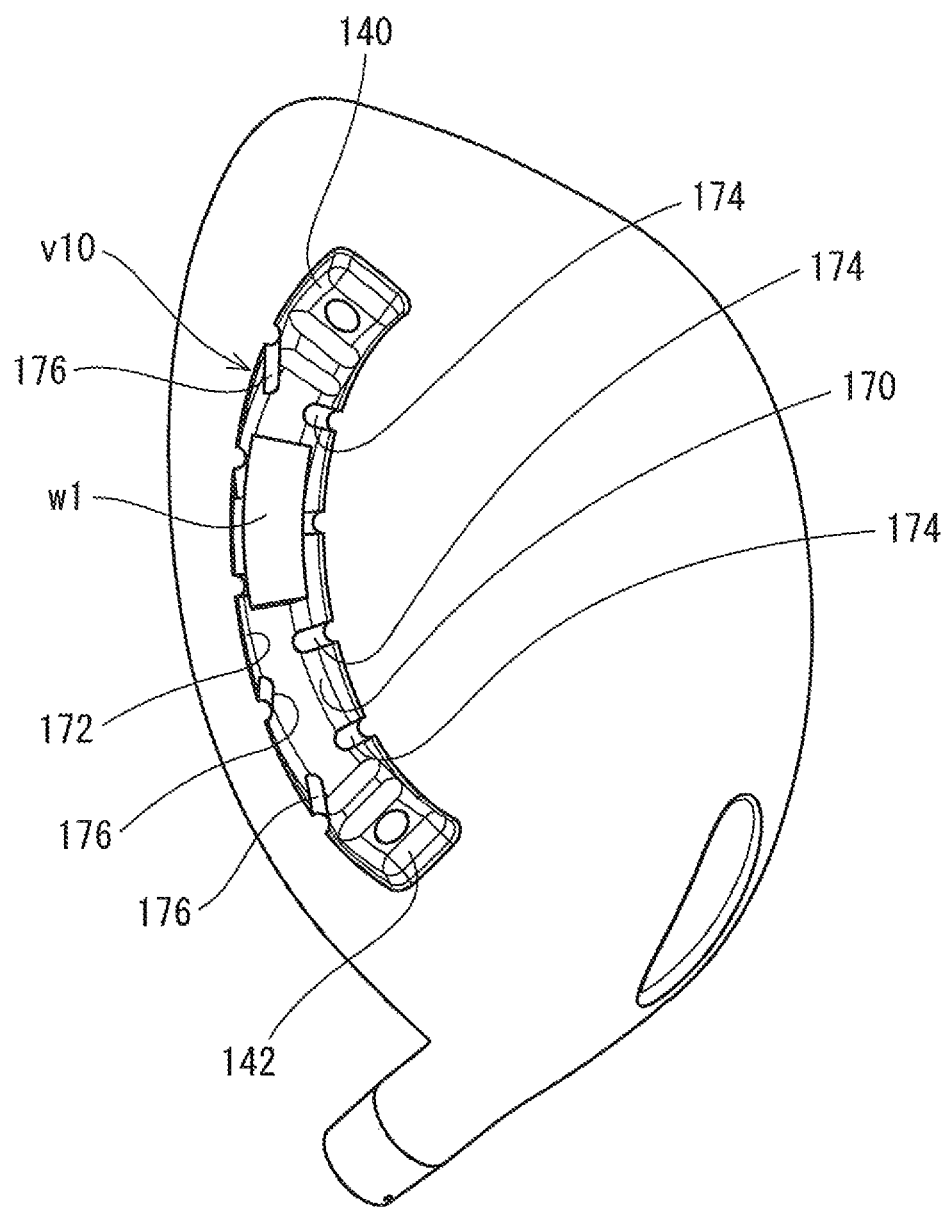
FIG. 10 is a perspective view showing a weight and a head body according to still another modification example.

FIG. 10 shows a cavity v10 according to a modification example. The cavity v10 includes a first extending portion 170 and a second extending portion 172. The first extending portion 170 and the second extending portion 172 constitute respective side surfaces of the cavity v10. The first extending portion 170 and the second extending portion 172 extend in the longitudinal direction (slide direction) of the cavity v10. The cavity v10 forms a groove. The first extending portion 170 forms a first side surface of the groove. The second extending portion 172 forms a second side surface of the groove.

The first extending portion 170 includes a plurality of projections 174. The plurality of projections 174 are distributed at different positions from each other in the longitudinal direction of the cavity v10. The projections 174 form a first slide portion. The second extension portion 172 includes a plurality of projections 176. The plurality of projections 176 are distributed at different positions from each other in the longitudinal direction of the cavity v10. The projections 176 form a second slide portion.

The weight w1 during the slide movement abuts on three projections selected from the projections 174 and the projections 176. The three projections include at least one projection 174 and at least one projection 176. The weight w1 abuts on such three projections even when the weight w1 is located at any positions within the entire movable range of the weight w1. The projections 174 and the projections 176 are arranged so that the weight w1 abuts on such three projections at any positions of the weight w1. When the weight w1 is moved, the weight w1 abuts on other projection(s). The abutments between the weight w1 and the projections 174 and 176 can be achieved by a line contact or a point contact.

The abutments at three positions stabilize the posture of the weight w1 during the slide movement. The weight w1 can stably slide without rattling during the slide movement. The weight w1 that need not be brought into surface-to-surface contact with the cavity v10 has a high degree of freedom in its shape. The cavity v10 does not require a high dimensional accuracy. The first slide portion 174 and the second slide portion 176 do not require a high dimensional accuracy, either.

Thus, the surface-to-surface contact between the weight and the cavity is not necessarily required. Therefore, the degree of dimensional accuracy required on the cavity and the weight can be reduced. When the surface-to-surface contact is adopted, smooth movement of the weight in sliding can be attained by reduction of contact pressures.

FIG. 11A is a perspective view of a cover c10 according to a modification example as viewed from outside. FIG. 11B is a perspective view of the cover c10 as shown from inside. FIG. 11C is a perspective view of a weight w12 used together with the cover c10. FIG. 11D is a perspective view showing an engaging state of the cover c10 with the weight w12. FIG. 11E is a cross-sectional view of the head taken along the longitudinal direction of the cover c10. Note that screw holes provided at end portions of the cover c10 are omitted to show in the drawings.

The cover c10 includes an inner surface 178 and an outer surface 179. The inner surface 178 of the cover c10 includes a plurality of recesses 180. Each recess 180 forms a concave curved surface. The recesses 180 are located at positions different from each other in the longitudinal direction of the cover c10. The recesses 180 are arranged at respective positions in the longitudinal direction of the cover c10 while being adjacent to one another. The recesses 180 are an example of a projection-recess engagement portion 182 provided on the inner surface of the cover c10. Alternatively, the projection-recess engagement portion 182 may be a plurality of projections. The recesses 180 and the projection-recess engagement portion 182 are examples of a cover engaging shape that engages with the weight w12 at a plurality of positions in the path of the slide movement of the weight w12. The cover engaging shape may be at least one recess or projection.

The weight w12 includes a projection 184. The upper surface of the weight w12 forms the projection 184. The projection 184 is an example of a weight engaging shape that engages the cover engaging shape when the cover c10 is in the closed state. Alternatively, the weight engaging shape 184 may be a recess.

The shape of the projection 184 corresponds to the shape of each recess 180. The projection 184 is engaged with each recess 180. The projection-recess engagement portion 182 is engaged with the weight engaging shape 184 at a plurality of positions different from each other in the longitudinal direction of the cover c10. This engagement enhances the advantageous effect of preventing the movement of the weight w12 by the cover c10.

The upper surface of the weight w12 forms the projection 184. The upper surface 184 of the weight w12 is a curved surface that upwardly projects. The lower surface 186 of the weight w12 is a curved surface that upwardly projects. The upper surface 184 has a curvature radius smaller than the curvature radius of the lower surface 186. Such a smaller curvature radius of the upper surface 184 enhances the effect of engaging with the recesses 180.

Second Embodiment

Figure 12:
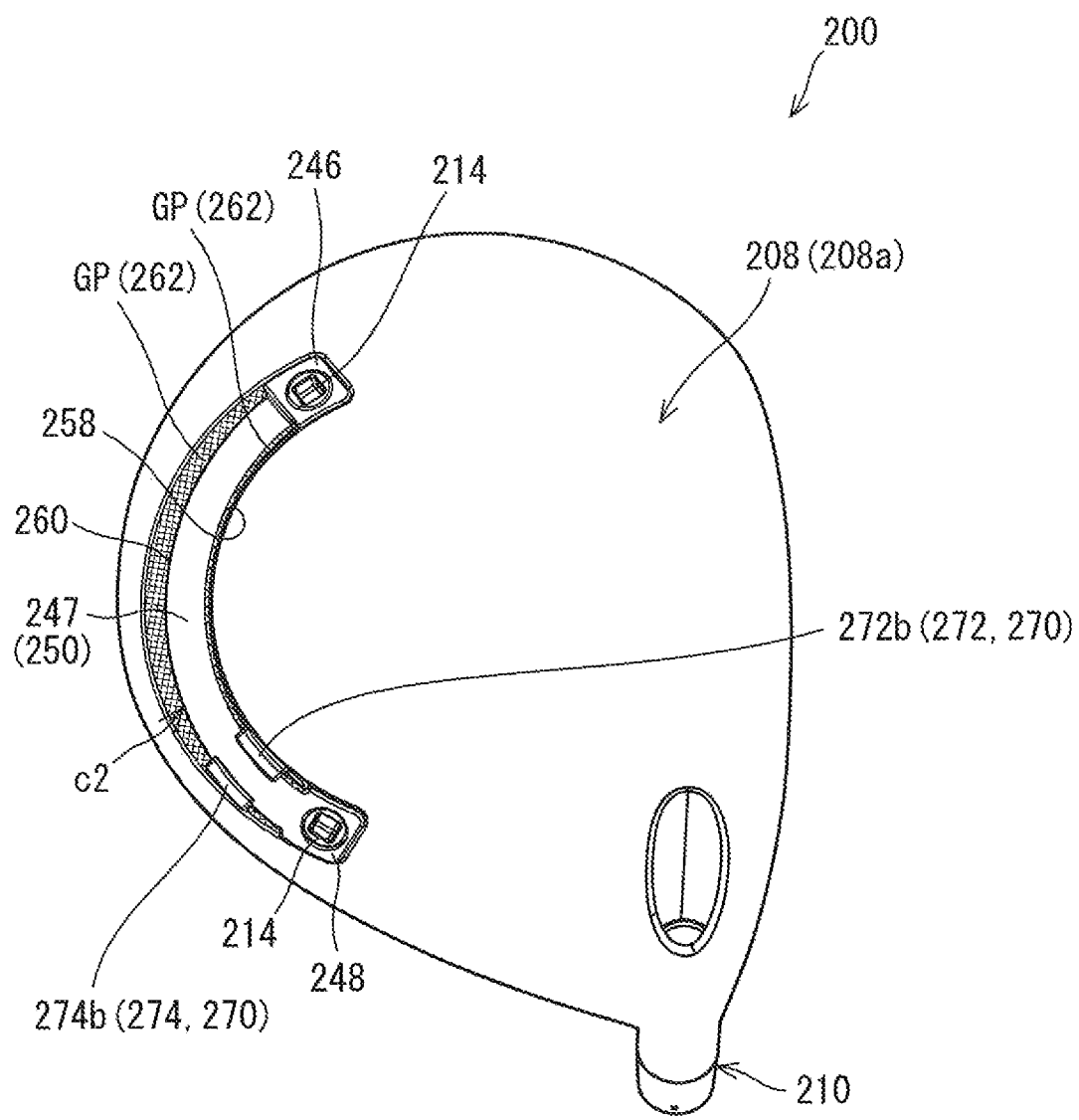
FIG. 12 is a bottom view of a head according to a second embodiment.
Figure 13:
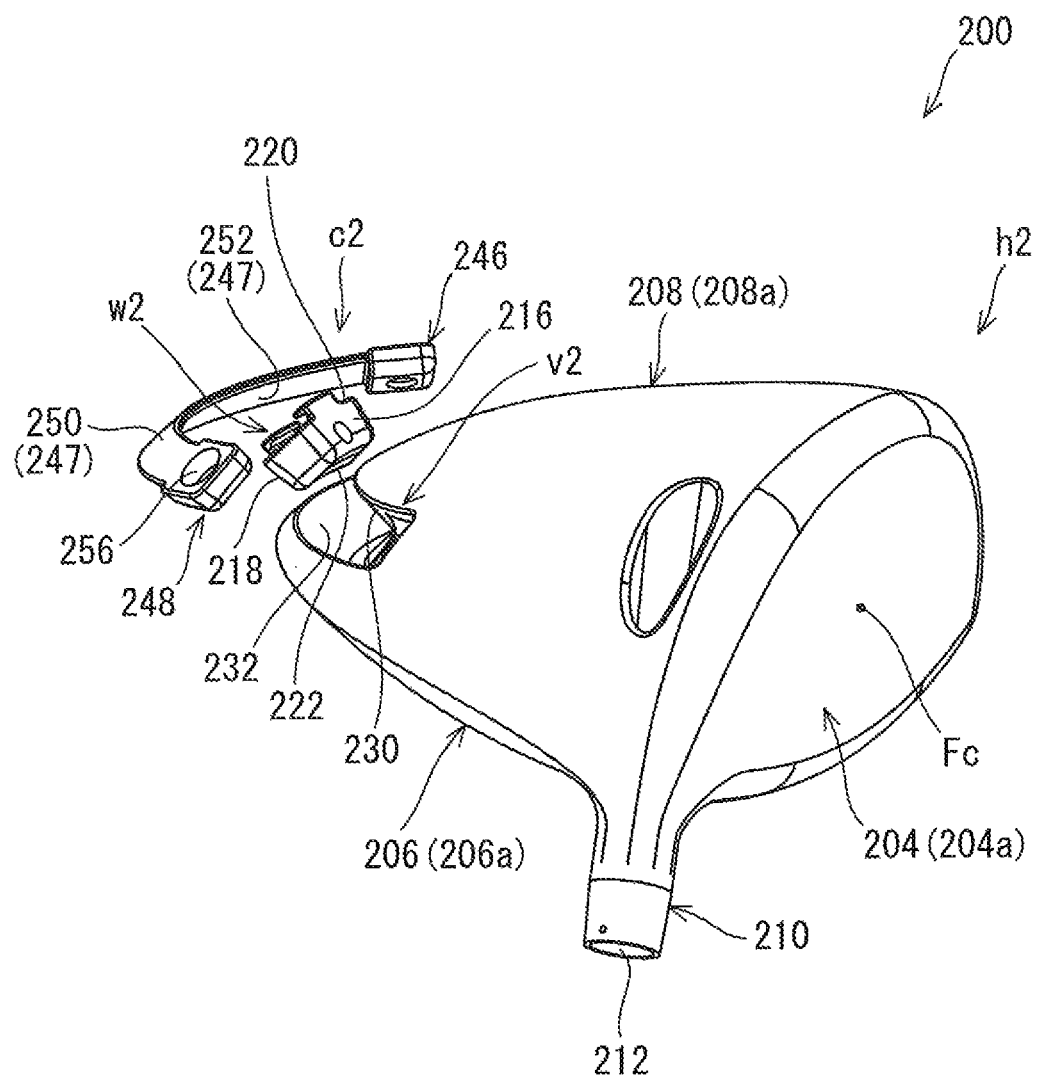
FIG. 13 is an exploded perspective view of the head according to the second embodiment.

FIG. 12 is a bottom view of a golf club head 200 according to the second embodiment as viewed from the sole side. FIG. 13 is an exploded perspective view of the head 200.

The head 200 includes a face portion 204, a crown portion 206, a sole portion 208, and a hosel portion 210. The face portion 204 includes a hitting face 204a. The hitting face 204a is the outer surface of the face portion 204. The hitting face 204a includes a face center Fc. The crown portion 206 includes a crown surface 206a. The crown surface 206a is the outer surface of the crown portion 206. The sole portion 208 includes a sole surface 208a. The sole surface 208a is the outer surface of the sole portion 208. The hosel portion 210 includes a hosel hole 212. The head 200 includes a hollow portion inside the head 200.

As shown in FIG. 13, the head 200 includes a head body h2, a weight w2, a cover c2 and screws 214 as cover attaching members (see FIG. 12). The head body h2 includes the face portion 204, the crown portion 206, the sole portion 208, and the hosel portion 210. The head body h2 is the same as the above-described head body h1.

The weight w2 includes a first abutment portion 216 and a second abutment portion 218. The first abutment portion 216 is a first side surface (first surface). The second abutment portion 218 is a second side surface (second surface). The weight w2 also includes an upper surface 220 and a bottom surface 222. The upper surface 220 is opposed to the inner surface 252 of the cover c2. The weight w2 has a weight. The specific gravity of the weight w2 is preferably greater than the specific gravity of the head body h2. The specific gravity of the weight w2 is preferably greater than the specific gravity of the cover c2. The weight w2 may be made of a metal, for example. This metal for the weight w2 preferably has a great specific gravity. Examples of the material of the weight w2 include iron-based alloys such as stainless steel, and tungsten-containing alloys such as tungsten nickel alloys.

The head body h2 includes a cavity v2. The cavity v2 is provided in the sole portion 208. There is no limitation on the position of the cavity v2.

As shown in FIG. 13, the cavity v2 includes a first slide portion 230 and a second slide portion 232. The first slide portion 230 and the second slide portion 232 form respective side surfaces of the cavity v2. The first slide portion 230 and the second slide portion 232 extend in the longitudinal direction (slide direction) of the cavity v2. The cavity v2 forms a groove. The first slide portion 230 forms a first side surface of the groove. The second slide portion 232 forms a second side surface of the groove.

Of the weight w2, portions other than a weight engaging portion 270 is accommodated in the cavity v2. The weight w2 can move inside the cavity v2 in a state where the weight w2 is accommodated in the cavity v2. The cavity v2 guides the movement of the weight w2. The cavity v2 is a slide groove that enables the weight w2 to slidingly move. The weight w2 moves in the longitudinal direction of the cavity v2.

FIG. 14A is a perspective view of the cover c2 as viewed from an outer surface side thereof. FIG. 14B is a perspective view of the cover c2 as viewed from an inner surface side thereof. FIG. 14C is a perspective view of the weight w2. FIG. 14D is an exploded perspective view of the weight w2. FIG. 14E is a perspective view showing an assembled state of the cover c2 and the weight w2.

The cover c2 includes an outer surface 250 and an inner surface 252. The outer surface 250 forms a part of the sole surface 208a. The inner surface 252 abuts on the weight w2. The cover c2 directly presses the weight w2.

The cover c2 includes a first hole 254 and a second hole 256. The first hole 254 and the second hole 256 are through holes. The first hole 254 is provided at a first end portion 246 of the cover c2. The second hole 256 is provided at a second end portion 248 of the cover c2. The first end portion 246 is fixed to the head body h2 with one screw 214. The second end portion 248 is fixed to the head body h2 with the other screw 214. The cover c2 includes an intermediate portion 247 located between the first end portion 246 and the second end portion 248. The width of the intermediate portion 247 is narrower than the width of the first end portion 246. The width of the intermediate portion 247 is narrower than the width of the second end portion 248.

The cover c2 includes a first edge 258 and a second edge 260. The first edge 258 and the second edge 260 are provided in the intermediate portion 247. The first edge 258 and the second edge 260 are respective side edges of the cover c2. The first edge 258 and the second edge 260 define the outline shape of the cover c2. The first edge 258 and the second edge 260 extend along the path of the slide movement of the weight w2.

The cover c2 which is in the closed state covers the cavity v2. In the present embodiment, the cover c2 covers a part of the cavity v2. As shown in FIG. 12, gaps GP are formed between the opening edge of the cavity v2 and the cover c2. The gaps GP are formed on respective sides of the cover c2 (intermediate portion 247) and extend in the extending direction of the cover c2. These gaps GP allows the below-descried weight engaging portion 270 (an upright wall 272a and an upright wall 274a) to be present.

These gaps GP may be filled with a gap filling member 262. The gap filling member 262 is shown using cross-hatching in FIG. 12. The gap filling member 262 can be provided in the cavity v2. Alternatively, the gap filling member 262 may be provided in the cover c2. The gap filling member 262 does not hamper the movement of the weight engaging portion 270. The gap filing member 262 is easily deformed by the weight engaging portion 270. Examples of the material of the gap filing member 262 include foamed plastics. Examples of the foamed plastics include a polyurethane foam and an EVA foam. "EVA" means an ethylene-vinyl acetate copolymer.

As shown in FIG. 14D, the weight w2 includes the weight engaging portion 270. The weight engaging portion 270 is projected from the main body of the weight w2 (from the upper surface 220 of the weight w2) toward the cover c2 side. The weight engaging portion 270 includes a first engaging portion 272 and a second engaging portion 274. The first engaging portion 272 includes the upright wall 272a that extends upward and a lateral wall 272b that extends from the upper end of the upright wall 272a toward the second engaging portion 274 side. The second engaging portion 274 includes an upright wall 274a that extends upward and a lateral wall 274b that extends from the upper end of the upright wall 274a toward the first engaging portion 272 side.

When the weight w2 is attached to the cover c2, the cover c2 (intermediate portion 247) is sandwiched between the first engaging portion 272 and the second engaging portion 274. The cover c2 (intermediate portion 247) is sandwiched between the upright wall 272a and the upright wall 274a in a lateral direction. The cover c2 (intermediate portion 247) is sandwiched between the lateral wall 272b and the main body (upper surface 220) of the weight w2 in an upright direction, and is sandwiched between the lateral wall 274b and the main body (upper surface 220) of the weight w2 in the upright direction.

The weight engaging portion 270 is engaged with the cover c2. The weight engaging portion 270 includes the first engaging portion 272 and the second engaging portion 274. The first engaging portion 272 is engaged with the first edge 258 of the cover c2. The second engaging portion 274 is engaged with the second edge 260 of the cover c2. The first edge 258 and the second edge 260 are cover engaging portions.

The weight w2 includes a portion(s) positioned outside with respect to the cover c2. The lateral wall 272b and the lateral wall 274b are the portions positioned outside with respect to the cover c2 (see FIG. 12). The lateral wall 272b and the lateral wall 274b are positioned on the upper side (outside) of the upper surface 250 of the cover c2.

The weight w2 includes a portion visually recognizable from outside the head 200. The weight engaging portion 270 (the lateral wall 272b and the lateral wall 274b) is the portion visually recognized from outside (see FIG. 12). The weight w2 includes a portion exposed to the outside of the head 200. The weight engaging portion 270 (the lateral wall 272b and the lateral wall 274b) is the portion exposed to the outside.

In the present embodiment, the first slide portion 230 and the second slide portion 232 are slide surfaces. The first slide portion 230 abuts on the first abutment portion 216 of the weight w2. The second slide portion 232 abuts on the second abutment portion 218 of the weight w2. The weight w2 slidingly moves while being guided by the cavity v2 (the first slide portion 230 and the second slide portion 232). A slide mechanism (first slide mechanism) is formed between the cavity v2 and the weight w2. A prevention mechanism that prevents the slide movement of the weight w2 is not present between the cavity v2 and the weight w2.

The engagement between the cover c2 and the weight w2 also serves as a slide mechanism (second slide mechanism). From the viewpoint of not hampering the movement of the first slide mechanism, a play (clearance) is preferably provided between the weight engaging portion 270 and the cover c2 (intermediate portion 247).

As shown in FIG. 14D, the weight w2 is constituted by three members. The weight w2 has a divided structure. The weight w2 includes a first divisional body 280 and a second divisional body 282. The weight w2 further includes a connecting member 284. The connecting member 284 is a screw. The connecting member 284 connects the first divisional body 280 and the second divisional body 282. The weight w2 is attached to the cover c2 by connecting the first divisional body 280 and the second divisional body 282 in such a manner that the cover c2 (intermediate portion 247) is sandwiched between the first divisional body 280 and the second divisional body 282.

The weight w2 is attached to the cover c2, and is not separated apart from the cover c2. The weight w2 cannot solely fall off. As long as the cover c2 is attached to the head body h2, the weight w2 does not fall off. In the head 200, falling off of the weight w2 is prevented.

When the cover c2 is in the closed state, the movement of the weight w2 in the cavity v2 is prevented. The closed state is attained by appropriately tightening the screws 214. The cover c2 presses the weight w2 directly or indirectly. In the present embodiment, the cover c2 directly presses the weight w2. This pressing increases static frictional force generated between the weight w2 and portions abutting on the weight w2. The pressing by the cover c2 effectively prevents the slide movement of the weight w2. The closed state can be released by loosening the screws 214. The weight w2 can slidingly move by releasing the closed state. The weight w2 can be moved without the need to detach the cover c2 from the head body h2.

Third Embodiment

Figure 15:
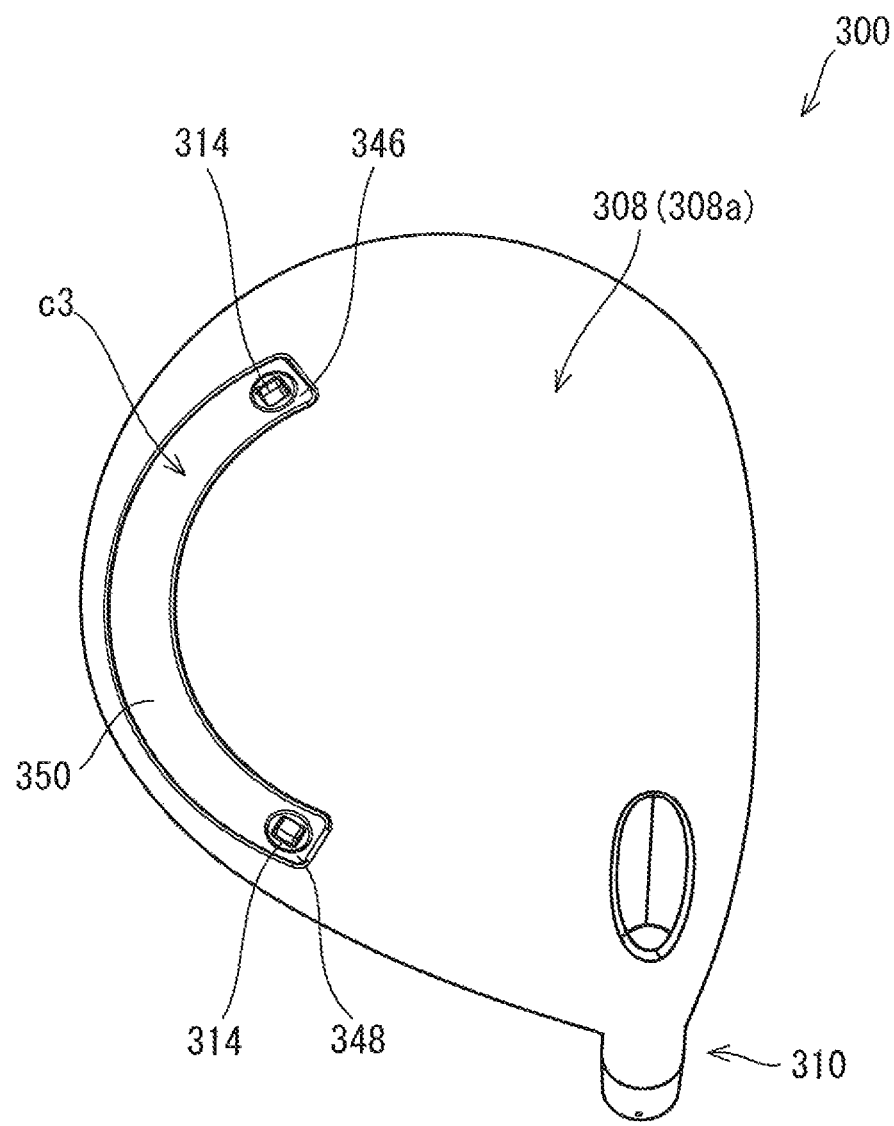
FIG. 15 is a bottom view of a head according to a third embodiment.
Figure 16:
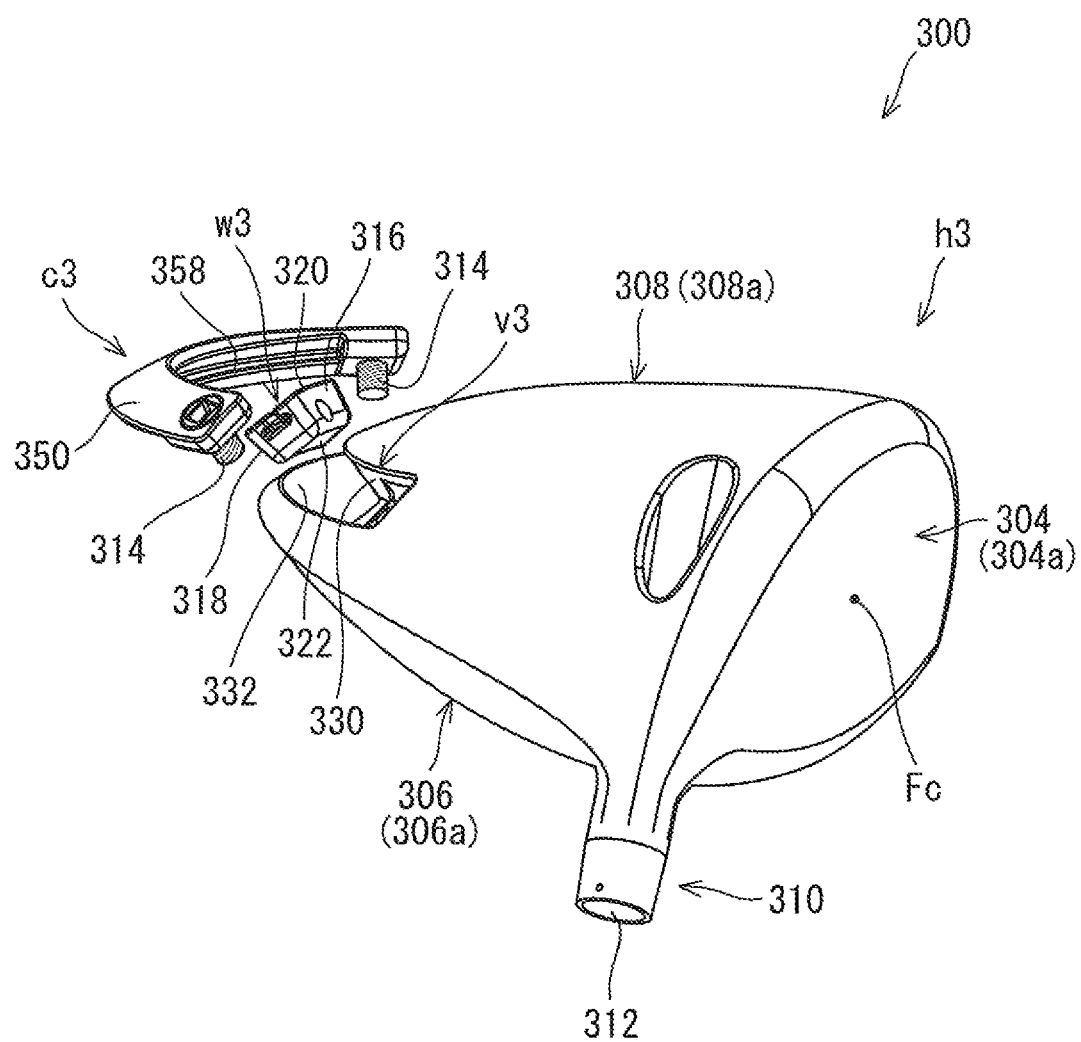
FIG. 16 is an exploded perspective view of the head according to the third embodiment.

FIG. 15 is a bottom view of a golf club head 300 according to the third embodiment as viewed from the sole side. FIG. 16 is an exploded perspective view of the head 300.

The head 300 includes a face portion 304, a crown portion 306, a sole portion 308, and a hosel portion 310. The face portion 304 includes a hitting face 304a. The hitting face 304a is the outer surface of the face portion 304. The hitting face 304a includes a face center Fc. The crown portion 306 includes a crown surface 306a. The crown surface 306a is the outer surface of the crown portion 306. The sole portion 308 includes a sole surface 308a. The sole surface 308a is the outer surface of the sole portion 308. The hosel portion 310 includes a hosel hole 312. The head 300 includes a hollow portion inside the head 300.

As shown in FIG. 16, the head 300 includes a head body h3, a weight w3, a cover c3 and screws 314 as cover attaching members. The head body h3 includes the face portion 304, the crown portion 306, the sole portion 308, and the hosel portion 310. The head body h3 is the same as the above-described head body h1.

The weight w3 includes a first abutment portion 316 and a second abutment portion 318. The first abutment portion 316 is a first side surface (first surface). The second abutment portion 318 is a second side surface (second surface). The weight w3 also includes an upper surface 320 and a bottom surface 322.

The head body h3 includes a cavity v3. The cavity v3 is provided in the sole portion 308. There is no limitation on the position of the cavity v3.

As shown in FIG. 16, the cavity v3 includes a first slide portion 330 and a second slide portion 332. The first slide portion 330 and the second slide portion 332 form respective side surfaces of the cavity v3. The first slide portion 330 and the second slide portion 332 extend in the longitudinal direction (slide direction) of the cavity v3. The cavity v3 forms a groove. The first slide portion 330 forms a first side surface of the groove. The second slide portion 332 forms a second side surface of the groove.

A lower portion of the weight w3 is accommodated in the cavity v3. The weight w3 can move inside the cavity v3 in a state where the weight w3 is accommodated in the cavity v3. The cavity v3 guides the movement of the weight w3. The weight w3 can slide in the cavity v3. The cavity v3 is a slide groove that enables the weight w3 to slidingly move. The weight w3 moves in the longitudinal direction of the cavity v3.

Figure 17A:
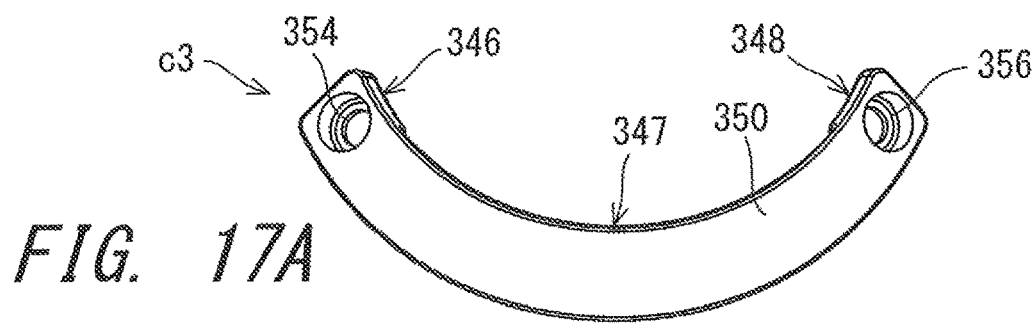
FIG. 17A is a perspective view of a cover according to the third embodiment as viewed from outside.
Figure 17B:
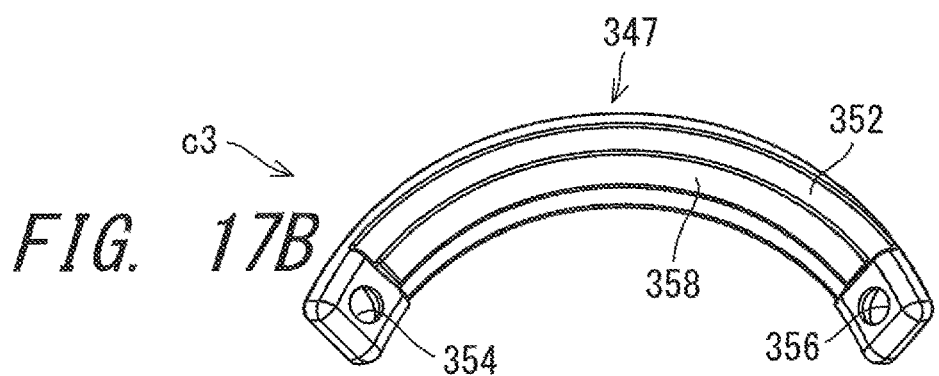
FIG. 17B is a perspective view of the cover as viewed from inside.
Figure 17C:
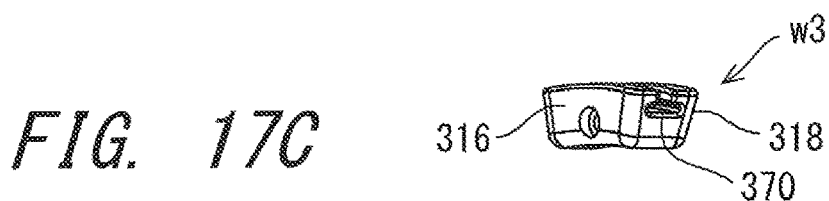
FIG. 17C is a perspective view showing a weight that is used together with the cover.
Figure 17D:
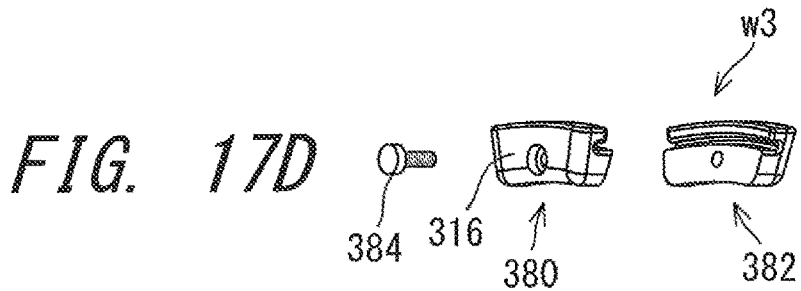
FIG. 17D is an exploded perspective view of the weight.
Figure 17E:
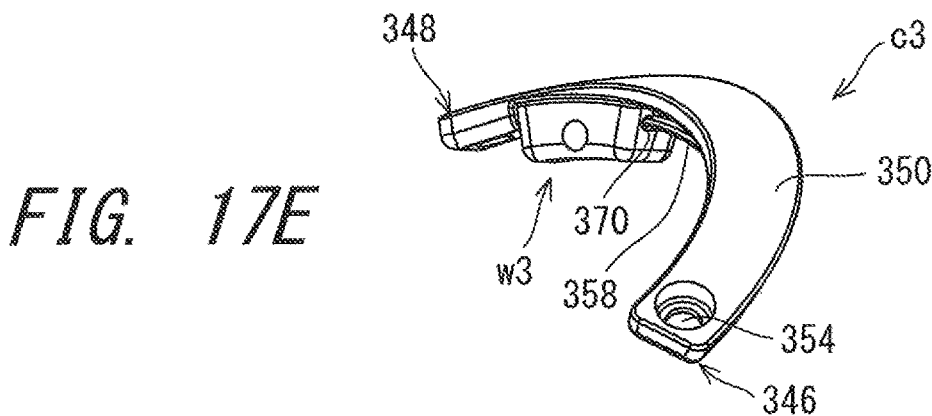
FIG. 17E is a perspective view showing a state where the weight is attached to the cover.

FIG. 17A is a perspective view of the cover c3 as viewed from an outer surface side thereof. FIG. 17B is a perspective view of the cover c3 as viewed from an inner surface side thereof. FIG. 17C is a perspective view of the weight w3. FIG. 17D is an exploded perspective view of the weight w3. FIG. 17E is a perspective view showing an assembled state of the cover c3 and the weight w3.

The cover c3 includes an outer surface 350 and an inner surface 352. The outer surface 350 forms a part of the sole surface 308a. The inner surface 352 abuts on the weight w3. The cover c3 directly presses the weight w3.

The cover c3 includes a first hole 354 and a second hole 356. The first hole 354 and the second hole 356 are through holes. The first hole 354 is provided at a first end portion 346 of the cover c3. The second hole 356 is provided at a second end portion 348 of the cover c3. The first end portion 346 is fixed to the head body h2 with one screw 314. The second end portion 348 is fixed to the head body h3 with the other screw 314. The cover c3 includes an intermediate portion 347 located between the first end portion 346 and the second end portion 348. The width of the intermediate portion 347 is the same as the width of the first end portion 346 and the width of the second end portion 348.

The cover c3 includes a cover engaging portion 358. The cover engaging portion 358 is provided on the inner surface 352. The cover engaging portion 358 is protruded from the inner surface 352. The cover engaging portion 358 is provided in the intermediate portion 347. The cover engaging portion 358 extends along the cover c3. The cover engaging portion 358 forms a protruded portion that is engaged with the weight w3 when the weight w3 is located at any positions within the range of the slide movement of the weight w3. The cover engaging portion 358 extends along the path of the slide movement of the weight w3. The cover engaging portion 358 has a T-shaped cross-section.

The cover c3 which is in the closed state covers the cavity v3. In the present embodiment, the cover c3 covers the entirety of the cavity v3.

As shown in FIG. 17D, the weight w3 includes a weight engaging portion 370. The weight engaging portion 370 is formed on the upper surface (surface on the cover c3 side) of the weight w3. The weight engaging portion 370 has a cross-sectional shape that corresponds to the shape of the cover engaging portion 358. The weight engaging portion 370 has a T-shaped cross-section (upside-down T shape). The cross-sectional shape of the weight engaging portion 370 is not limited to T-shape. For example, the cross-sectional shape of the weight engaging portion 370 may be L-shape (upside-down L shape).

The weight engaging portion 370 is engaged with the cover c3. The weight engaging portion 370 is engaged with the cover engaging portion 358 of the cover c3. The weight engaging portion 370 is a slide groove. The cover engaging portion 358 is a slide rail.

The weight w3 is hidden by the cover c3. The weight w3 is not visually recognized from outside. The weight w3 does not have a portion that is exposed to the outside of the head 300.

In the present embodiment, the first slide portion 330 and the second slide portion 332 are slide surfaces. The first slide portion 330 abuts on the first abutment portion 316 of the weight w3. The second slide portion 332 abuts on the second abutment portion 318 of the weight w3. The weight w3 slidingly moves while being guided by the cavity v3 (the first slide portion 330 and the second slide portion 332). A slide mechanism is formed between the cavity v3 and the weight w3. A prevention mechanism that prevents the slide movement of the weight w3 is not present between the cavity v3 and the weight w3.

As shown in FIG. 17D, the weight w3 is constituted by three members. The weight w3 has a divided structure. The weight w3 includes a first divisional body 380 and a second divisional body 382. The weight w3 further includes a connecting member 384. The connecting member 384 is a screw. The connecting member 384 connects the first divisional body 380 and the second divisional body 382. The weight w3 is attached to the cover c3 by connecting the first divisional body 380 and the second divisional body 382 in such a manner that the cover engaging portion 358 is sandwiched between the first divisional body 380 and the second divisional body 382.

The weight w3 is attached to the cover c3, and is not separated apart from the cover c3. The weight w3 cannot solely fall off. As long as the cover c3 is attached to the head body h3, the weight w3 does not fall off. In the head 300, falling off of the weight w3 is prevented.

When the cover c3 is in the closed state, the cover c3 presses the weight w3. This pressing force prevents the movement of the weight w3 in the cavity v3. The closed state is attained by appropriately tightening the screws 314. The cover c3 directly presses the weight w3. This pressing force increases static frictional force generated between the weight w3 and portions abutting on the weight w3. The pressing by the cover c3 effectively prevents the slide movement of the weight w3. The closed state is released by loosening the screws 314. The weight w3 can slidingly move when the cover c3 is in the opened state.

Fourth Embodiment

Figure 18:
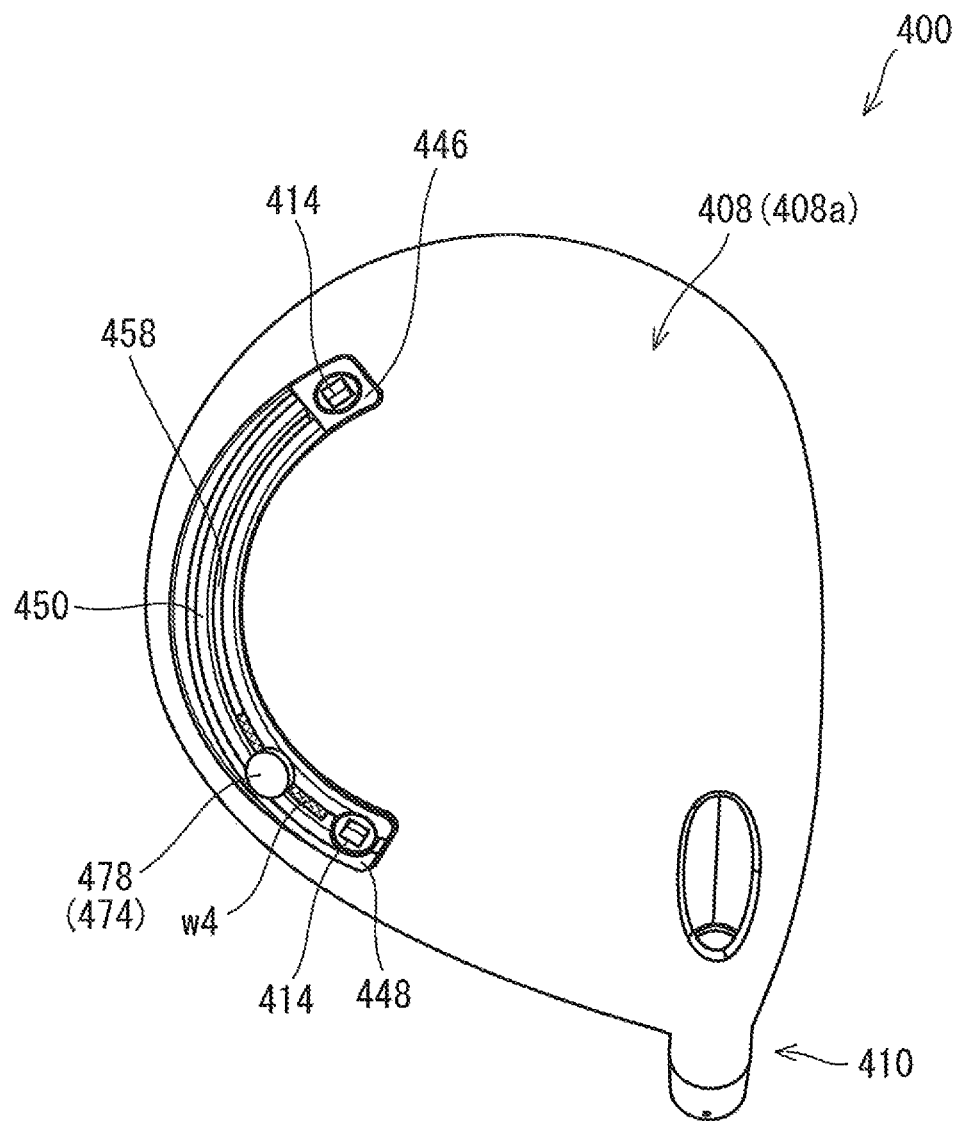
FIG. 18 is a bottom view of a head according to a fourth embodiment.
Figure 19:
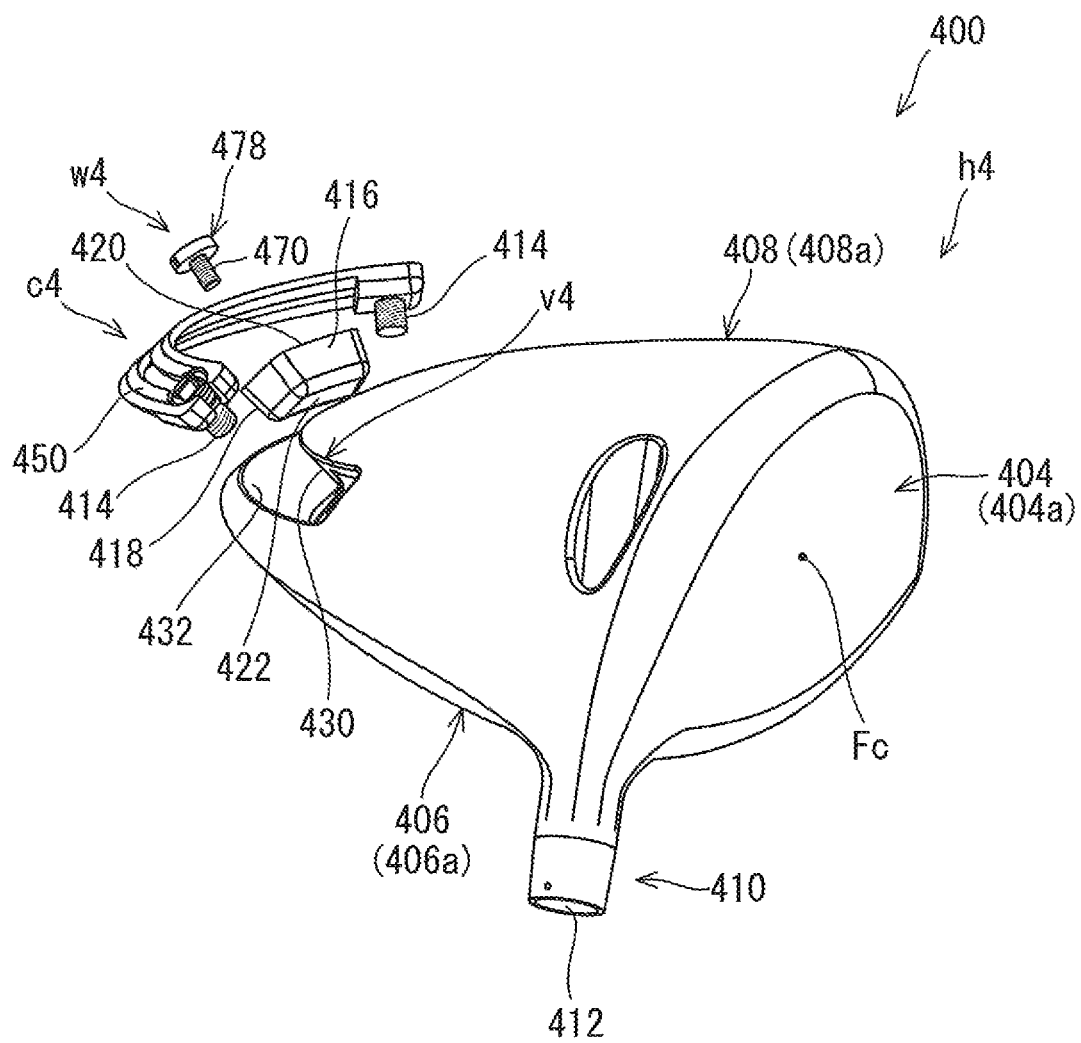
FIG. 19 is an exploded perspective view of the head according to the fourth embodiment.

FIG. 18 is a bottom view of a golf club head 400 according to the fourth embodiment as viewed from the sole side. FIG. 19 is an exploded perspective view of the head 400.

The head 400 includes a face portion 404, a crown portion 406, a sole portion 408, and a hosel portion 410. The face portion 404 includes a hitting face 404a. The hitting face 404a is the outer surface of the face portion 404. The hitting face 404a includes a face center Fc. The crown portion 406 includes a crown surface 406a. The crown surface 406a is the outer surface of the crown portion 406. The sole portion 408 includes a sole surface 408a. The sole surface 408a is the outer surface of the sole portion 408. The hosel portion 410 includes a hosel hole 412. The head 400 includes a hollow portion inside the head 400.

As shown in FIG. 19, the head 400 includes a head body h4, a weight w4, a cover c4 and screws 414 as cover attaching members. The head body h4 includes the face portion 404, the crown portion 406, the sole portion 408, and the hosel portion 410. The head body h4 is the same as the above-described head body h1.

The weight w4 includes a first abutment portion 416 and a second abutment portion 418. The first abutment portion 416 is a first side surface (first surface). The second abutment portion 418 is a second side surface (second surface). The weight w4 also includes an upper surface 420 and a bottom surface 422.

The head body h4 includes a cavity v4. The cavity v4 is provided in the sole portion 408. There is no limitation on the position of the cavity v4.

As shown in FIG. 19, the cavity v4 includes a first slide portion 430 and a second slide portion 432. The first slide portion 430 and the second slide portion 432 form respective side surfaces of the cavity v4. The first slide portion 430 and the second slide portion 432 extend in the longitudinal direction (slide direction) of the cavity v4. The cavity v4 forms a groove. The first slide portion 430 forms a first side surface of the groove. The second slide portion 432 forms a second side surface of the groove.

A main body 480 of the weight w4 is accommodated in the cavity v4. The weight w4 can move inside the cavity v4 in a state where the weight w4 is accommodated in the cavity v4. The cavity v4 guides the movement of the weight w4. The weight w4 can slide in the cavity v4. The cavity v4 is a slide groove that enables the weight w4 to slidingly move. The weight w4 moves in the longitudinal direction of the cavity v4.

Figure 20A:
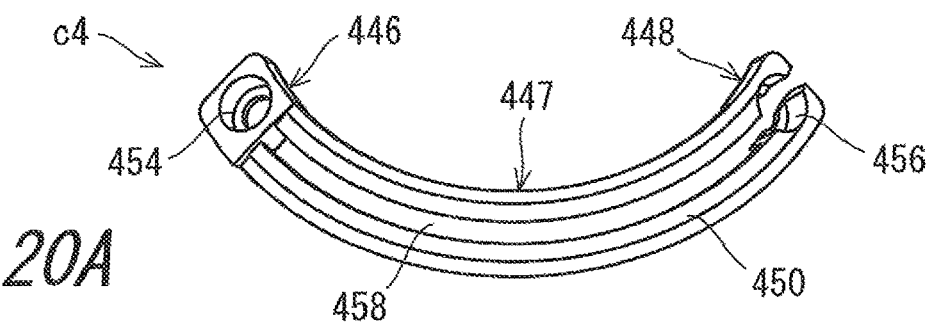
FIG. 20A is a perspective view of a cover according to the fourth embodiment as viewed from outside.
Figure 20B:
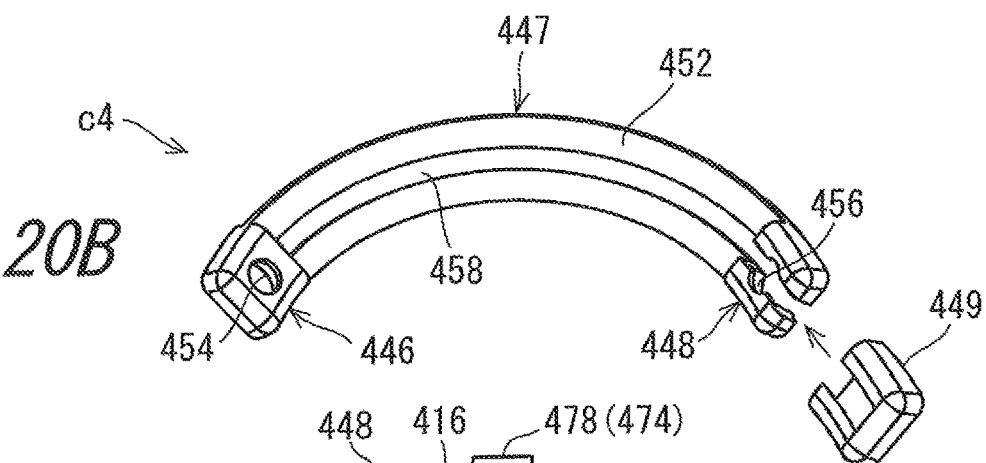
FIG. 20B is a perspective view of the cover as viewed from inside.
Figure 20C:
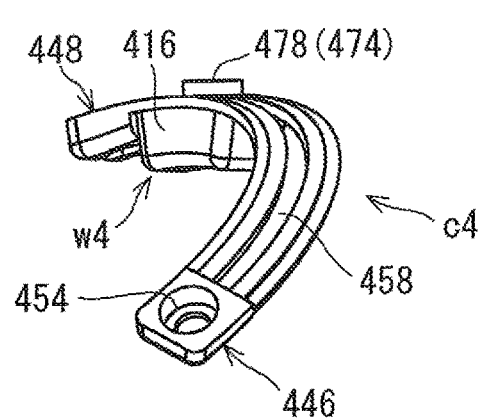
FIG. 20C is a perspective view showing a state where the weight is attached to the cover.
Figure 20D:
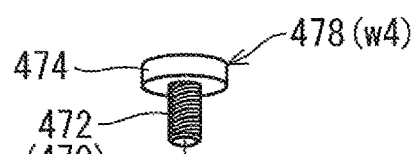
FIG. 20D is an exploded perspective view of the cover and the weight.
Figure 20D:
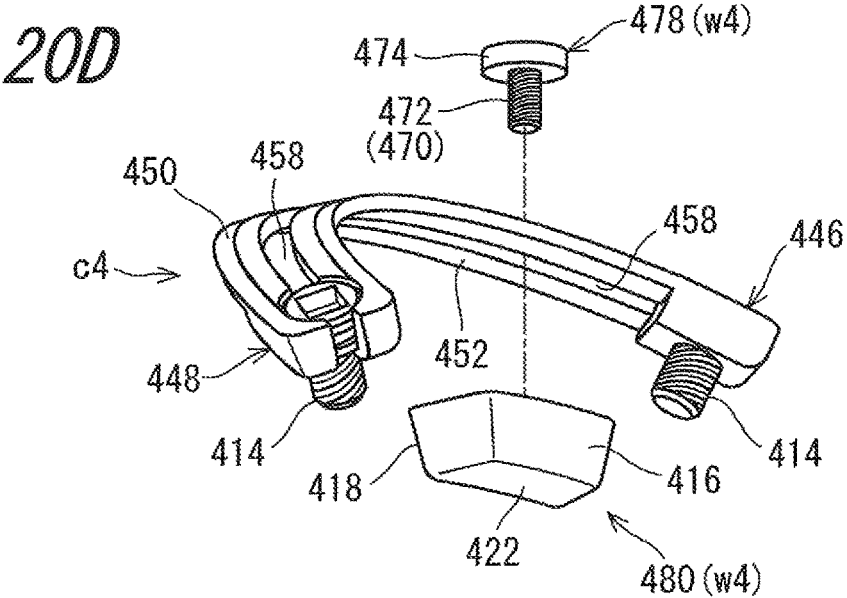

FIG. 20A is a perspective view of the cover c4 as viewed from an outer surface side thereof. FIG. 20B is a perspective view of the cover c4 as viewed from an inner surface side thereof. FIG. 20C is a perspective view showing an assembled state of the cover c4 and the weight w4. FIG. 20D is an exploded perspective view showing a structure for attaching the weight w4 to the cover c4.

The cover c4 includes an outer surface 450 and an inner surface 452. The outer surface 450 forms a part of the sole surface 408a. The inner surface 452 abuts on the weight w4. The cover c4 directly presses the weight w4.

The cover c4 includes a first hole 454 and a second hole 456. The first hole 454 and the second hole 456 are through holes. As shown in FIG. 20A, however, the second hole 456 is divided into two parts. The first hole 454 is provided at a first end portion 446 of the cover c4. The second hole 456 is provided at a second end portion 448 of the cover c4. The first end portion 446 is fixed to the head body h4 with one screw 414. The second end portion 448 is fixed to the head body h4 with the other screw 414. The cover c4 includes an intermediate portion 447 located between the first end portion 446 and the second end portion 448. The width of the intermediate portion 447 is the same as the width of the first end portion 446 and the width of the second end portion 448. The thickness of the intermediate portion 447 is smaller than the thickness of the first end portion 446 and the thickness of the second end portion 448.

The cover c4 includes a cover engaging portion 458. The cover engaging portion 458 is a slit. The cover engaging portion 458 penetrates through the cover c4 in the thickness direction of the cover c4. The cover engaging portion 458 is provided over the entire length of the cover c4 excluding the first end portion 446. The cover engaging portion 458 is formed along the longitudinal direction of the cover c4. The cover engaging portion 458 extends along the path of the slide movement of the weight w4. The cover engaging portion 458 divides the intermediate portion 447 into two parts. The cover engaging portion 458 divides the second end portion 448 into two parts. The cover engaging portion 458 is opened at the second end portion 448. As shown in FIG. 20B, a closing member 449 may be provided to close the opened end portion 448. The screw 414 in the second end portion 448 also serves as a closing member that closes the opened end portion 448. The closing members prevent the weight w4 from falling off the cover c4. Note that the cover engaging portion 458 does not have to divide the second end portion 448 into two parts. As in the present embodiment, when the weight w4 is divided into two members, the weight w4 can be attached to the cover engaging portion 458 at the intermediate portion 447 (see FIG. 20D). Therefore, the end portion of the cover engaging portion 458 does not have to be opened.

The cover c4 which is attached to the head body h4 and is in the closed state covers the cavity v4. In the present embodiment, the cover c4 does not cover the entirety of the cavity v4. The cover c4 covers a part of the cavity v4. The cover engaging portion 458 forms a portion of the cover c4 that does not cover the cavity v4.

As shown in FIG. 18, FIG. 20C and FIG. 20D, the weight w4 includes a weight engaging portion 470. The weight engaging portion 470 is a screw. The weight engaging portion 470 is fixed to the main body 480 of the weight w4. The weight engaging portion 470 is screwed into the main body 480 of the weight w4.

The weight engaging portion 470 includes an insertion portion 472 that is inserted into the cover engaging portion 458, and an exposed portion 474 that is exposed to the outside of the cover c4. The insertion portion 472 is a shaft portion of the screw. The insertion portion 472 includes a male screw portion. The exposed portion 474 is a head portion of the screw. The exposed portion 474 has dimensions that cannot pass through the cover engaging portion 458.

The weight engaging portion 470 is engaged with the cover c4. The weight engaging portion 470 is engaged with the cover engaging portion 458 of the cover c4. The weight engaging portion 470 is a sliding projection. The cover engaging portion 458 is a slide groove.

As well shown in FIG. 18, the exposed portion 474 of the weight w4 is not hidden by the cover c4. The exposed portion 474 of the weight w4 is visually recognized from outside.

In the present embodiment, the first slide portion 430 and the second slide portion 432 are slide surfaces. The first slide portion 430 abuts on the first abutment portion 416 of the weight w4. The second slide portion 432 abuts on the second abutment portion 418 of the weight w4. The weight w4 slidingly moves while being guided by the cavity v4 (the first slide portion 430 and the second slide portion 432). A slide mechanism is formed between the cavity v4 and the weight w4. A prevention mechanism that prevents the slide movement of the weight w4 is not present between the cavity v4 and the weight w4.

As well shown in FIG. 20D, the weight w4 is constituted by two members. The weight w4 is constituted by a weight main body 480 and a member 478 that forms the weight engaging portion 470. The member 478 is a screw. The screw 478 is screw-connected to the weight main body 480 to form the weight w4. The weight w4 can be attached to the cover c4 by attaching the weight engaging portion 470 to the weight main body 480 with the insertion portion 472 (shaft portion) passing through the cover engaging portion 458 (see FIG. 20D). Alternatively, since the cover engaging portion 458 is opened toward the second end portion 448 side (see FIG. 20A), the weight w4 can be attached to the cover c4 in a state where the weight engaging portion 470 is connected to the weight main body 480. That is, the weight w4 can be attached to/detached from the cover c4 without the need to disassemble the weight w4.

The weight w4 is attached to the cover c4. The weight w4 cannot be separated apart from the cover c4 as long as the end portion of the cover engaging portion 458 is not opened. As long as the second end portion 448 is attached to the head body h4, the end portion of the cover engaging portion 458 cannot be opened and the weight w4 does not fall off the cover c4.

When the cover c4 is in the closed state, the movement of the weight w4 in the cavity v4 is prevented. This closed state is attained by appropriately tightening the screws 414. The cover c4 directly presses the weight w4. This pressing increases static frictional force generated between the weight w4 and portions abutting on the weight w4. The pressing by the cover c4 effectively prevents the slide movement of the weight w4. The closed state can be released by loosening the screws 414. The weight w4 can slidingly move by releasing the closed state. The weight w4 can be moved without the need to detach the cover c4 from the head body h4.

Fifth Embodiment

Figure 21A:
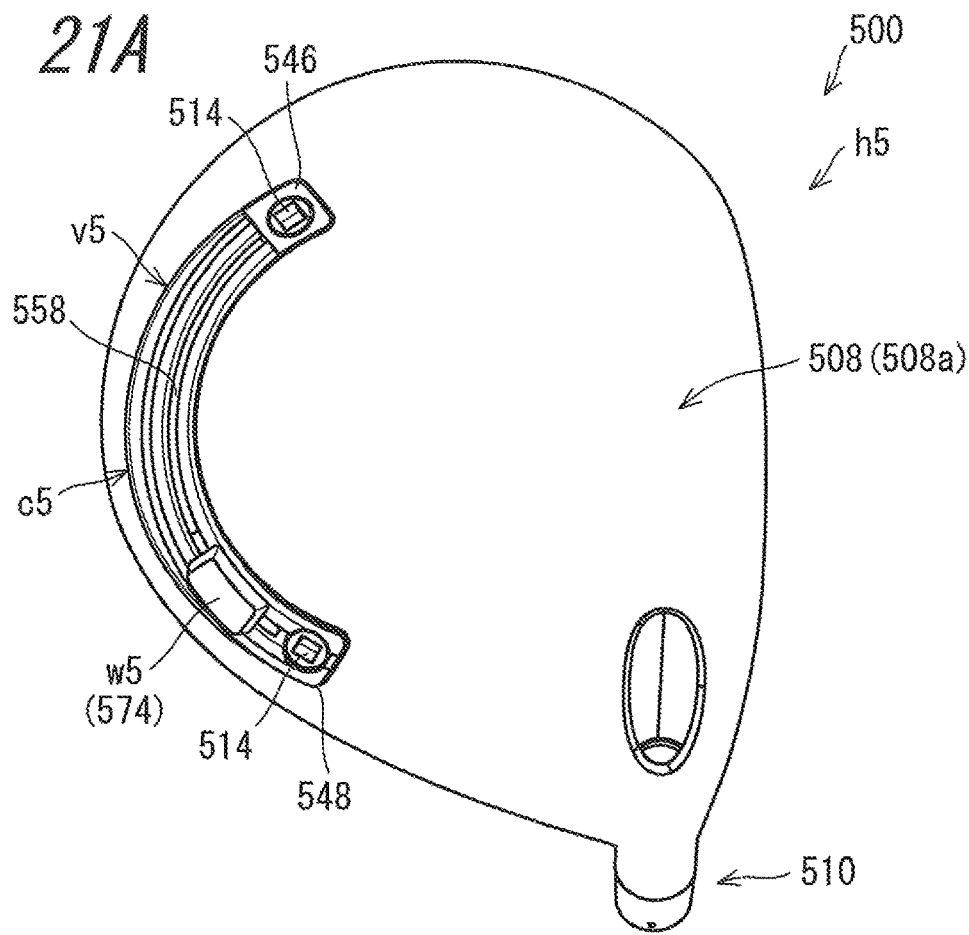
FIG. 21A is a bottom view of a head according to a fifth embodiment.
Figure 21B:
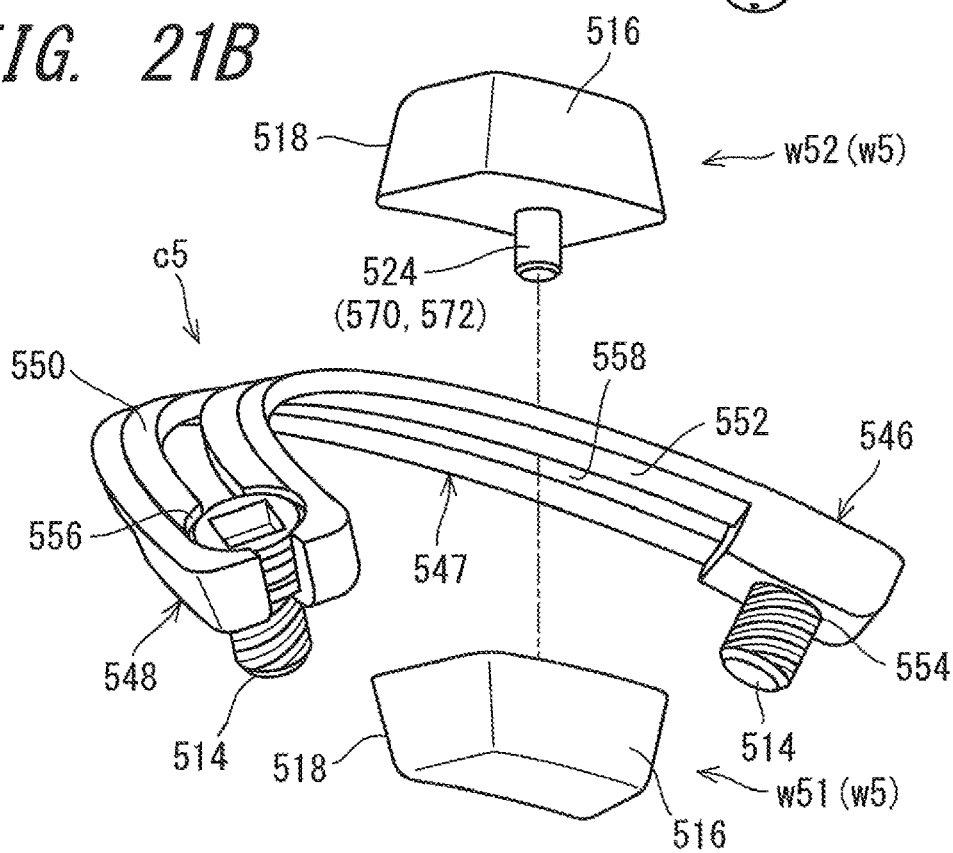
FIG. 21B is an exploded perspective view of a cover and a weight according to the fifth embodiment.

FIG. 21A is a bottom view of a golf club head 500 according to the fifth embodiment as viewed from the sole side. FIG. 21B is an exploded perspective view showing a weight w5 and a cover c5 of the head 500.

The head 500 includes a face portion and a crown portion, which are not shown in the drawings, and a sole portion 508 and a hosel portion 510. The sole portion 508 includes a sole surface 508a. The sole surface 508a is the outer surface of the sole portion 508. The head 500 includes a head body h5, the weight w5, the cover c5 and screws 514 as cover attaching members. The head body h5 is the same as the above-described head body h1.

As shown in FIG. 21B, the weight w5 includes a first portion w51 and a second portion w52. The weight w5 further includes a connection part 524 that connects the first portion w51 and the second portion w52.

The external shape of the first portion w51 is the same as the external shape of the second portion w52. The first portion w51 includes a first abutment portion 516 and a second abutment portion 518. The second portion w52 also includes a first abutment portion 516 and a second abutment portion 518.

The weight w5 is usable both when it is placed right side up and upside down. The weight w5 functions in either state where the first portion w51 is accommodated in a cavity v5 and the second portion w52 is exposed to the outside, or where the second portion w52 is accommodated in the cavity v5 and the first portion w51 is exposed to the outside.

The head body h5 includes the cavity v5. The cavity v5 is provided in the sole portion 508. There is no limitation on the position of the cavity v5.

Although not shown in drawings, the cavity v5 includes a first slide portion and a second slide portion. The first slide portion and the second slide portion form respective side surfaces of the cavity v5. The first slide portion and the second slide portion extend in the longitudinal direction (slide direction) of the cavity v5. The cavity v5 forms a groove. The first slide portion forms a first side surface of the groove. The second slide portion forms a second side surface of the groove.

The first portion w51 or the second portion w52 is accommodated in the cavity v5. The weight w5 can move inside the cavity v5 in a state where the weight w5 is accommodated in the cavity v5. The cavity v5 guides the movement of the weight w5. The weight w5 can slide in the cavity v5. The cavity v5 is a slide groove that enables the weight w5 to slidingly move. The weight w5 moves in the longitudinal direction of the cavity v5.

As shown in FIG. 21B, the cover c5 includes an outer surface 550 and an inner surface 552. The outer surface 550 forms a part of the sole surface 508a. The inner surface 552 abuts on the weight w5 (the first portion w51 or the second portion w52). The cover c5 directly presses the weight w5.

The cover c5 includes a first hole 554 and a second hole 556. The first hole 554 and the second hole 556 are through holes. The second hole 556 is, however, divided into two parts. The first hole 554 is provided at a first end portion 546 of the cover c5. The second hole 556 is provided at a second end portion 548 of the cover c5. The first end portion 546 is fixed to the head body h5 with one screw 514. The second end portion 548 is fixed to the head body h5 with the other screw 514. The cover c5 includes an intermediate portion 547 located between the first end portion 546 and the second end portion 548. The width of the intermediate portion 547 is the same as the width of the first end portion 546 and the width of the second end portion 548. The thickness of the intermediate portion 547 is smaller than the thickness of the first end portion 546 and the thickness of the second end portion 548.

The cover c5 includes a cover engaging portion 558. The cover engaging portion 558 is a slit. The cover engaging portion 558 penetrates through the cover c5 in the thickness direction of the cover c5. The cover engaging portion 558 is provided over the entire length of the cover c5 excluding the first end portion 546. The cover engaging portion 558 is formed so as to extend in the longitudinal direction of the cover c5. The cover engaging portion 558 extends along the path of the slide movement of the weight w5. The cover engaging portion 558 divides the intermediate portion 547 into two parts. The cover engaging portion 558 divides the second end portion 548 into two parts. The cover engaging portion 558 is opened at the second end portion 548. Note that the cover engaging portion 558 does not necessarily have to divide the second end portion 548 into two parts. In the present embodiment, the weight w5 can be attached to the cover engaging portion 558 at the intermediate portion 547 (see FIG. 21B). Therefore, the end portion of the cover engaging portion 558 does not have to be opened.

The cover c5 which is in the closed state covers the cavity v5. In the present embodiment, the cover c5 does not cover the entirety of the cavity v5. The cover c5 covers a part of the cavity v5. The cover engaging portion 558 forms a portion of the cover c5 that does not cover the cavity v5.

As shown in FIG. 21B, the weight w5 includes a weight engaging portion 570. The weight engaging portion 570 is a connection part 524. The weight engaging portion 570 extends between the first portion w51 and the second portion w52. The connection part 524 includes a first end portion that is fixed to the first portion w51. The connection part 524 includes a second end portion that is fixed to the second portion w52. The connection part 524 forms a narrow portion in the weight w5. Thus, a narrow portion may be provided on at least one position of the weight w5. The narrow portion is inserted through the cover engaging portion 558 (slit). The weight w5 has a symmetric shape in the up-down direction with respect to the neck portion.

The weight engaging portion 570 includes an insertion portion 572 that is inserted into the cover engaging portion 558, and an exposed portion 574 that is exposed to the outside of the cover c5. The insertion portion 572 is the connection part 524. When the first portion w51 is accommodated in the cavity v5, the exposed portion 574 is the second portion w52. When the second portion w52 is accommodated in the cavity v5, the exposed portion 574 is the first portion w51. The exposed portion 574 (the first portion w51 or the second portion w52) has dimensions that cannot pass through the cover engaging portion 558. The exposed portion 574 slidingly moves on the cover c5.

The weight engaging portion 570 is engaged with the cover c5. The weight engaging portion 570 is engaged with the cover engaging portion 558 of the cover c5. The weight engaging portion 570 is a sliding projection. The cover engaging portion 558 is a slide groove.

As well shown in FIG. 21A, the exposed portion 574 of the weight w5 is not hidden by the cover c5. The exposed portion 574 of the weight w5 is visually recognized from outside.

In the present embodiment, the first slide portion and the second slide portion of the cavity v5 are slide surfaces. When the first portion w51 is accommodated in the cavity v5, the first slide portion abuts on the first abutment portion 516 of the first portion w51, and the second slide portion abuts on the second abutment portion 518 of the first portion w51. When the second portion w52 is accommodated in the cavity v5, the first slide portion abuts on the first abutment portion 516 of the second portion w52, and the second slide portion abuts on the second abutment portion 518 of the second portion w52. The weight w5 (the first portion w51, the second portion w52) slidingly moves while being guided by the cavity v5 (the first slide portion and the second slide portion). A slide mechanism is formed between the cavity v5 and the first portion w51 or the second portion w52. A prevention mechanism that prevents the slide movement of the weight w5 is not present between the cavity v5 and the weight w5.

The weight w5 is constituted by three members. The weight w5 has a divided structure. The weight w5 is attached to the cover c5 by connecting the first portion w51 and the second portion w52 while inserting the connection part 524 through the cover engaging portion 558 (see FIG. 21B). Alternatively, since the cover engaging portion 558 is opened toward the second end portion 548 side, the weight w5 can be attached to the cover c5 in a state where the first portion w51 is connected to the second portion w52.

The weight w5 is attached to the cover c5. The weight w5 cannot be separated apart from the cover c5 as long as the end portion of the cover engaging portion 558 is not opened. As long as the second end portion 548 is attached to the head body h5, the end portion of the cover engaging portion 558 cannot be opened and the weight w5 does not fall off the cover c5.

When the cover c5 is attached to the head body h5 and is in the closed state, the movement of the weight w5 in the cavity v5 is prevented. This closed state is attained by appropriately tightening the screws 514. The cover c5 directly presses the weight w5 (the first portion w51 or the second portion w52). This pressing increases static frictional force generated between the weight w5 and portions abutting on the weight w5. The pressing by the cover c5 can effectively prevent the slide movement of the weight w5. The closed state can be released by loosening the screws 514. The weight w5 can slidingly move by releasing the closed state. The weight w5 can be moved without the need to detach the cover c5 from the head body h5.

Sixth Embodiment

Figure 22:
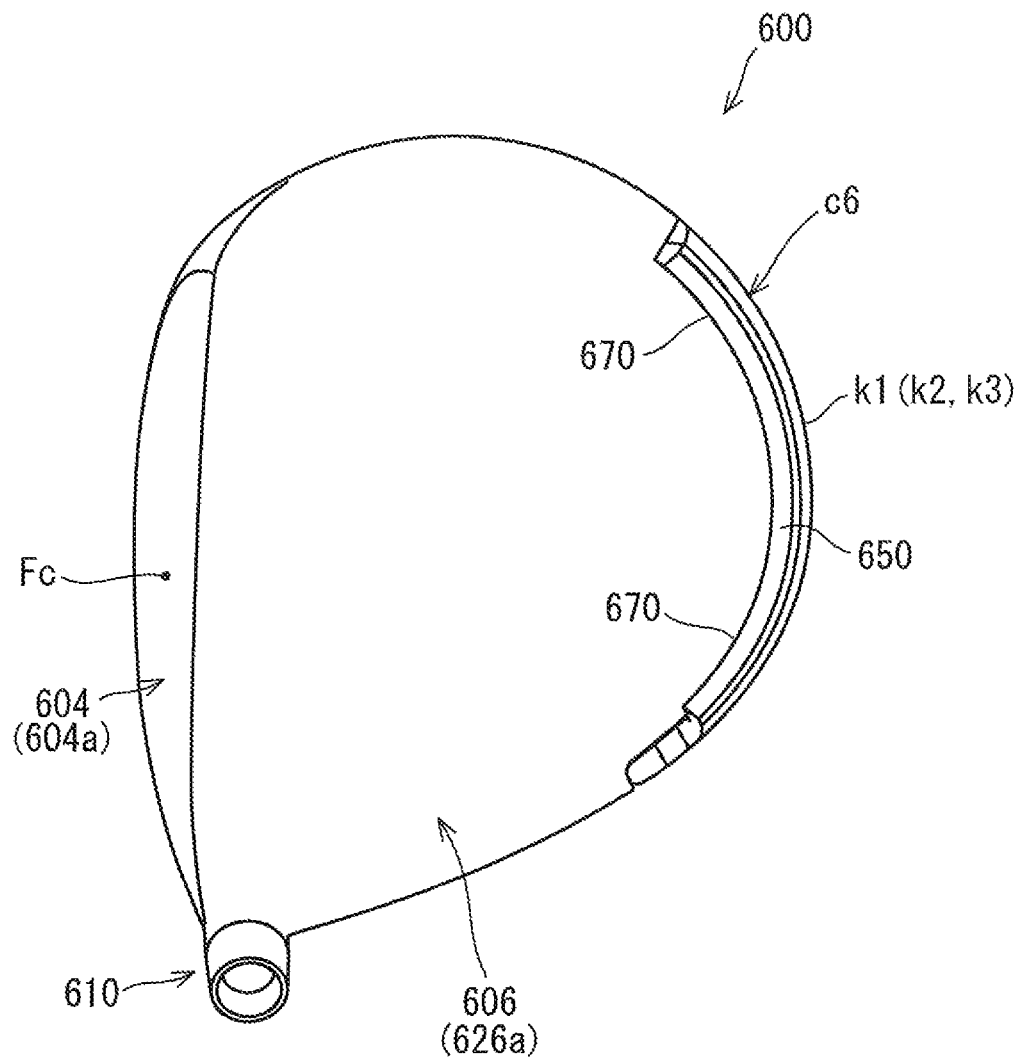
FIG. 22 is a plan view of a head according to a sixth embodiment.
Figure 23:
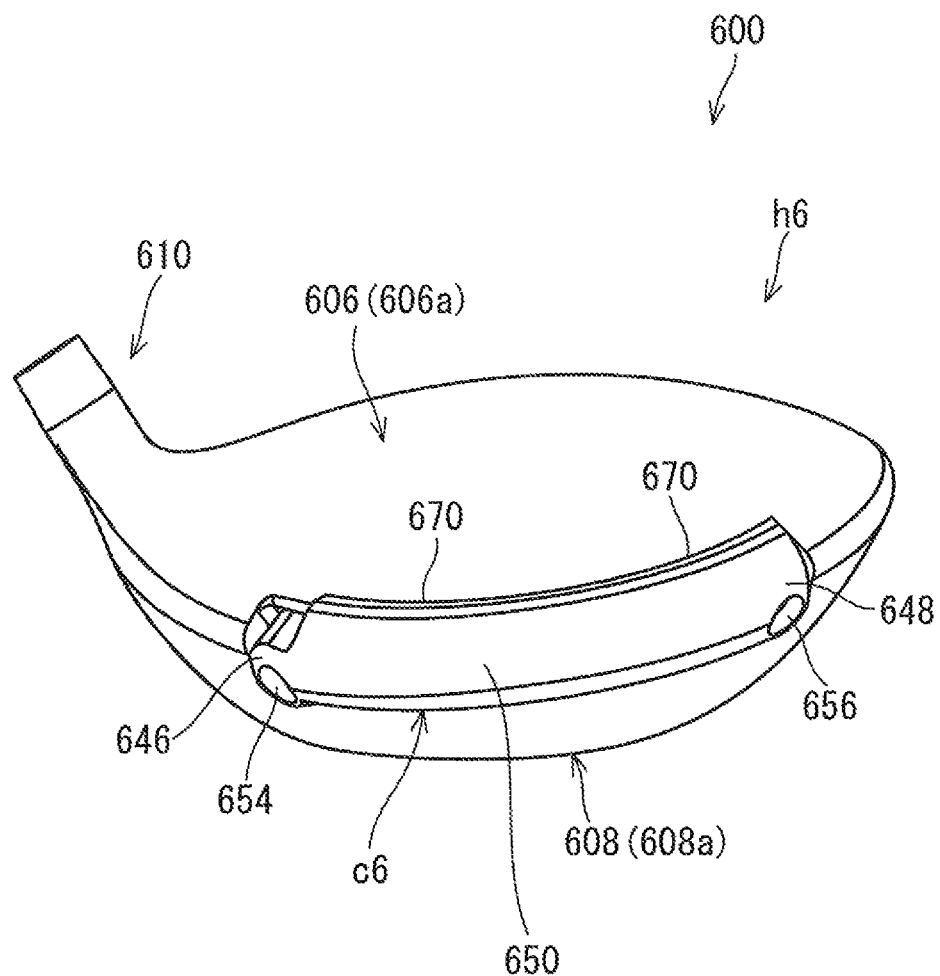
FIG. 23 is a back view of the head according to the sixth embodiment.
Figure 24:
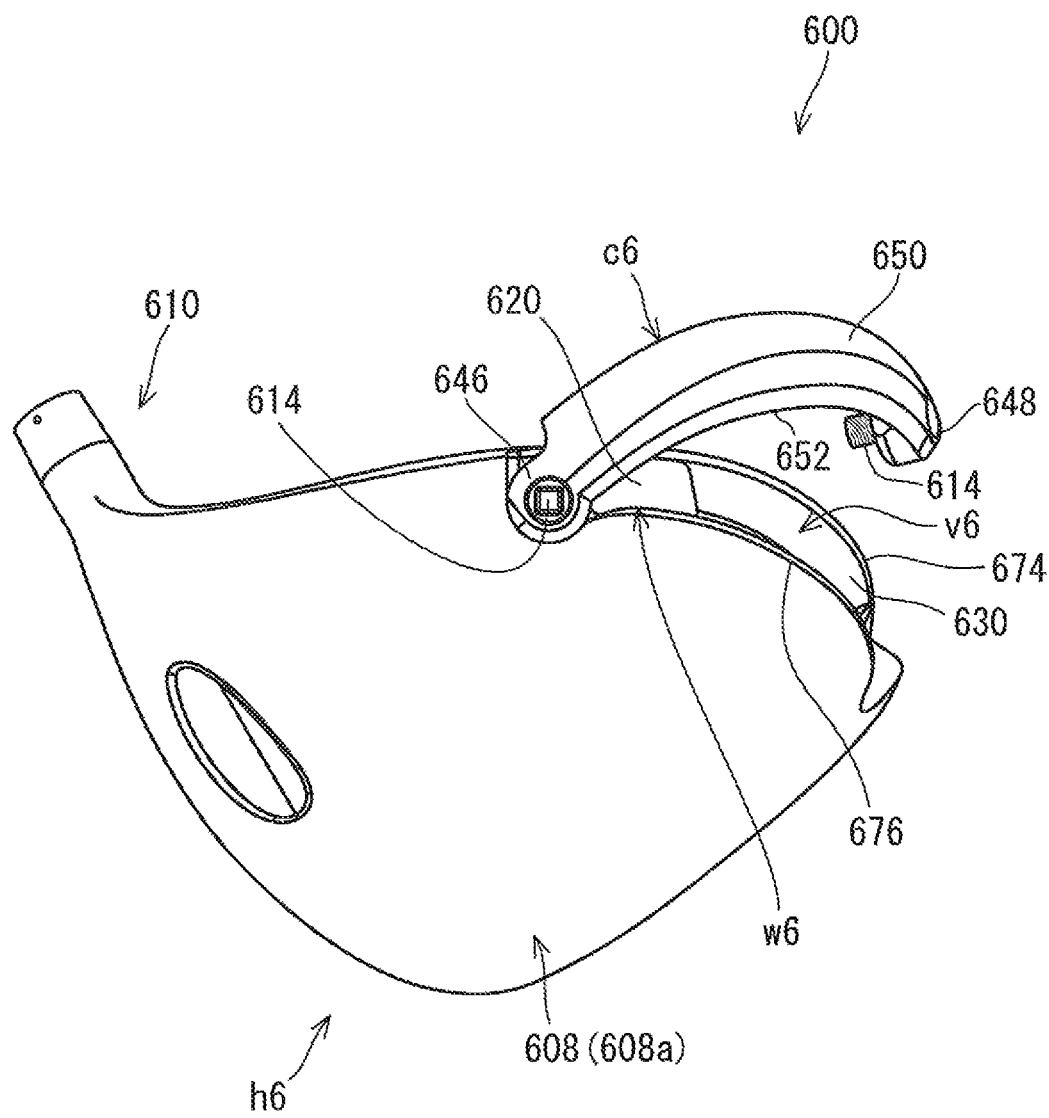
FIG. 24 is a perspective view of the head according to the sixth embodiment, in FIG. 24, fixation at one end portion of a cover is released, and the cover is turned to be in an opened state.
Figure 25A:
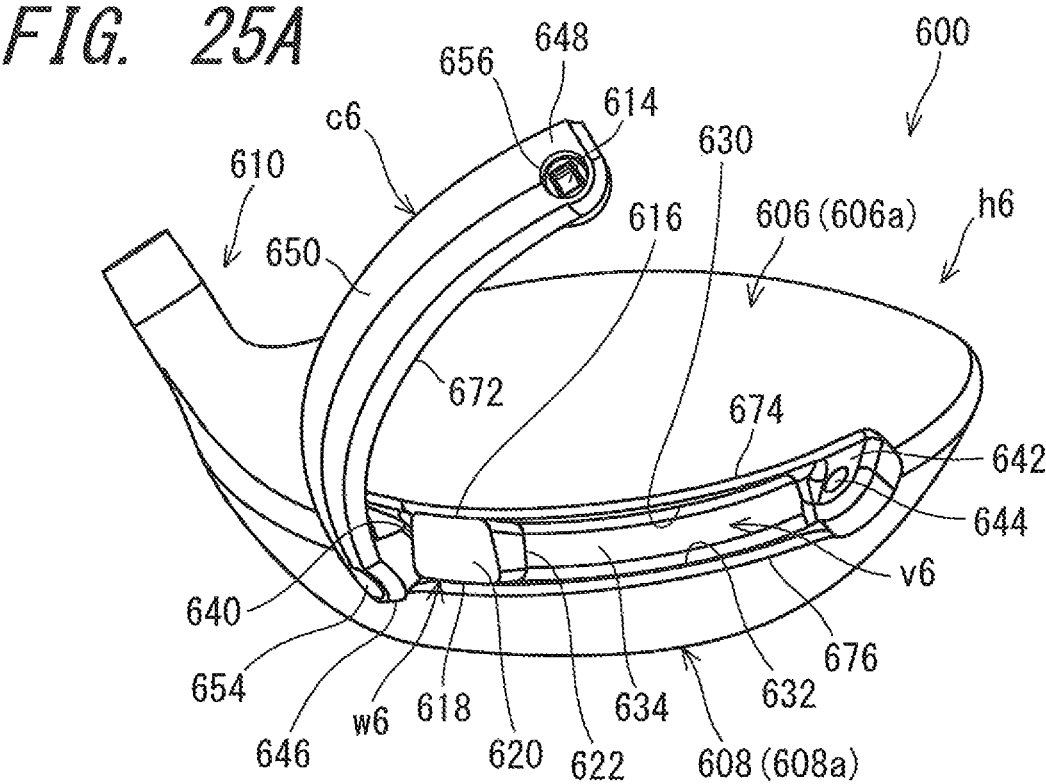
FIG. 25A and FIG. 25B are back views of the head according to the sixth embodiment, in FIG. 25A and FIG. 25B, fixation at one end portion of the cover is released, and the cover is turned to be in an opened state.
Figure 25B:
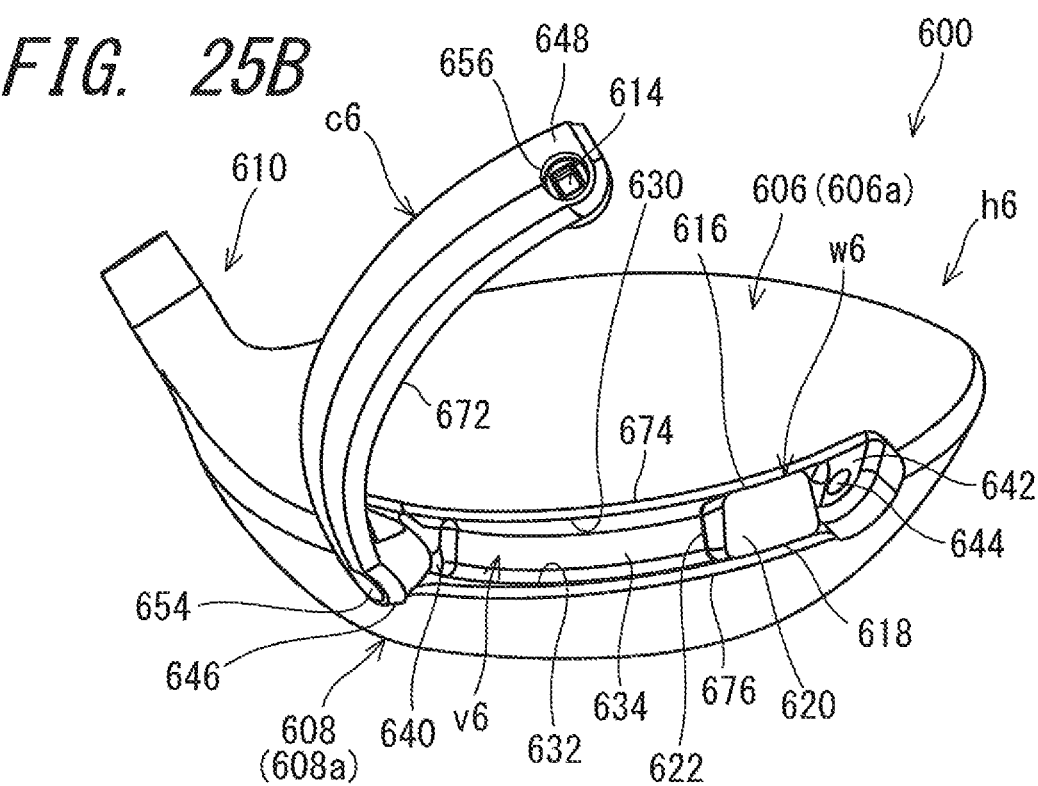

FIG. 22 is a plan view of a golf club head 600 according to the sixth embodiment as viewed from the crown side. FIG. 23 is a back view of the head 600 as viewed from the back side. FIG. 24 is a perspective view of the head 600. FIG. 25A and FIG. 25B are back views of the head 600. In FIG. 24, FIG. 25A and FIG. 25B, a cover c6 is turned about one end portion thereof to uncover a cavity v6. In FIG. 24, FIG. 25A and FIG. 25B, the cover c6 is in an opened state.

The head 600 includes a face portion 604, a crown portion 606, a sole portion 608, and a hosel portion 610. The face portion 604 includes a hitting face 604a. The hitting face 604a is the outer surface of the face portion 604. The hitting face 604a includes a face center Fc. The crown portion 606 includes a crown surface 606a. The crown surface 606a is the outer surface of the crown portion 606. The sole portion 608 includes a sole surface 608a. The sole surface 608a is the outer surface of the sole portion 608. The hosel portion 610 includes a hosel hole 612. The head 600 includes a hollow portion inside the head 600. The hollow portion is surrounded by the face portion 604, the crown portion 606 and the sole portion 608. The face portion 604, the crown portion 606 and the sole portion 608 constitute an outer shell portion of the head 600 (head body h6).

The head 600 is a wood type head. The head 600 is a driver head.

The head 600 includes a head body h6, a weight w6, the cover c6 and screws 614 as cover attaching members. The head body h6 includes the face portion 604, the crown portion 606, the sole portion 608, and the hosel portion 610.

The weight w6 includes a first abutment portion 616 and a second abutment portion 618. The first abutment portion 616 is a first side surface (first surface). The second abutment portion 618 is a second side surface (second surface). The weight w6 also includes an upper surface 620 and a bottom surface 622. The upper surface 620 is opposed to the inner surface of the cover c6.

The head body h6 includes the cavity v6. The cavity v6 is provided at a boundary area between the crown portion 606 and the sole portion 608. Note that the head 600 does not include a so-called skirt portion (side portion). In the head 600, the outer edge of the crown portion 606 is connected to the outer edge of the sole portion 608. Alternatively, the head 600 may include a skirt portion (side portion). In this case, the outer edge of the crown portion 606 is connected to the outer edge of the skirt portion.

The weight w6 is accommodated in the cavity v6. The weight w6 can move inside the cavity v6 in a state where the weight w6 is accommodated in the cavity v6. The cavity v6 guides the movement of the weight w6. The cavity v6 is a slide groove that enables the weight w6 to slidingly move. The weight w6 moves in the longitudinal direction of the cavity v6.

As shown in FIG. 25A and FIG. 25B, the cavity v6 includes a first slide portion 630 and a second slide portion 632. The first slide portion 630 and the second slide portion 632 form respective side surfaces of the cavity v6. The first slide portion 630 and the second slide portion 632 extend in the longitudinal direction (slide direction) of the cavity v6. The cavity v6 forms a groove. The first slide portion 630 forms a first side surface of the groove. The second slide portion 632 forms a second side surface of the groove. The cavity v6 includes a bottom surface 634. In the present embodiment, the first slide portion 630 and the second slide portion 632 are slide surfaces. The first slide portion 630 abuts on the first abutment portion 616 of the weight w6. This abutment is achieved by surface-to-surface contact between the first slide portion 630 and the first abutment portion 616. The second slide portion 632 abuts on the second abutment portion 618 of the weight w6. This abutment is achieved by surface-to-surface contact between the second slide portion 632 and the second abutment portion 618. The weight w6 moves while being guided by the first slide portion 630 and the second slide portion 632.

As well shown in FIG. 25A and FIG. 25B, the cavity v6 extends from the toe side to the heel side. The weight w6 is movable between a first position and a second position. That is, the movable range of the weight w6 is from the first position to the second position. In FIG. 25A, the weight w6 is located at the first position. The first position is a heel-most position in the movable range of the weight w6. In FIG. 25B, the weight w6 is located at the second position. The second position is a toe-most position in the movable range of the weight w6. The cavity v6 extends so as to allow the weight w6 to change its position in the toe-heel direction.

The cavity v6 extends curvedly so as to project toward the back side of the head 600. When the weight w6 is located at or near an apex of this curve, the weight w6 can be position at a back-most position. The cavity v6 extends so as to allow the weight w6 to change its position in the face-back direction.

As shown in FIG. 25A and FIG. 25B, the surface-to-surface contact between the first slide portion 630 of the cavity v6 and the first abutment portion 616 of the weight w6 is maintained throughout the movable range of the weight w6. The first slide portion 630 and the first abutment portion 616 are curved surfaces having the same curvature. The surface-to-surface contact between the second slide portion 632 of the cavity v6 and the second abutment portion 618 of the weight w6 is maintained throughout the movable range of the weight w6. The second slide portion 632 and the second abutment portion 618 are curved surfaces having the same curvature.

As shown in FIG. 25A and FIG. 25B, the head body h6 includes a first cover support 640 and a second cover support 642. The first cover support 640 and the second cover support 642 each include a screw hole 644. A first end portion 646 of the cover c6 is fixed to the first cover support 640. A second end portion 648 of the cover c6 is fixed to the second cover support 642.

The cover c6 includes an outer surface 650 and an inner surface 652. The outer surface 650 forms a part of the crown surface 606a. The outer surface 650 forms a part of the sole surface 608a. The inner surface 652 abuts on the weight w6.

The cover c6 includes a first hole 654 and a second hole 656. The first hole 654 and the second hole 656 are through holes. The first hole 654 is provided at the first end portion 646 of the cover c6. The second hole 656 is provided at the second end portion 648 of the cover c6. The first end portion 646 is fixed to the head body h6 with one cover attaching member (screw) 614. At the first end portion 646, the screw 614 penetrates through the first hole 654 and is screwed into the screw hole 644. The second end portion 648 is fixed to the head body h6 with the other screw 614. At the second end portion 648, the screw 614 penetrates through the second hole 656 and is screwed into the screw hole 644.

The cover c6 which is in the closed state covers the cavity v6. In the present embodiment, the cover c6 covers the entirety of the cavity v6. In the present embodiment, the weight w6 is not visually recognized when the cover c6 is closed.

When the cover c6 is not in the closed state, the weight w6 can move freely within the cavity v6 (see FIG. 25A and FIG. 25B). When the cover c6 is in the closed state, the weight w6 is prevented from moving in the cavity v6. The closed state is attained by appropriately tightening the screws 614. The cover c6 directly presses the weight w6. This pressing increases static frictional force generated between the weight w6 and the cover c6. This pressing also increases static frictional force generated between the weight w6 and the cavity v6 (the first slide portion 630, the second slide portion 632). The pressing by the cover c6 can effectively prevent the slide movement of the weight w6.

As shown in FIG. 24, FIG. 25A and FIG. 25B, the opened state of the cover c6 is attained without the need to separate the cover c6 apart from the head body h6. For achieving the opened state, one screw 614 is removed from the head body h6 and the other screw 614 may be kept connected to the head body h6. By loosening the other screw 614, the cover c6 can be turned to uncover the cavity v6. This opened state allows users to directly touch and move the weight w6.

As above described, the cavity v6 is provided on the boundary area between the crown portion 606 and the sole portion 608. As shown in FIG. 22, in a planar view in which the head 600 is viewed from the crown portion 606 side, the cover c6 which is in the closed state is visually recognized. Also in a planar view in which the head 600 is viewed from the sole portion 608 side, the cover c6 which is in the closed state is visually recognized. The cover c6 forms a contour line k1 of the head 600 as viewed from the crown side. The cover c6 forms a contour line k2 of the crown surface 606a. The contour line k2 is a part of the contour line k1. The outer surface 650 constitutes a part of the crown surface 606a. The cover c6 forms a contour line k3 of the sole surface 608a. The contour line k3 coincides with the contour line k2. The outer surface 650 constitutes a part of the sole surface 608a.

The first hole 654 and the second hole 656 do not constitute the contour line k1. The first hole 654 and the second hole 656 are provided on the sole side relative to the contour line k1. The first hole 654 and the second hole 656 are located apart from the contour line k1. The first hole 654 and the second hole 656 are located apart from the contour line k2. The first hole 654 and the second hole 656 are located apart from the contour line k3. This structure prevents the formation of a recess on such contour lines of a head, which results in the violation of golf rules.

The cover c6 is protruded from the crown surface 606a. The cover c6 is protruded from the sole surface 608a. The width of the cover c6 is greater than the width of the cavity v6. Edges on respective sides (in the longitudinal direction) of the cover c6 are located outside respective edges (first edge and second edge described below) of the cavity v6. The edges of the cover c6 extend up to a position that covers the outer surface of the head body h6. The edges of the cover c6 covers the outer surface of the head body h6. The cover c6 includes a crown covering portion 670 that covers the crown surface 606a. The cover c6 includes a sole covering portion 672 that covers the sole surface 608a. The crown covering portion 670 extends along a first edge 674 of the cavity v6. The first edge 674 is located on the crown surface 606a. The first edge 674 is an outer edge of the crown portion 606 in the head body h6. The sole covering portion 672 extends along a second edge 676 of the cavity v6. The second edge 676 is located on the sole surface 608a. The second edge 676 is the outer edge of the sole portion 608 in the head body h6.

The cover c6 is protruded from the crown surface 606a. The cover c6 is protruded from the sole surface 608a.

Seventh Embodiment

Figure 26:
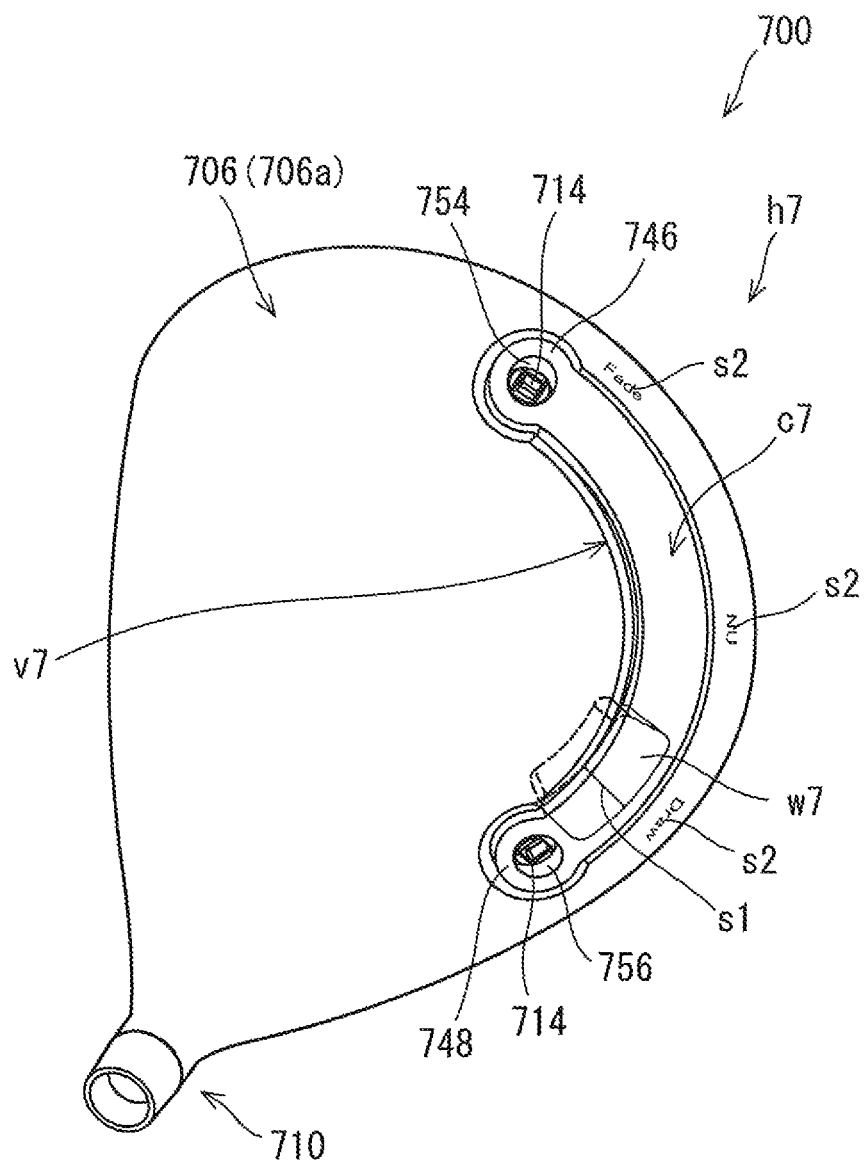
FIG. 26 is a plan view of a head according to a seventh embodiment.

FIG. 26 is a perspective view of a golf club head 700 according to a seventh embodiment as viewed from the crown side.

The head 700 includes a face portion (not shown), a crown portion 706, a sole portion (not shown), and a hosel portion 710. The crown portion 706 includes a crown surface 706a. The crown surface 706a is the outer surface of the crown portion 706. The head 700 includes a hollow portion inside the head 700. The head 700 is a wood type head. The head 700 is a driver head.

The head 700 includes a head body h7, a weight w7, a cover c7 and screws 714 as cover attaching members. The head body h7 includes the face portion (not shown), the crown portion 706, the sole portion (not shown), and the hosel portion 710.

The head body h7 includes a cavity v7. The cavity v7 is provided in the crown portion 706.

The cover c7 includes a first hole 754 and a second hole 756. The first hole 754 and the second hole 756 are through holes. The first hole 754 is provided at a first end portion 746 of the cover c7. The second hole 756 is provided at a second end portion 748 of the cover c7. The first end portion 746 is fixed to the head body h7 with one cover attaching member (screw) 714. The second end portion 748 is fixed to the head body h7 with the other screw 714.

When the cover c7 is not in the closed state, the weight w7 can move freely within the cavity v7. When the cover c7 is in the closed state, the weight w7 is prevented from moving in the cavity v7. The closed state is attained by appropriately tightening the screws 714. The cover c7 directly presses the weight w7. This pressing increases static frictional force generated between the weight w7 and the cover c7. This pressing also increases static frictional force generated between the weight w7 and the cavity v7. The pressing by the cover c7 can effectively prevent the slide movement of the weight w7.

The cover c7 which is in the closed state covers the cavity v7. In the present embodiment, the cover c7 covers the entirety of the cavity v7.

The cover c7 has transparency. The cover c7 has transparency to the extent that the weight w7 is visually recognized when viewed through the cover c7. As shown in FIG. 26, the weight w7 which is located inside the cover c7 is visually recognized.

Modification Example (a Cover that Allows a Weight to be Visually Recognized from Outside)

Figure 27A:
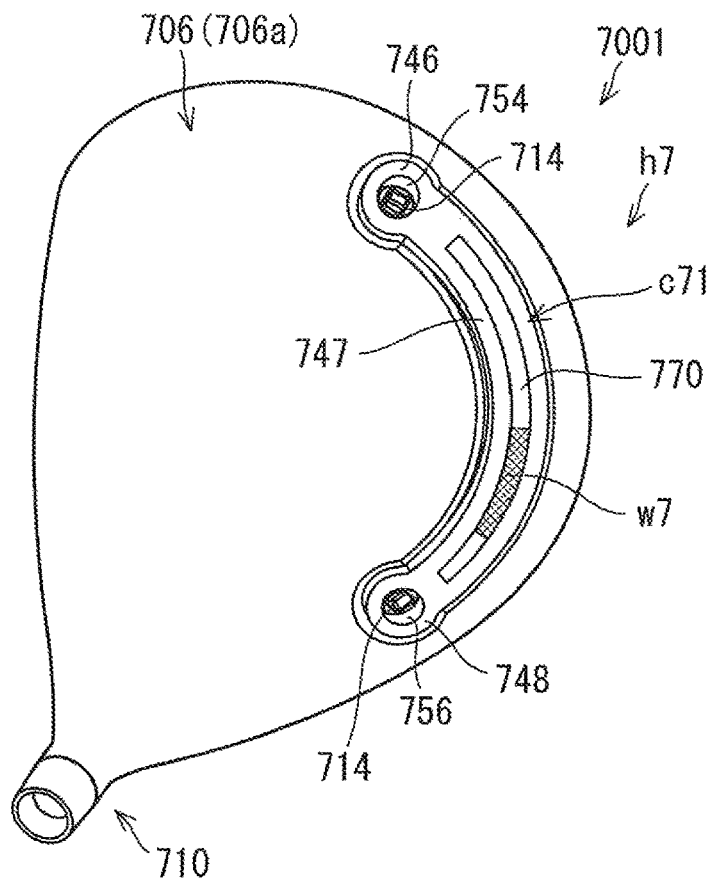
FIG. 27A is a perspective view of a head according to a modification example.
Figure 27B:
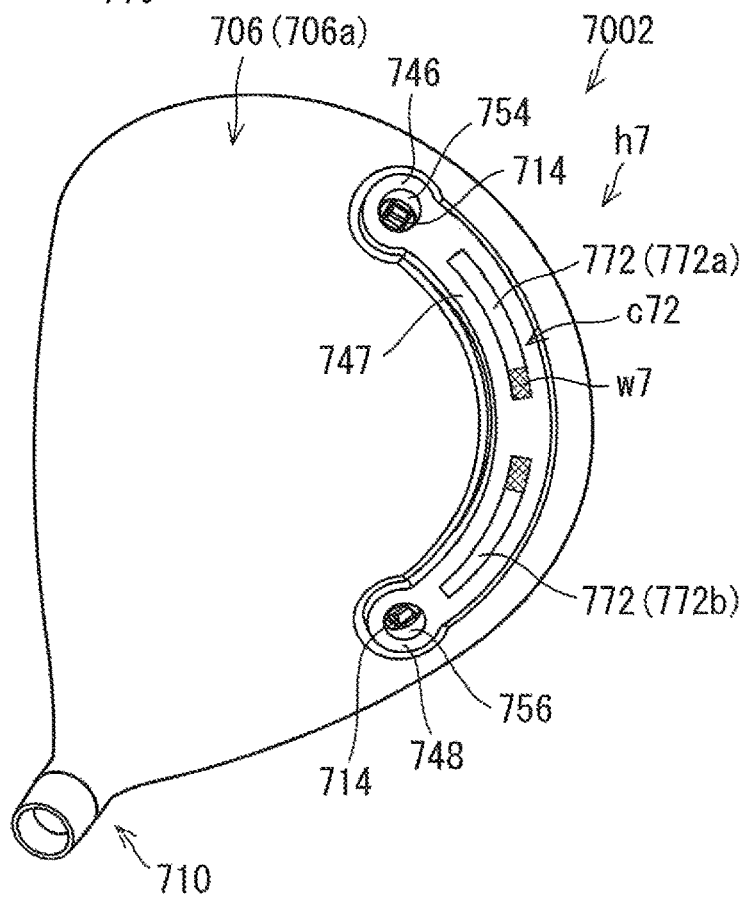
FIG. 27B is a perspective view of a head according to another modification example.

FIG. 27A is a perspective view of a head 7001 according to a modification example as viewed from the crown side. FIG. 27B is a perspective view of a head 7002 according to another modification example as viewed from the crown side.

The head 7001 is a modification example of the head 700 in the seventh embodiment. The head 7001 is the same as the head 700 except that a cover c71 is used instead of the cover c7. The cover c71 does not have transparency. The cover c71 includes a window portion 770. The window portion 770 penetrates through the cover c71. The window portion 770 extends in the extending direction of the cover c71. The window portion 770 extends in the slide direction of the weight w7. The weight w7 located inside the cover c71 can be visually recognized through the window portion 770. The window portion 770 allows users to see the position of the weight w7 even when the cover c71 is closed. In FIG. 27A and FIG. 27B, a part of the weight w7 that can be seen through the window portion is shown with cross hatching. This indication (using cross hatching for visible part of a weight) is true in other drawings of the present disclosure.

The cover c71 includes a first hole 754 and a second hole 756. The first hole 754 and the second hole 756 are through holes. The first hole 754 is provided at a first end portion 746 of the cover c71. The second hole 756 is provided at a second end portion 748 of the cover c71. The first end portion 746 is fixed to the head body h7 with one cover attaching member (screw) 714. The second end portion 748 is fixed to the head body h7 with the other screw 714.

The head 7002 is another modification example of the head 700 in the seventh embodiment. The head 7002 is the same as the head 700 except that a cover c72 is used instead of the cover c7. The cover c72 does not have transparency. The cover c72 includes a window portion 772. The window portion 772 penetrates through the cover c72. The window portion 772 extends in the extending direction of the cover c72. The window portion 772 extends in the slide direction of the weight w7. The weight w7 which is located inside the cover c72 can be visually recognized through the window portion 772. The window portion 772 allows users to see the position of the weight w7 even when the cover c72 is closed.

The cover c72 includes a first hole 754 and a second hole 756. The first hole 754 and the second hole 756 are through holes. The first hole 754 is provided at a first end portion 746 of the cover c72. The second hole 756 is provided at a second end portion 748 of the cover c72. The first end portion 746 is fixed to the head body h7 with one cover attaching member (screw) 714. The second end portion 748 is fixed to the head body h7 with the other screw 714.

As in the head 7002, the window portion 772 may be divided. In other words, a plurality of window portions 772 may be provided. Further in other words, the window portion 772 may have a break in continuity. The window portion 772 is divided preferably such a manner that the entirety of the weight w7 is not hidden at any position of the weight w7. A non-window portion 774 (a break in continuity of the window portion 772) provided between a first window 772a and a second window 772b can increase the rigidity of the cover c72. The non-window portion 774 can increase the pressing force of the cover c72 against the weight w7.

Modification Example (Window Portion)

Figure 28A:
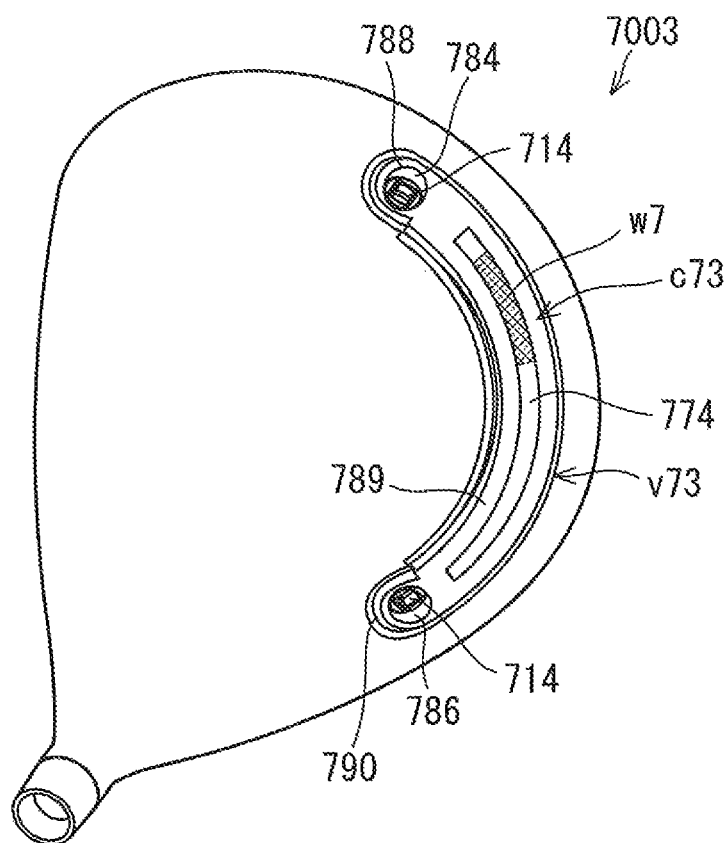
FIG. 28A is a perspective view of a head according to still another modification example.
Figure 28B:
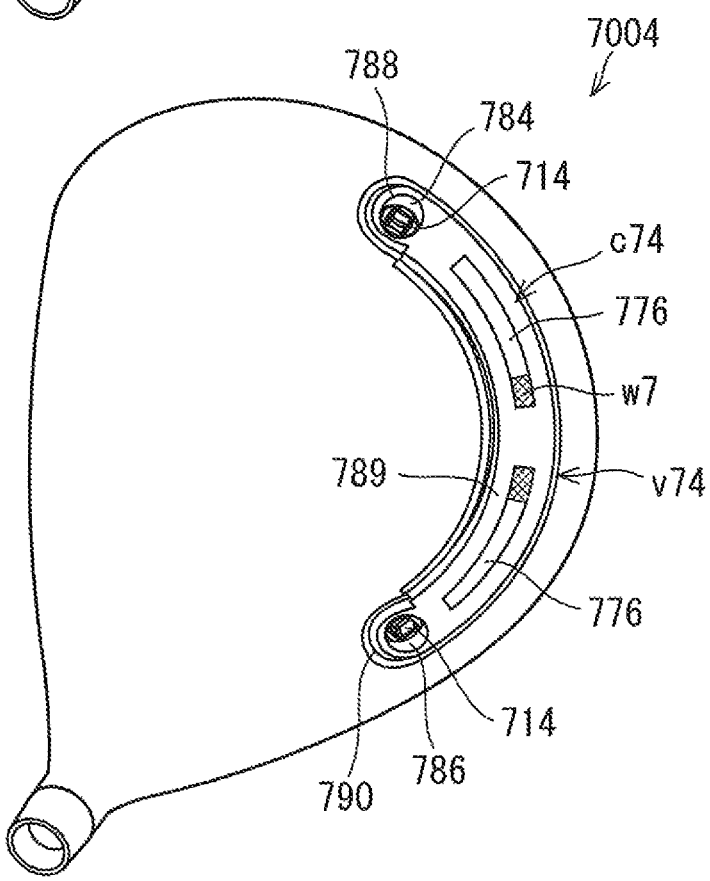
FIG. 28B is a perspective view of a head according to still another modification example.

FIG. 28A is a perspective view of a head 7003 according to a modification example as viewed from the crown side. FIG. 28B is a perspective view of a head 7004 according to another modification example as viewed from the crown side.

The head 7003 is the modification example of the head 7001. In the head 7003, a cover c73 is used instead of the cover c7. The cover c73 includes a window portion 774. The window portion 774 is the same as the window portion 770.

The head 7004 is the modification example of the head 7002. In the head 7004, a cover c74 is used instead of the cover c7. The cover c74 includes a window portion 776. The window portion 776 is the same as the window portion 772.

The cover c73 includes a first hole 784 and a second hole 786. The first hole 784 and the second hole 786 are through holes. The first hole 784 is provided at a first end portion 788 of the cover c73. The second hole 786 is provided at a second end portion 790 of the cover c73. The first end portion 788 is fixed to the head body with one cover attaching member (screw) 714. The second end portion 790 is fixed to the head body with the other screw 714.

The cover c74 includes a first hole 784 and a second hole 786. The first hole 784 and the second hole 786 are through holes. The first hole 784 is provided at a first end portion 788 of the cover c74. The second hole 786 is provided at a second end portion 790 of the cover c74. The first end portion 788 is fixed to the head body with one cover attaching member (screw) 714. The second end portion 790 is fixed to the head body with the other screw 714.

In the head 7003, the width of the first end portion 788 and the width of the second end portion 790 of the cover c73 are smaller than the width of an intermediate portion 789. The intermediate portion 789 is a portion extending between the first end portion 788 and the second end portion 790. Also in the head 7004, the width of the first end portion 788 and the width of the second end portion 790 of the cover c74 are smaller than the width of the intermediate portion 789. On the other hand, in the head 7001, the width of the first end portion 746 and the width of the second end portion 748 of the cover c71 are greater than the width of an intermediate portion 747. The intermediate portion 747 is a portion extending between the first end portion 746 and the second end portion 748. Also in the head 7002, the width of the first end portion 746 and the width of the second end portion 748 of the cover c72 are greater than the width of the intermediate portion 747. As such, the width of the cover may be varied.

Figure 29A:
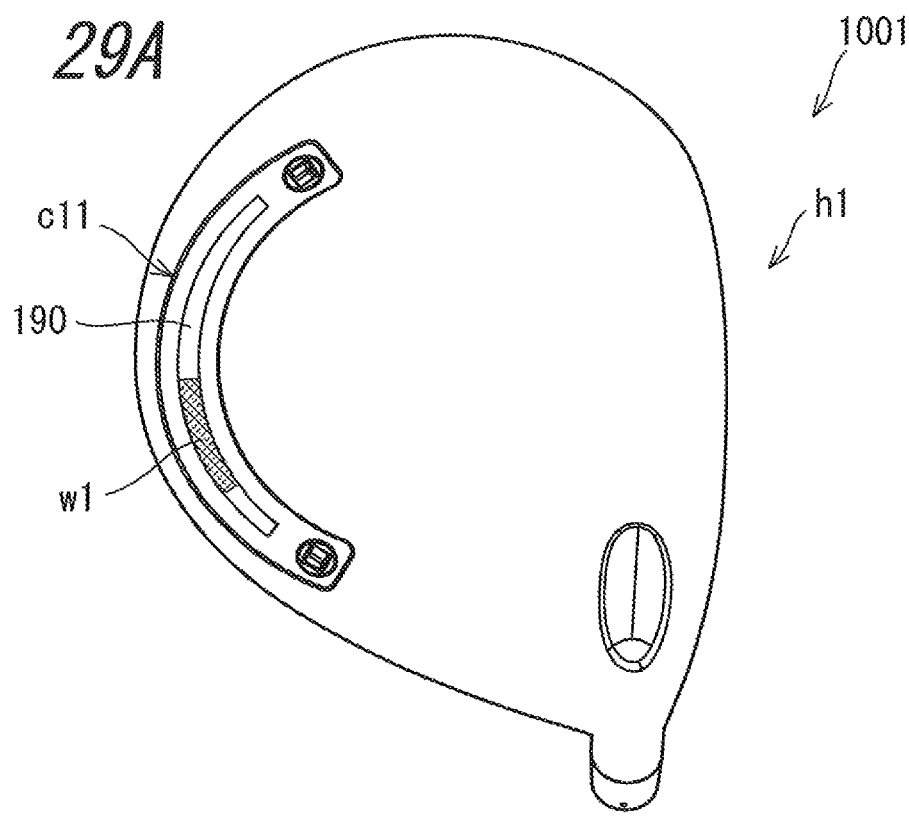
FIG. 29A is a bottom view of a head according to still another modification example.
Figure 29B:
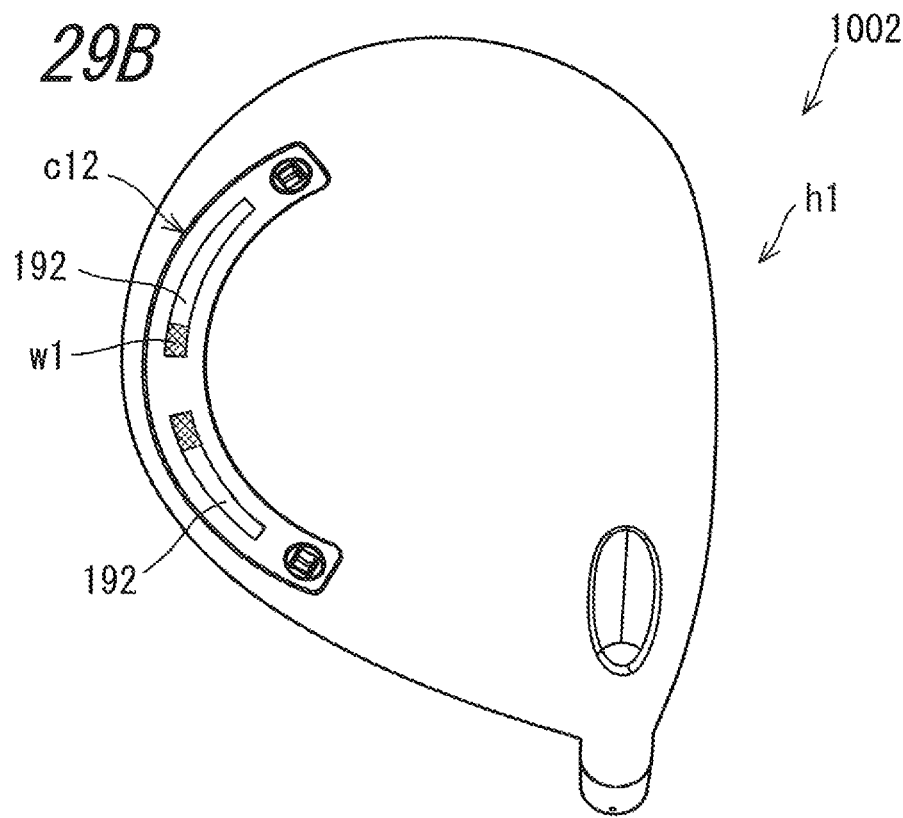
FIG. 29B is a bottom view of a head according to still another modification example.

FIG. 29A is a bottom view of a head 1001 according to a modification example as viewed from the sole side. FIG. 29B is a bottom view of a head 1002 according to another modification example as viewed from the sole side.

The head 1001 is a modification example of the head 100 according to the first embodiment. The head 1001 is the same as the head 100 except that a cover c11 is used instead of the cover c1. The cover c11 does not have transparency. The cover c11 includes a window portion 190. The window portion penetrates through the cover c11. The window portion c11 extends in the extending direction of the cover c11. The window portion 190 extends in the slide direction of the weight w1. The weight w1 which is located inside the cover c11 can be visually recognized by viewing through the window portion 190. The window portion 190 allows users to see the position of the weight w1 even when the cover c11 is closed.

The head 1002 is a modification example of the head 1001. The head 1002 is the same as the head 1001 except that a cover c12 is used instead of the cover c11. The cover c12 includes a window portion 192. The window portion 192 is divided.

Modification Example (Structure for Fixing a Cover)

In the embodiments described above, the first end portion and the second end portion of the cover are fixed to the head body with screws. A structure for fixing a cover is not limited to such embodiments.

Figure 30:
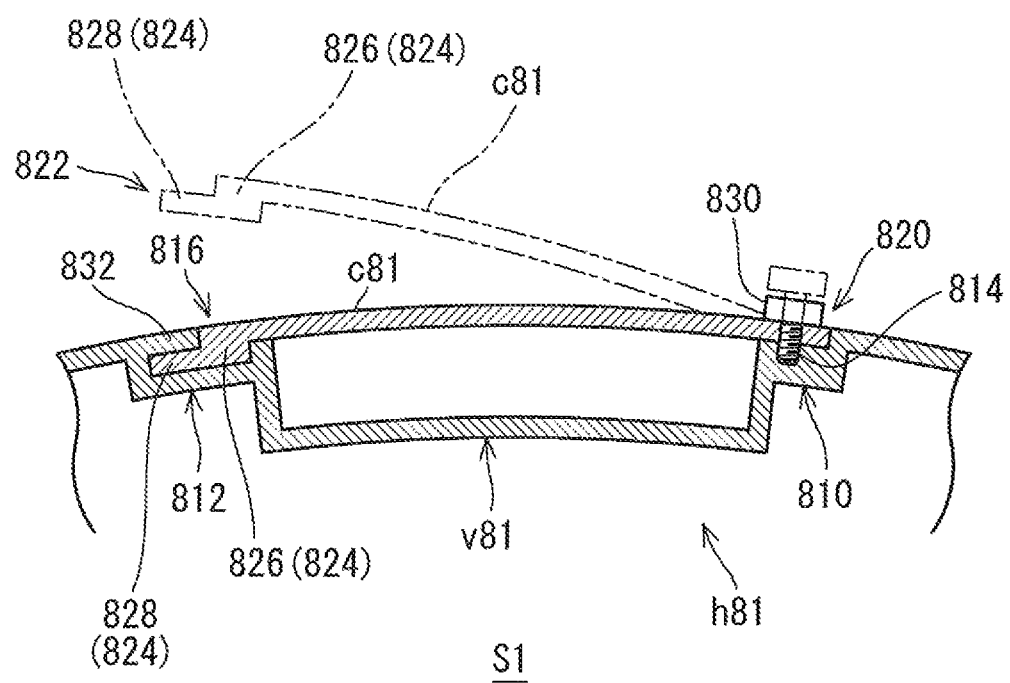
FIG. 30 is a cross-sectional view showing an example of a structure for fixing a cover.
Figure 31:
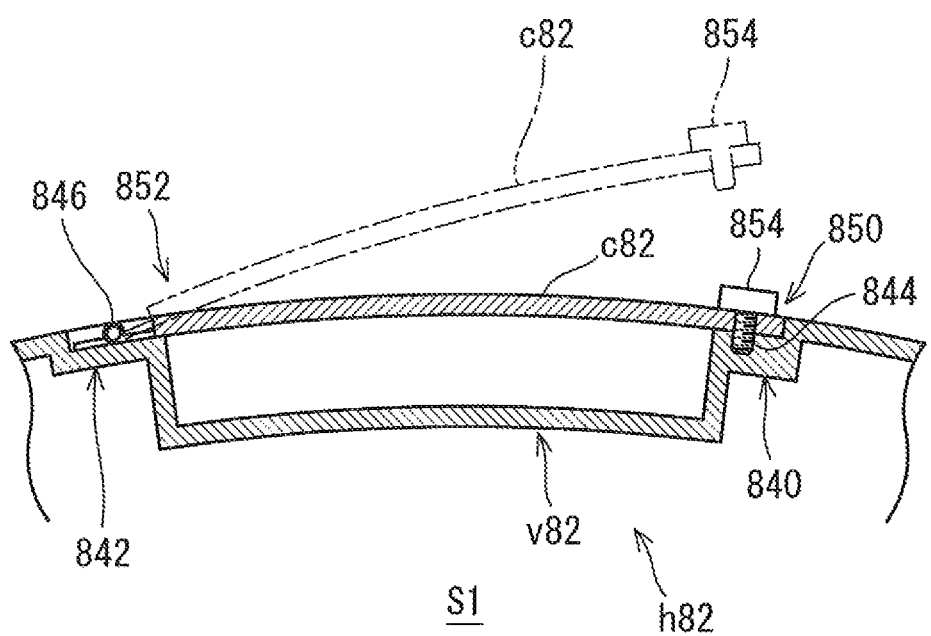
FIG. 31 is a cross-sectional view showing another example of the structure for fixing a cover.
Figure 32:
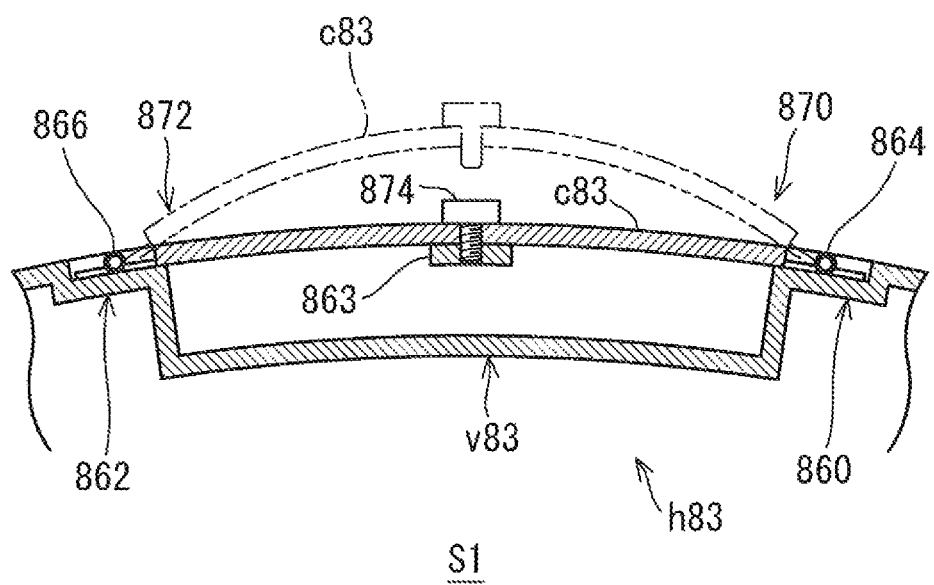
FIG. 32 is a cross-sectional view showing still another example of the structure for fixing a cover.

FIG. 30, FIG. 31 and FIG. 32 each show an enlarged cross-sectional view of a cavity portion in a head of a modification example.

The embodiment of FIG. 30 includes a cover c81 and a head body h81. The head body h81 includes a cavity v81. The head body h81 includes a first cover support 810 and a second cover support 812. The first cover support 810 includes a screw hole 814. The second cover support 812 does not include a screw hole. The second cover support 812 includes a cover receiving portion 816. The cover receiving portion 816 is a recess.

The cover c81 includes a first end portion 820 and a second end portion 822. The first end portion 820 includes a screw hole. The first end portion 820 is fixed to the first cover support 810. The first end portion 820 is screwed to the first cover support 810. The second end portion 822 is fixed to the second cover support 812. The second end portion 822 includes an insertion end portion 824. The insertion end portion 824 includes a first portion 826 that extends inward of the head and a second portion 828 that extends from the first portion 826 along the outer surface of the head. The cover receiving portion 816 has a shape that corresponds to the insertion end portion 824. By the insertion end portion 824 being inserted to the cover receiving portion 816, the movement of the second end portion 822 in a direction along the outer surface of the head is prevented. Furthermore, this inserted state also prevents the second end portion 822 from moving outward of the head. The second end portion 822 is fixed to the second cover support 812 by inserting the insertion end portion 824 to the cover receiving portion 816. The second end portion 822 can be pulled out of the cover receiving portion 816 by loosening a screw 830 that fixes the first end portion 820.

The cover receiving portion 816 is configured such that the cover c81 extends along the opening of the cavity v81 when the second end portion 822 of the cover c81 is inserted to the cover receiving portion 816. The cover receiving portion 816 includes an upper side portion 832 that is located on the upper side of the second end portion 822 (insertion end portion 824) of the cover c81. The upper side portion 832 effectively prevents the cover c81 from opening.

The embodiment of FIG. 31 includes a cover c82 and a head body h82. The head body h82 includes a cavity v82. The head body h82 includes a first cover support 840 and a second cover support 842. The first cover support 840 includes a screw hole 844. A hinge 846 is provided on the second cover support 842.

The cover c82 includes a first end portion 850 and a second end portion 852. The first end portion 850 includes a screw hole. The first end portion 850 is screwed to the first cover support 840. The second end portion 852 is pivotably fixed to the second cover support 842 with the hinge 846. When a screw 854 that fixes the first end portion 850 is removed, the cover c82 pivots. This pivot motion allows the cover c82 to be opened and closed without the need to separate the cover c82 apart from the head body h82.

The embodiment of FIG. 32 includes a cover c83 and a head body h83. The head body h83 includes a cavity v83. The head body h83 includes a first cover support 860, a second cover support 862, and a third cover support 863. A first hinge 864 is provided on the first cover support. A second hinge 866 is provided on the second cover support 862.

The cover c83 includes a first end portion 870 and a second end portion 872. The first end portion 870 is fixed to the first cover support 860 with the first hinge 864. The second end portion 872 is fixed to the second cover support 862 with the second hinge 866. At a middle position between the first end portion 870 and the second end portion 872, the cover c83 is fixed to the third cover support 863 with a screw 874. The cover c83 is elastically deformed when the screw 874 is removed, whereby the first end portion 870 and the second end portion 872 can pivot. This pivot motion allows the cover c83 to be opened and closed without the need to separate the cover c83 apart from the head body h83.

Figure 33A:
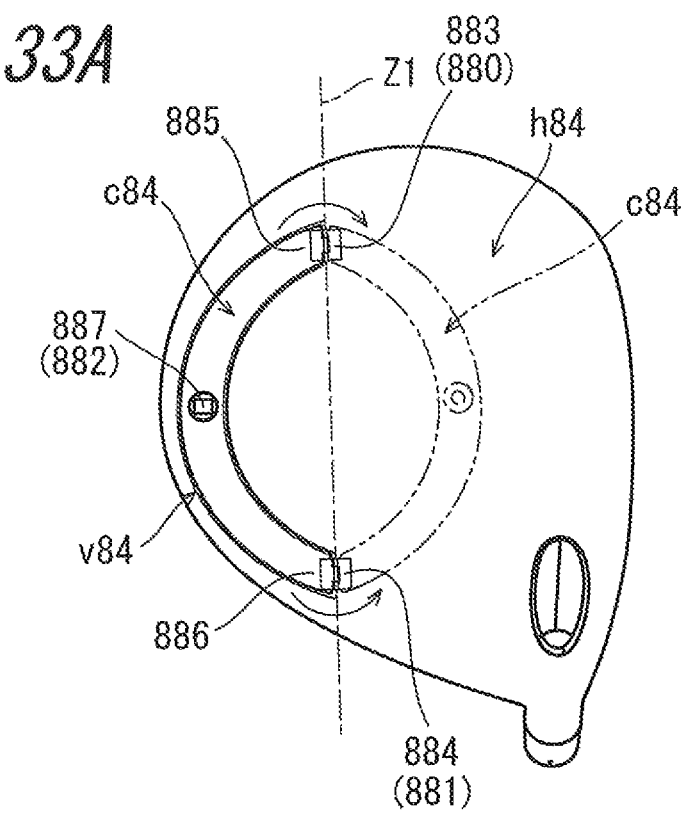
FIG. 33A and FIG. 33B are plan views showing still other examples of the structure for fixing a cover.

The embodiment of FIG. 33A includes a cover c84 and a head body h84. The head body h84 includes a cavity v84. The head body h84 includes a first cover support 880, a second cover support 881, and a third cover support 882. A first hinge 883 is provided on the first cover support 880. A second hinge 884 is provided on the second cover support 881. The cover c84 includes a first end portion 885 and a second end portion 886. The first end portion 885 is fixed to the first cover support 880 with the first hinge 883. The second end portion 886 is fixed to the second cover support 881 with the second hinge 884. At a middle position between the first end portion 885 and the second end portion 886, the cover c84 is fixed to the third cover support 882 with a screw 887. Although the third cover support 882 is provided within the cavity v84, the third cover support 882 is provided at a position floating off from the bottom surface of the cavity v84 similarly to the embodiment of FIG. 32, and therefore does not hamper the movement of the weight. The axes Z1 of the two hinges 883 and 884 for rotation are aligned in one straight line. The cover c84 can be rotated about the axes Z1 when the screw 887 is removed from the third cover support 882. This rotation allows the cover c84 to be opened and closed without the need to separate the cover c84 apart from the head body h84.

Figure 33B:
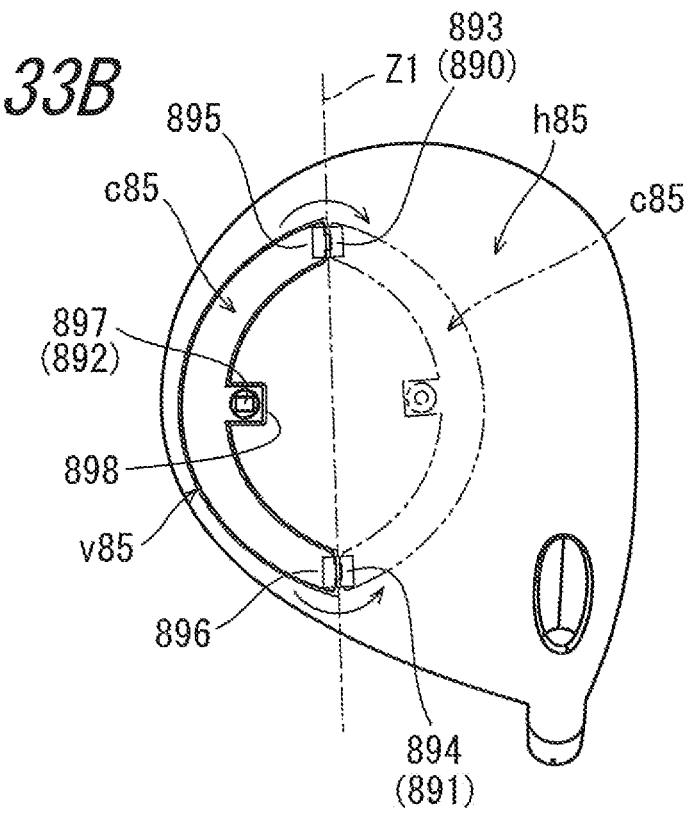

The embodiment of FIG. 33B includes a cover c85 and a head body h85. The head body h85 includes a cavity v85. The head body h85 includes a first cover support 890, a second cover support 891, and a third cover support 892. A first hinge 893 is provided on the first cover support 890. A second hinge 894 is provided on the second cover support 891. The cover c85 includes a first end portion 895 and a second end portion 896. The first end portion 895 is fixed to the first cover support 890 with the first hinge 893. The second end portion 896 is fixed to the second cover support 891 with the second hinge 894. At a middle position between the first end portion 895 and the second end portion 896, a protruded extension portion 898 is formed in the cover c85. The protruded extension portion 898 extends so as to reach a position that is located apart from the cavity v85. The protruded extension portion 898 of the cover c85 is fixed to the third cover support 892 with a screw 897. The third cover support 892 is provided out of the cavity v85. The axes Z1 of the two hinges 893 and 894 for rotation are aligned in one straight line. The cover c85 can be rotated about the axes Z1 when the screw 897 is removed from the third cover support 892. This rotation allows the cover c85 to be opened and closed without the need to separate the cover c85 apart from the head body h85.

Modification Example (Structure in which a Weight Penetrates Through a Cavity)

Figure 34A:
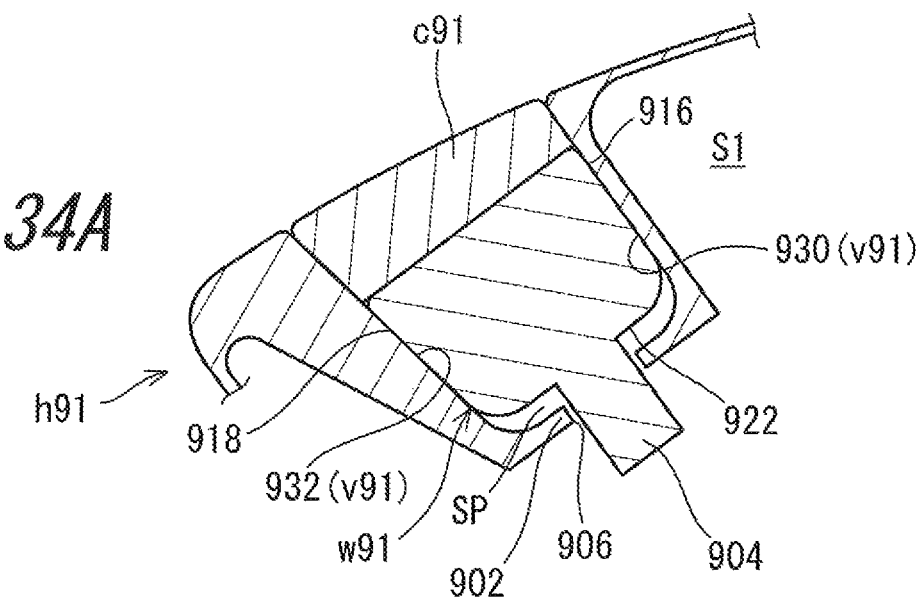
FIG. 34A is a cross-sectional view showing a modification example of a weight and a cavity.

The embodiment of FIG. 34A includes a cover c91 and a weight w91. A head body h91 includes a cavity v91. The weight w91 includes an extension portion 904. The extension portion 904 is provided on a bottom surface 922 of the weight w91. The cavity v91 includes an opening 906. The opening 906 extends along the path of the slide movement of the weight w91, and forms a slit. The opening 906 is provided on a wall portion 902 that forms (the bottom surface of) the cavity v91. The extension portion 904 of the weight w91 extends so as to pass through the opening 906. The extension portion 904 penetrates through the opening 906 (wall portion 902) to reach the inside (hollow portion S1) of the head. The weight w91 includes a first abutment portion 916 that abuts on a first slide portion 930 of the cavity v91, and a second abutment portion 918 that abuts on a second slide portion 932 of the cavity v91. The weight of the cavity v91 is reduced by providing the opening 906. The extension portion 904 increases the weight of the weight w91, thereby enhancing the degree of freedom in adjustment of the position of the center of gravity of the head.

Figure 34B:
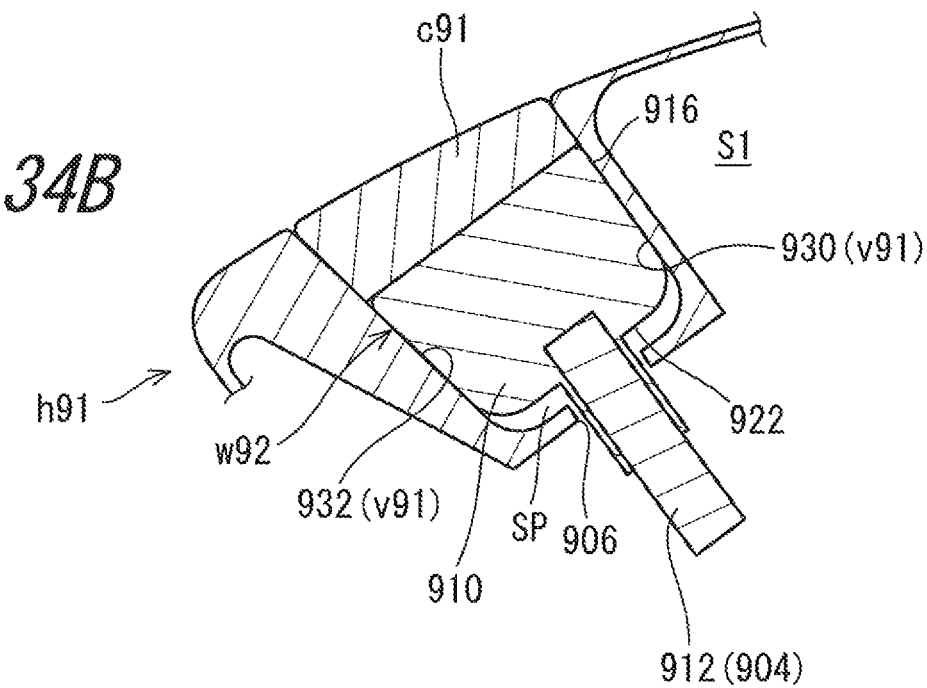
FIG. 34B is a cross-sectional view showing another modification example of the weight and the cavity.

The embodiment of FIG. 34B is the modification example of FIG. 34A. In this embodiment, a weight w92 is provided instead of the weight w91. The weight w92 includes a weight main body 910 and a high specific gravity portion 912. The specific gravity of the high specific gravity portion 912 is greater than the specific gravity of the weight main body 910. The extension portion 904 includes the high specific gravity portion 912. The high specific gravity portion 912 further increases the weight of the weight w92, thereby enhancing the degree of freedom in adjustment of the position of the center of gravity of the head.

Modification Example (Weight Usable Both when it is Placed Right Side Up and Upside Down)

Figure 35:
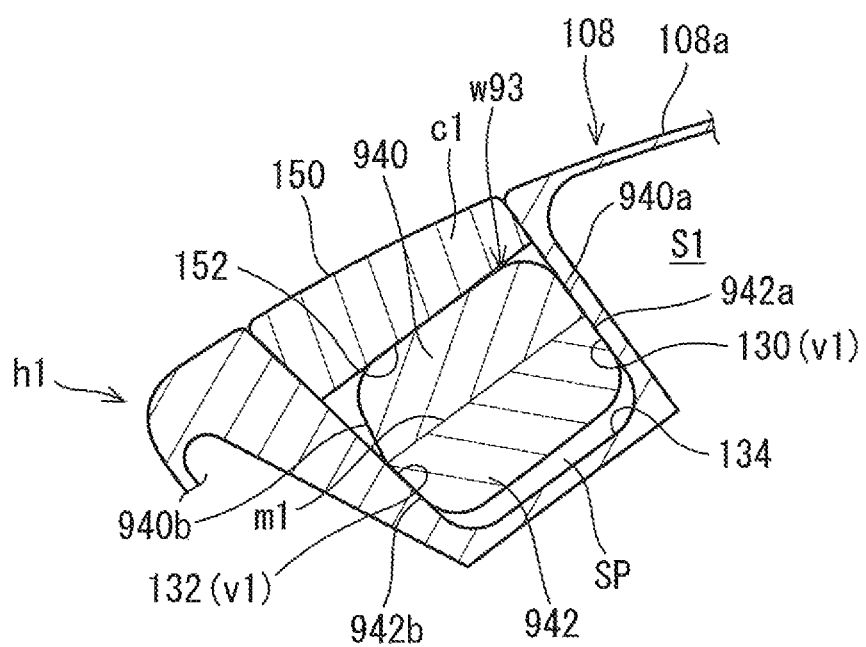
FIG. 35 is a cross-sectional view showing a modification example of the weight.

The embodiment of FIG. 35 is a modification example of the first embodiment. The present embodiment includes the head body h1, the cavity v1 and the cover c1 which are the same as in the first embodiment. The only difference between the first embodiment and the present embodiment is their weights. The present embodiment uses a weight w93 instead of the weight w1 of the first embodiment. The weight w93 includes a first portion 940 and a second portion 942. The weight w93 has a symmetric shape in the up-down direction. The weight w93 has a plane symmetry. The plane of symmetry is a boundary surface m1 between the first portion 940 and the second portion 942. The specific gravity of the first portion 940 is different from the specific gravity of the second portion 942.

The weight w93 is attachable to the cavity v1 both when it is placed right side up and upside down. In a first posture of the weight w93 as shown in FIG. 35, the second portion 942 is located on the lower side of the first portion 940. In the first posture, the second portion 942 abuts on the cavity v1. In the first posture, the first portion 940 does not abut on the cavity v1. More specifically, a first abutment portion (first side surface) 942a of the second portion 942 abuts on the first slide portion 130, and a second abutment portion (second side surface) 942b of the second portion 942 abuts on the second slide portion 132. A first abutment portion (first side surface) 940a of the first portion 940 does not abut on the cavity v1. A second abutment portion (second side surface) 940b of the first portion 940 does not abut on the cavity v1, either. That is, the first portion 940 does not abut on the cavity v1.

When the weight w93 is turned upside down from the state of FIG. 35, the weight w93 is set to be a second posture. In the second posture, the first portion 940 is located on the lower side of the second portion 942. In the second posture, the first portion 940 abuts on the cavity v1. In the second posture, the second portion 942 does not abut on the cavity v1. More specifically, the first abutment portion (first side surface) 940a of the first portion 940 abuts on the first slide portion 130, and the second abutment portion (second side surface) 940b of the first portion 940 abuts on the second slide portion 132. In this posture, the first abutment portion (first side surface) 942a of the second portion 942 does not abut on the cavity v1. The second abutment portion (second side surface) 942b of the second portion 942 does not abut on the cavity v1, either. That is, the second portion 942 does not abut on the cavity v1.

Depending on the shape of the cavity v1, in the first posture, the first portion 940 might abut on the cavity v1 in addition to the second portion 942. Although the first abutment portion 940a of the first portion 940 is located slightly apart from the first slide portion 130 as shown in FIG. 35, the first abutment portion 940a may abut on the first slide portion 130 in the first posture when the first slide portion 130 is perpendicular to the boundary surface m1.

The position of the center of gravity of the weight w93 with respect to the cavity v1 is changed by turning the weight w93 upside down. Therefore, the position of the center of gravity of the head is changed by turning the weight w93 upside down.

The up-down direction position of the center of gravity of the weight w93 is preferably changed by turning the weight w93 upside down. For example, this is achieved by setting the specific gravity of the first portion 940 and the specific gravity of the second portion 942 so as to be different from each other.

Figure 36A:
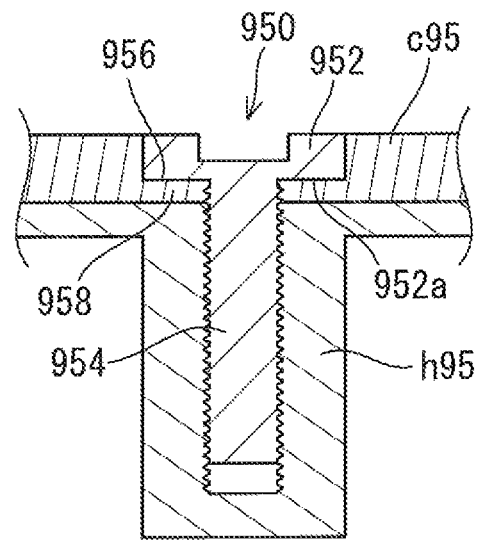
FIG. 36A and FIG. 36B are cross-sectional views showing a structure for fixing a cover with a screw.

FIG. 36A is a cross-sectional view around a screw 950 as a cover attaching member. The screw 950 fixes a cover c95 to a head body h95. The screw 950 includes a head portion 952 and a shaft portion 954. The head portion 952 has a bottom surface 952a that extends in a direction perpendicular to the center line of the shaft portion 954. The head portion 952 has a side surface 952b that extends in a direction parallel to the center line of the shaft portion 954. The shaft portion 954 includes a male screw portion. The cover c95 is closed by tightening the screw 950. In the closed state, the screw 950 is not protruded from the cover c95. The cover c95 includes a recess 956 in which the head portion 952 is fitted, and a receiving portion 958 that is pressed by the bottom surface 952a of the head portion 952 fitted into the recess 956.

Figure 36B:
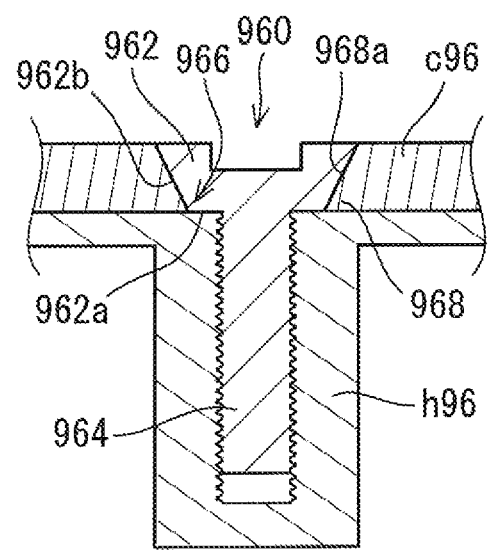

FIG. 36B is a cross-sectional view around a screw 960 according to a modification example. The screw 960 fixes a cover c96 to a head body h96. The screw 960 includes a head portion 962 and a shaft portion 964. The head portion 962 has a bottom surface 962a that extends in a direction perpendicular to the center line of the shaft portion 964. The head portion 962 has a side surface 962b that has a tapered portion. The side surface 962b of the head portion 962 is inclined with respect to the center line of the shaft portion 964. The side surface 962b is inclined so as to approach the center line of the shaft portion 964 as coming closer to the shaft portion 964. The side surface 962b forms a conically protruded surface. The shaft portion 964 includes a male screw portion. The cover c96 is closed by tightening the screw 960. In the closed state, the screw 960 is not protruded from the cover c96. The cover c96 includes a recess (hole) 966 in which the head portion 962 is fitted, and a receiving portion 968 that is pressed by the side surface 962b of the head portion 962 fitted into the recess 966. The receiving portion 968 includes an inclined surface 968a that is bought into contact with the side surface 962b. The inclined surface 968a forms a conically recessed surface.

As shown in FIG. 30 to FIG. 32, a screw may be protruded from the cover in the closed state. Preferably, the screw 950 (head portion 952) is not protruded from the cover c95 in the closed state. Also in the first to seventh embodiments, the screw(s) that fixes the cover is not protruded from the cover. As shown in the embodiment of FIG. 36B, when the side surface 962a of the head portion 962 is inclined, the inclined side surface 962a can press the cover c96 down. In this case, it is not necessary to locate a part of the cover c96 between the bottom surface 962a and the head body h96. Therefore, the cover c96 can be designed to be thinner, whereby the degree of freedom in design of the cover c96 is increased.

Advantageous Effect

The above-described embodiments exhibit the following advantageous effects.

In the first to seventh embodiments, the cover which is in the closed state applies a pressing force to the weight. For this reason, static frictional forces generated between the weight and the cavity and generated between the weight and the cover are increased. Therefore, the position of the weight can be fixed without the need to provide an engaging shape that fixes the weight between the weight and the cavity. In addition, the fixed state of the weight is released by only setting the cover to the opened state.

In the first to seventh embodiments, the weight is placed in the cavity. The weight can be made slidable in the cavity by only being placed in the cavity. Therefore, attachment and detachment of the weight are easily performed. In addition, replacement of weights is also easily performed. The slide movement of the weight is also easily performed by only pushing and sliding the weight.

In the first to seventh embodiments, the abutment portion of the weight abuts on the slide portion of the cavity. In the slide movement of the weight, the abutment portion slides on the slide portion. By this structure, a slide structure in which the weight is easily attached and detached and can slidingly move is easily attained.

In the first to seventh embodiments, the cavity forms a slide groove that enables the weight to slide. The weight has a shape that allows the weight to slidingly move on the slide groove. Therefore, a structure that enables the weight to slide and to be easily attached and detached is attained.

In the first to seventh embodiments, the abutment portion of the weight includes a first abutment portion and a second abutment portion, and the slide portion of the cavity include a first slide portion and a second slide portion. The first abutment portion is the first side surface of the weight, and the second abutment portion is the second side surface of the weight. The first slide portion of the cavity is the first side surface of the slide groove, and the second slide portion of the cavity is the second side surface of the slide groove. This attains a structure that enables the weight to slide and to be easily attached and detached.

The first slide portion and the second slide portion of the cavity forms a tapered shape. The distance between the first slide portion and the second slide portion is downwardly decreased. The distance between the first slide portion and the second slide portion is decreased as approaching the bottom surface of the cavity. In addition, the weight also has a tapered shape. The distance between the first abutment portion and the second abutment portion is downwardly decreased. Therefore, the weight is stably supported by the cavity, thereby being able to smoothly slide. In addition, since the cover applies a pressing force on the weight, static frictional force generated between the weight and the cavity is increased.

In the first to seventh embodiments, the shape of the abutment portion of the weight corresponds to the shape of the slide portion of the cavity. In these embodiments, the abutment portion of the weight is a curved surface, and forms an abutting curved surface. The slide portion of the cavity is also a curved surface, and forms a slide curved surface. These curved surfaces enable the weight to smoothly slide. From the viewpoint of enhancing smoothability of the slide movement, the curvature of the slide curved surface is preferably substantially constant, and more preferably constant. The term "substantially constant" means that the curvature may have a tolerance of ±5%, or more preferably ±3%. Note that, however, even when the curvature of the slide curved surface is varied, the weight can stably slide as the weight abuts on the slide curved surface at three positions. From the viewpoint of enhancing smoothability of the slide movement, the curvature of the slide curved surface is preferably substantially the same as the curvature of the abutting curved surface, and more preferably the same as the curvature of the abutting curved surface. The term "substantially the same" means that the curvatures may have a tolerance of ±5%, or more preferably ±3%. Note that, however, even when the curvature of the slide curved surface is different from the curvature of the abutting curved surface, the weight can stably slide as the weight abuts on the slide curved surface at three positions.

More specifically, in the first to seventh embodiments, the first slide portion and the second slide portion of the cavity are curved surfaces, and form a first slide curved surface and a second slide curved surface, respectively. The first abutment portion and the second abutment portion of the weight are also curved surfaces, and form a first abutting curved surface and a second abutting curved surface, respectively. From the viewpoint of enhancing smoothability of the slide movement, the curvature of the first slide curved surface and the curvature the second slide curved surface are preferably substantially constant, and more preferably constant. From the viewpoint of enhancing smoothability of the slide movement, the curvature of the first slide curved surface is preferably substantially the same as the curvature of the first abutting curved surface, and more preferably the same as the curvature of the first abutting curved surface.

As shown in the embodiments of FIG. 8 to FIG. 10, the abutment portion of the weight does not have to have a shape that corresponds to the shape of the slide portion of the cavity. In this case, at any positions within the movable range of the weight slide movement, the abutment portion of the weight is brought into contact with the slide portion of the cavity at preferably three or more positions. In these embodiments, at any positions within the movable range of the weight slide movement, the number of the contact positions between the abutment portion of the weight and the slide portion of the cavity is three. The posture of the weight is stabilized by being supported at three or more positions, whereby the weight can smoothly slide. In this case, the curvature of the wall surface of the cavity does not have to be substantially constant, whereby the degree of freedom in design of the cavity is increased. Furthermore, this alleviates the need for high dimensional accuracy of the cavity.

In the embodiments of the first to seventh embodiments, contact between the weight and the cavity during the slide movement of the weight is attained only by a contact between the abutment portion and the slide portion. This configuration attains a slide mechanism in which the weight is easily attached and detached, increases contact pressure between the abutment portion and the slide portion by the pressing force of the cover, and fixes the position of the weight.

In the first to seventh embodiments, the weight is attached to the cavity in a state where the weight can fall off the cavity by gravity force. Therefore, the weight is easily attached and detached, and also easily slides.

In the first to seventh embodiments, the slide movement of the weight is prevented only by the static frictional force increased by the pressing force of the cover. Therefore, the weight can be fixed by the cover in the slide mechanism in which the weight is easily attached and detached and also easily slides. This static frictional force is generated at contact portion between the weight and the cavity and at contact portion between the weight and the cover.

As shown in FIG. 11A to 11E, the cover may include a cover engaging shape that engages with the weight at a plurality of positions within the range of the slide movement of the weight. In addition, the weight may include a weight engaging shape that engages with the cover engaging shape of the cover in the closed state. Engagement between the cover engaging shape and the weight engaging shape enables the weight to be fixed at a plurality of positions within the range of the slide movement. The synergistic effect of this engagement and the pressing force of the cover enhances the fixability of the weight. Furthermore, this engagement allows the weight to be fixed by the cover even when the pressing force is not applied from the cover. Shapes of the cover engaging shape and the weight engaging shape are not limited. The cover engaging shape and the weight engaging shape only need to have shapes that cause engagement between them thereby to prevent the movement of the weight. For example, one of the cover engaging shape and the weight engaging shape may be a projection, and the other of those may be a recess. In the cover engaging shape, a plurality of projections or recesses may be provided at positions different from each other in the slide direction of the weight. One preferable example of the cover engaging shape is a plurality of cover recess portions or cover projection portions formed at a plurality of positions in the direction of the slide movement of the weight. One preferable example of the weight engaging shape is a weight projection portion or a weight recess portion that engages with the cover recess portions or cover projection portions.

As shown in the second, fourth, fifth and seventh embodiments, at least a part of the weight may be visually recognized from outside the cover which is in the closed state. Also in FIG. 27A, FIG. 27B, FIG. 28A, FIG. 28B, FIG. 29A and FIG. 29B, at least a part of the weight is visually recognized from outside the cover in the closed state. In this case, the position of the weight can be seen when the cover is in the closed state. Examples of such a structure in which the weight can be visually recognized include following structures (a) to (d).

(a) A part of the weight is exposed to the outside.
(b) The cover includes a window portion, and a part of the weight is visually recognized through the window portion.
(c) The cover has transparency, and at least a part of the weight is visually recognized through the cover.
(d) A gap is present between the cavity and the cover in the closed state, and the weight is visually recognized through the gap.

The above structures (a), (b), (c), and (d) are each satisfied when the cover is in the closed state. Preferably, the structures (a), (b), (c), and (d) are each satisfied when the weight is located at any position within the movable range of the slide movement of the weight. The second, fourth, and fifth embodiments have the structure (a). The embodiments of FIG. 27A, FIG. 27B, FIG. 28A, FIG. 28B, FIG. 29A and FIG. 29B have the structure (b). The fourth embodiment also has the structure (b). The seventh embodiment has the structure (c). The second embodiment has the structure (d).

A display portion may be provided on the weight. In a case where the weight is visually recognized when the cover is in the closed state, the display portion of the weight may be provided at a position that is can be visually recognized from the outside of the cover. The display portion may be provided at least a part of the weight, and be visually identified by users. Examples of the display portion include a letter(s), a symbol(s), and a line(s). This line(s) includes graduations (scale). In the seventh embodiment shown in FIG. 26, a display portion s1 is provided at a position that is visually recognized from the outside of the cover. This display portion s1 is a line. The display portion s1 may be provided at a single position, or at a plurality of positions. In the embodiment of FIG. 26, the display portion s1 is provided at one position. The display portion s1 enables users to recognize the position of the weight easily.

A display portion may be provided on the head body or the cover. When the display portion is provided on the head body, the display portion is preferably located near the cavity. Examples of the display portion include a letter(s), a symbol(s), and a line(s). This line(s) includes graduations (scale). In the embodiment of FIG. 26, a display portion s2 is provided on the head body. This display portion s2 is letters. The display portion s2 may be provided at a single position, or at a plurality of positions. Recognizability of the position of the weight can be enhanced by allowing users to see the positional relationship between the display portion s2 and the display portion s1. In the embodiment of FIG. 26, the display portion s2 includes information allowing users to see head performance obtained by changing the position of the weight.

As shown in the second, fourth, and fifth embodiments, the weight may include a weight engaging portion that engages with the cover, and the cover may include a cover engaging portion that engages with the weight engaging portion. The engagement between the weight engaging portion and the cover engaging portion is maintained even when the weight is located at any position within the movable range of the slide movement of the weight. This engagement does not hamper the slide movement of the weight. From the viewpoint of achieving such engagement, the cover engaging portion preferably extends along the path of the slide movement of the weight. In these embodiments, a slit, a projection, or edges of the cover are adopted as examples of the cover engaging portion. The weight engaging portion is configured to maintain the engagement with the cover engaging portion at any position within the range of the slide movement of the weight.

The engagement between the weight engaging portion and the cover engaging portion enables the weight to be attached to the cover such that the weight does not fall off the cover. Therefore, even when the weight is detached from the cavity, the weight does not fall off the cover since the weight is held by the cover.

In the fifth embodiment, the weight can be set to adopt a first posture and a second posture in which the weight is turned upside down from the first posture. The weight has a shape that allows the weight to slidingly move in the cavity both when the weight is in the first posture and when the weight is in the second posture. Also in the embodiment of FIG. 35, the weight can be set to adopt a first posture and a second posture in which the weight is turned upside down from the first posture. By turning the weight upside down, the position of the center of gravity of the weight relative to the cavity can be changed. That is, by turning the weight upside down, the position of the center of gravity of the weight relative to the head body can be changed. As a result, the position of the center of gravity of the head can be changed. When the position of the center of gravity of the weight is located off from the plane of symmetry of the weight, the change of the position of the center of gravity is attained by tuning the weight upside down.

The position of the center of gravity of the head is changed by turning the weight upside down. The position of the center of gravity of the head is adjusted by not only moving the weight but also turning the weight upside down, whereby the degree of freedom in adjustability of the position of the center of gravity of the head is enhanced. In addition, a visual impact can be obtained by differentiating the appearance (color, for example) of the first portion of the weight from that of the second portion of the weight. As in the fifth embodiment, when either the first portion or the second portion is visually recognized, the visual impact becomes more effective.

The width of end portions of the cover may be different from the width of the intermediate portion of the cover. As shown in the second and seventh embodiments, the width of the end portions of the cover may be greater than the width of the intermediate portion of the cover. Also in the embodiments of FIG. 27A and FIG. 27B, the width of the end portions of the cover is greater than the width of the intermediate portion of the cover. These end portions are fixed to the head body with cover attaching members. The strength and rigidity of the cover near the cover attaching members can be enhanced by increasing the width of the end portions. Alternatively, as in the sixth embodiment, the width of the end portions of the cover may be smaller than the width of the intermediate portion of the cover. Also in the embodiments of FIG. 28A and FIG. 28B, the width of the end portions of the cover is smaller than the width of the intermediate portion of the cover. This configuration can attain a reduced weight of the cover by reducing the width of the end portions while keeping a required width for the intermediate portion of the cover. The width of the cover may be gradually changed or steeply changed.

As in the first to seventh embodiments, the end portions (the first end portion and the second end portion) of the cover may be fixed to the head body with screws. The pressing force of the cover to the weight can be increased by tightening the screw. By removing both the screws, the cover can be removed from the head body. Furthermore, the cover can be turned about a second screw by removing a first screw and loosening the second screw (see FIG. 24). Therefore, the cover can be set to the opened state to move the weight without the need to separate the cover apart from the head body. In this case, the length of the shaft portion (male screw portion) of the second screw may be longer than the shaft portion (male screw portion) of the first screw. Because of this structure, the first screw is easily removed in a state where the head portion of the second screw is floated.

As in the embodiment of FIG. 31, the first end portion of the cover may be fixed with a screw, and the second end portion of the cover may be rotatably fixed to the head body with a hinge. This structure enables the cover to be rotated by removing the screw fixing the first end portion. This cover can be easily opened and closed without the need to separate the cover apart from the head body.

As in the embodiment of FIG. 30, the first end portion of the cover may be fixed to the head body with a screw, and the second end portion of the cover may be inserted to the cover receiving portion of the head body. In this case, the cover can be opened simply by loosening the screw fixing the first end portion, and pulling out the second end portion from the cover receiving portion. In addition, the cover can be closed by only reversing this procedure.

As in the embodiment of FIG. 32, the end portions of the cover may be rotatably fixed to the head body with hinges. In this case, the middle portion of the cover may be fixed to the head body with a screw. The cover can be opened and closed while being elastically deformed by only removing the screw. The screw increases the pressing force of the cover to the weight.

The cover is fixed to the head body at a plurality of positions. Also in the embodiments of FIG. 30 to FIG. 32, the cover is rotatable about one side end thereof. Because of this rotation, the cover is easily opened and closed while still being attached to the head body. Preferably, the cover attaching member (screw) that has been removed from the head body does not fall off the cover during the rotation.

As shown in the first to seventh embodiments and FIG. 31, the first end portion of the cover may be attached to the head body with the first cover attaching member, the second end portion of the cover may be attached to the head body with the second cover attaching member, and the cover may be rotatable about the second end portion of the cover in a state where the first cover attaching member is detached. As shown in the first to seventh embodiments, the first cover attaching member may be a screw, and the second cover attaching member may be a screw. As shown in FIG. 31, the first cover attaching member may be a screw and the second cover attaching member may be a hinge.

The cavity, the weight or the cover may include a magnetic substance. The magnetic substance may be a sheet, for example. The magnetic substance may be disposed on the bottom surface of the cavity, for example. The cavity and the weight may be attracted to each other by magnetic force. The magnetic substance may be disposed on the inner surface of the cover. The magnetic substance may be distributed to a plurality of positions on the cover. The cover and the weight may be attracted to each other by magnetic force. The magnetic force can prevent falling off of the weight when the cover is opened.

A kit that includes the golf club head may include an access tool that is accessible to the cover attaching member. The access tool may be a tool that can turn a screw, for example. This access tool may include a magnetic substance. The access tool and the weight may be attracted to each other by magnetic force. The magnetic force allows the weight to be moved without the need to open the cover. A slit or a groove may be provided on the cover, and the movement of the weight by the magnetic force may be achieved by moving the access tool along the slit or the groove. In this case, the groove does not have to penetrate through the cover. The weight can be moved without touching the weight.

The elastic part is shown in the first embodiment as an example, but can be adopted in other embodiments. The elastic part is preferably provided at a position at which a contact pressure increased by the pressing force of the cover is applied. The elastic part enhances an effect that prevents the movement of the weight. The elastic part also suppresses rattling of the weight. Examples of the above-mentioned position at which the higher contact pressure increased by the pressing force is applied include contact surfaces between the cover and the weight, and contact surfaces between the weight and the cavity. At least a part of the cover may be constituted by the elastic part, at least a part of the weight may be constituted by the elastic part, and/or at least a part of the cavity may be constituted by the elastic part. Alternatively, the elastic part may be an independent member. Examples of this structure include a structure in which the cover, the weight or the cavity itself is the elastic part. When the elastic part is not an independent member, the elastic part is prevented from solely falling off. The elastic part may be a thin film such as coating (painting). Preferably, the elastic part is provided as a layer. The elastic part may include an elastic part engaging shape that engages with the weight engaging shape.

Examples of the material of the elastic part include an elastomer. Examples of the elastomer include a thermosetting elastomer and a thermoplastic elastomer. Examples of the thermosetting elastomer include a rubber. Examples of the thermoplastic elastomer include a thermoplastic polystyrenic elastomer (TPS), a thermoplastic olefin/alkene-based elastomer (TPO), a polyvinyl chloride-based thermoplastic elastomer (TPVC), a polyurethane-based thermoplastic elastomer (TPU), a polyester-based thermoplastic elastomer (TPEE or TPC) and a polyamide-based elastomer (TPAE).

The cavity may have a constant depth or may have a non-constant depth. That is, the depth of the cavity may be varied. The head has a three-dimensional shape containing a free-form curved surface as its outer surface. In order to form a cavity including a curved surface having a constant curvature (such as a circular cone surface), and to make the width of the cavity constant, the depth of the cavity is preferably varied. The depth of the cavity is measured in a cross section that is perpendicular to the slide movement of the weight. In this cross section, the depth is measured along a direction that is perpendicular to a line that connects two edges forming upper ends of the cavity.

In the first to seventh embodiments, the cover can be removed from the head body. The cover is removed from the head body by removing two screws. In this case, for example, the cover can be replaced with another cover. By replacing the cover with another cover having a different weight, the weight of the head can be adjusted. The position of the center of gravity of the head can be adjusted while keeping the weight of the head as it is by replacing the cover and the weight with another cover and another weight while keeping the total weight of the cover and the weight as it is.

The weight may be constituted by a plurality of members. In the second, third, and fifth embodiments, the weight is constituted by three members. In these embodiments, two divisional bodies that constitutes the weight main body, and a connecting member that connects the divisional bodies. In the fourth embodiment, the weight is constituted by two members. By constituting the weight with a plurality of members, a non-removable engagement between the cover and the weight is easily attained.

As shown in the fifth embodiment and the embodiment of FIG. 35, the weight has a symmetric shape in the up-down direction. In this case, the weight of the first portion may be different from the weight of the second portion. The difference in weight can be achieved by difference in specific gravity of material, difference in volume, presence or absence of a hollow portion, presence or absence of porous, difference in ratio of porous, for example. As described above, because of such an up-down symmetrical shape of the weight, the weight is usable both when it is placed right side up and upside down, whereby the center of gravity is adjusted.

As shown in the fourth and fifth embodiments and the embodiments of FIG. 27A to FIG. 29B, at least one slit may be provided in the cover. The slit can reduce the weight of the cover, thereby obtaining a saved weight that may be distribute to other portions. This slit also allows users to visually recognize the weight from the outside of the cover.

A sensor may be provided in the weight. Examples of the sensor include an accelerometer such as a three-axis accelerometer, a gyro-sensor (angular velocity sensor), a GPS sensor, and a 6-axis motion sensor. GPS stands for Global Positioning System. By providing such a sensor, swing or head behavior can be measured.

Examples of the material of the cover include a metal or non-metal. Considering formability and operability for opening and closing the cover, a non-metallic material is preferable. Examples of the non-metallic material include a resin. The specific gravity of the cover is preferably smaller than the specific gravity of the head body. A saved weight obtained by reducing the weight of the cover may be distributed to the head body, whereby the degree of freedom in design of the head body is increased.

From the viewpoint of the degree of freedom in adjustability of the center of gravity of the head, the actual movable distance of the center of gravity of the weight during the slide movement is preferably greater than or equal to 20 mm, more preferably greater than or equal to 30 mm, and still more preferably greater than or equal to 40 mm. Considering restriction on the head volume, the actual movable distance is preferably less than or equal to 120 mm, more preferably less than or equal to 110 mm, and still more preferably less than or equal to 100 mm. This actual movable distance is a distance measured along the path of the slide movement of the center of gravity of the weight.

From the viewpoint of the adjustability of the center of gravity of the head in the toe-heel direction, the movable distance of the center of gravity of the weight in the toe-heel direction during the slide movement is greater than or equal to 15 mm, more preferably greater than or equal to 25 mm, and still more preferably greater than or equal to 35 mm. Considering restriction on the head volume, the movable distance is preferably less than or equal to 115 mm, more preferably less than or equal to 105 mm, and still more preferably less than or equal to 95 mm.

From the viewpoint of adjustability of the center of gravity of the head in the face-back direction, the movable distance of the center of gravity of the weight in the face-back direction during the slide movement is preferably greater than or equal to 5 mm, more preferably greater than or equal to 7 mm, and still more preferably greater than or equal to 10 mm. Considering restriction on the head volume, the movable distance is preferably less than or equal to 80 mm, more preferably less than or equal to 70 mm, and still more preferably less than or equal to 60 mm.

From the viewpoint of increasing the depth of the center of gravity of the head, the minimum value of a varied distance, which is varied by the slide movement, between the face center Fc and the center of gravity of the weight is preferably greater than or equal to 20 mm, more preferably greater than or equal to 25 mm, and still more preferably greater than or equal to 30 mm. Considering restriction on the head volume, the maximum value of the varied distance, which is varied by the slide movement, between the face center Fc and the center of gravity of the weight is preferably less than or equal to 110 mm, more preferably less than or equal to 105 mm, and still more preferably less than or equal to 100 mm.

The following clauses are disclosed regarding the above-described embodiments.

[Clause 1]

A golf club head including:
a head body that includes a cavity;
a weight that is detachably attached to the cavity; and
a cover that is attached to the head body so as to be opened and closed, and that covers at least a part of the cavity when the cover is in a closed state, wherein
the weight is attached to the cavity in a state where the weight is slidingly movable in the cavity, and
in the closed state, the cover applies a pressing force to the weight.

[Clause 2]

The golf club head according to clause 1, wherein
the weight includes an abutment portion,
the cavity includes a slide portion that abuts on the abutment portion, and
in the slide movement of the weight, the abutment portion slides on the slide portion.

[Clause 3]

The golf club head according to clause 2, wherein
the cavity forms a slide groove that allows the weight to slide thereon, and
the weight has a shape that allows the weight to slidingly move on the slide groove.

[Clause 4]

The golf club head according to clause 3, wherein
the abutment portion includes a first abutment portion and a second abutment portion,
the slide portion includes a first slide portion that abuts on the first abutment portion and a second slide portion that abuts on the second abutment portion,
the first abutment portion is a first side surface of the weight,
the second abutment portion is a second side surface of the weight,
the first slide portion is a first side surface of the slide groove, and
the second slide portion is a second side surface of the slide groove.

[Clause 5]

The golf club head according to clause 2, wherein
the abutment portion does not have a shape that is along the shape of the slide portion,
the abutment portion is brought into contact with the slide portion at three or more positions when the weight is located at any position within a movable range of the slide movement.

[Clause 6]

The golf club head according to any one of clauses 2 to 5, wherein
during the slide movement, the weight is brought into contact with the cavity, and
the contact between the weight and the cavity is achieved only by contact between the abutment portion and the slide portion.

[Clause 7]

The golf club head according to any one of clauses 1 to 6, wherein
the weight is attached to the cavity in a state where the weight is allowed to fall off the cavity by gravity force when the cover is in an opened state.

[Clause 8]

The golf club head according to any one of clauses 1 to 7, wherein
the slide movement of the weight is prevented only by a static frictional force increased by the pressing force.

[Clause 9]

The golf club head according to any one of clauses 1 to 8, wherein
the cover includes a cover engaging shape that engages with the weight at a plurality of positions in a path of the slide movement of the weight, and
the weight includes a weight engaging shape that engages with the cover engaging shape when the cover is in the closed state.

[Clause 10]

The golf club head according to any one of clauses 1 to 9, wherein
when the cover is in the closed state, at least a part of the weight is visually recognized.

[Clause 11]

The golf club head according to clause 10, wherein
when the cover is in the closed state, a part of the weight is exposed outside the golf club head.

[Clause 12]

The golf club head according to clause 10, wherein
the cover includes a window portion, and
when the cover is in the closed state, a part of the weight is visually recognized through the window portion when the weight is located at any position within a movable range of the slide movement of the weight.

[Clause 13]

The golf club head according to clause 10, wherein
at least a part of the cover has transparency, and
when the cover is in the closed state, at least a part of the weight is visually recognized through the cover when the weight is located at any position within a movable range of the slide movement of the weight.

[Clause 14]

The golf club head according to any one of clauses 1 to 13, wherein
the weight includes a weight engaging portion that engages with the cover,
the cover includes a cover engaging portion that engages with the weight engaging portion,
an engagement between the weight engaging portion and the cover engaging portion is maintained even when the weight is located at any position within a movable range of the slide movement of the weight, and
by the engagement between the weight engaging portion and the cover engaging portion, the weight is attached to the cover so as not to be separated apart from the cover.

[Clause 15]

The golf club head according to any one of clauses 1 to 14, wherein
the weight has a shape that allows the weight to slidingly move both when the weight is in a first posture and in a second posture in which the weight is turned upside down from the first posture.

[Clause 16]

The golf club head according to clause 15, wherein a position of a center of gravity of the head is changed by changing the weight posture between the first posture and the second posture.

[Clause 17]

The golf club head according to any one of clauses 1 to 16, wherein an elastic part is provided at a position at which a contact pressure increased by the pressing force is applied.

[Clause 18]

The golf club head according to any one of clauses 1 to 17, wherein a first end portion of the cover is fixed to the head body with a first cover attaching member, a second end portion of the cover is fixed to the head body with a second cover attaching member, and the cover is rotatable about the second end portion in a state where the first cover attaching member is detached.

[Clause 19]

The golf club head according to clause 18, wherein the first cover attaching member is a screw, and the second cover attaching member is a screw.

[Clause 20]

The golf club head according to clause 18, wherein the first cover attaching member is a screw, and the second cover attaching member is a hinge.

[Clause 21]

A golf club head including:

a head body that includes a cavity;

a weight that is detachably attached to the cavity; and a cover that is attached to the head body so as to be opened and closed, and that covers at least a part of the cavity when the cover is in a closed state, wherein the weight is attached to the cavity in a state where the weight is slidingly movable in the cavity, the cover includes a cover engaging shape that engages with the weight at a plurality of positions in a path of the slide movement of the weight, and the weight includes a weight engaging shape that engages with the cover engaging shape when the cover is in the closed state.

[Clause 22]

The golf club head according to clause 21, wherein the cover engaging shape is a plurality of cover recess portions or cover projection portions formed at a plurality of positions in the path of the slide movement, and the weight engaging shape is a weight projection portion that engages with the cover recess portions, or a weight recess portion that engages with the cover projection portions.

[Clause 23]

A golf club head including:

a head body that includes a cavity;

a weight that is placed in the cavity; and a cover that is attached to the head body so as to be opened and closed, and that covers at least a part of the cavity when the cover is in a closed state, wherein the weight is put in the cavity in a state where the weight is slidingly movable in the cavity, and in the closed state, the cover applies a pressing force to the weight.

LIST OF REFERENCE NUMERALS

100, 200, 300, 400, 500, 600, 700 Head
h1, h2, h3, h4, h5, h6, h7 Head body
c1, c2, c3, c4, c5, c6, c7 Cover
v1, v2, v3, v4, v5, v6, v7 Cavity
w1, w2, w3, w4, w5, w6, w7 Weight
116 First abutment portion (Abutment portion)
118 Second abutment portion (Abutment portion)
130 First slide portion (Slide portion)
132 Second slide portion (Slide portion)

The above descriptions are merely illustrative and various modifications can be made without departing from the principles of the present disclosure.

What is claimed is:

1. A golf club head comprising:

a head body that includes a groove shaped cavity and a cover receiving portion;

a weight that is detachably attached to the cavity; and a cover that is attached to the head body, covers at least a part of the cavity when the cover is in a closed state and does not cover at least part of the cavity in an open state, wherein the weight is attached to the cavity in a state where the weight is slidingly movable in the cavity, an elastic part is disposed between the cover and the weight, in the closed state, the cover inner surface applies a pressing force indirectly to the weight, the cover engages with the weight, the cover includes a portion attached to the head body with a screw and a portion inserted into the cover receiving portion, wherein these portions fix the cover to the head body, the weight has a shape that includes corners or projections and the cavity includes projections, and the weight contacts the cavity at a total of three or more contact points.

2. The golf club head according to claim 1, wherein the cover includes a cover engaging shape that engages with the weight at a plurality of positions in a path of the slide movement of the weight, and the weight includes a weight engaging shape that engages with the cover engaging shape when the cover is in the closed state.

3. The golf club head according to claim 1, wherein when the cover is in the closed state, a part of the weight is exposed outside the golf club head.

4. The golf club head according to claim 1, wherein the cover includes a window portion, and when the cover is in the closed state, a part of the weight is visually recognizable through the window portion when the weight is located at any position within a movable range of the slide movement of the weight.

5. The golf club head according to claim 1, wherein at least a part of the cover has transparency, and when the cover is in the closed state, at least a part of the weight is visually recognizable through the cover when the weight is located at any position within a movable range of the slide movement of the weight.

6. The golf club head according to claim 1, wherein
the weight includes a weight engaging portion that engages with the cover,
the cover includes a cover engaging portion that engages with the weight engaging portion,
an engagement between the weight engaging portion and the cover engaging portion is maintained when the weight is located at any position within a movable range of the slide movement of the weight,
in the engagement between the weight engaging portion and the cover engaging portion, the cover engaging portion is sandwiched by the weight engaging portion.

7. The golf club head according to claim 1, wherein the elastic part is provided on the cover inner surface at a position at which a contact pressure increased by the pressing force is applied to the weight.

8. A golf club head comprising:
a head body that includes a groove shaped cavity;
a weight that is detachably attached to the cavity; and
a cover that is attached to the head body, covers at least a part of the cavity when the cover is in a closed state and does not cover at least part of the cavity in an open state, wherein
the weight is attached to the cavity in a state where the weight is slidingly movable in the cavity,
an elastic part is disposed between the cover and the weight,
the cover engages with the weight,
the weight has a shape that includes corners or projections and the cavity includes projections, and
the weight contacts the cavity at a total of three or more contact points.

9. The golf club head according to claim 8, wherein
the cover includes a cover engaging shape that engages with the weight at a plurality of positions in a path of the slide movement of the weight, and
the weight includes a weight engaging shape that engages with the cover engaging shape when the cover is in the closed state.

10. The golf club head according to claim 8, wherein when the cover is in the closed state, a part of the weight is exposed outside the golf club head.

11. The golf club head according to claim 8, wherein
the cover includes a window portion, and
when the cover is in the closed state, a part of the weight is visually recognizable through the window portion when the weight is located at any position within a movable range of the slide movement of the weight.

12. The golf club head according to claim 8, wherein
at least a part of the cover has transparency, and
when the cover is in the closed state, at least a part of the weight is visually recognizable through the cover when the weight is located at any position within a movable range of the slide movement of the weight.

13. The golf club head according to claim 8, wherein
the weight includes a weight engaging portion that engages with the cover,
the cover includes a cover engaging portion that engages with the weight engaging portion,
an engagement between the weight engaging portion and the cover engaging portion is maintained when the weight is located at any position within a movable range of the slide movement of the weight, and
in the engagement between the weight engaging portion and the cover engaging portion, the cover engaging portion is sandwiched by the weight engaging portion.

14. The golf club head according to claim 8, wherein the elastic part is provided on the cover inner surface at a position at which a contact pressure increased by a pressing force is applied to the weight.

* * * * *